US012779788B2

(12) United States Patent
Outhwaite et al.

(10) Patent No.: US 12,779,788 B2
(45) Date of Patent: Nov. 3, 2026

(54) CLIENT DEVICE WITH SLICER FOR THREE-DIMENSIONAL PRINTING AND METHODS FOR USE THEREWITH

(71) Applicant: Wrmth Corp., Coldwater (CA)

(72) Inventors: Aaron Scot Outhwaite, Sturgeon Falls (CA); Sally Jean Daub, Toronto (CA); John W. Pomeroy, Toronto (CA)

(73) Assignee: Wrmth Corp., Coldwater (CA)

( * ) Notice: Subject to any disclaimer, the term of this patent is extended or adjusted under 35 U.S.C. 154(b) by 221 days.

(21) Appl. No.: 18/887,707

(22) Filed: Sep. 17, 2024

(65) Prior Publication Data

US 2025/0033291 A1 Jan. 30, 2025

Related U.S. Application Data

(63) Continuation-in-part of application No. 18/825,673, filed on Sep. 5, 2024, which is a continuation-in-part of application No. 18/479,257, filed on Oct. 2, 2023, and a continuation-in-part of application No. 17/656,111, filed on Mar. 23, 2022, now Pat. No.
(Continued)

(51) Int. Cl.
*B29C 64/393* (2017.01)
*B33Y 50/02* (2015.01)

(52) U.S. Cl.
CPC ............. *B29C 64/393* (2017.08); *B33Y 50/02* (2014.12)

(58) Field of Classification Search
CPC .............................. B29C 64/393; B33Y 50/02
See application file for complete search history.

(56) References Cited

U.S. PATENT DOCUMENTS 7,866,743 B1 1/2011 Russell
7,963,594 B2 6/2011 Wolas
(Continued)

FOREIGN PATENT DOCUMENTS

CN 208954572 6/2019
WO WO2016/023084 A1 2/2016

OTHER PUBLICATIONS

Canada Intellectual Property Office; Office Action; Application No. 3153861; May 10, 2023; 3 pgs.
(Continued)

*Primary Examiner* — Mohammad Ali
*Assistant Examiner* — Vincent W Chang
(74) *Attorney, Agent, or Firm* — Katz Ruby & Carle LLP; Katherine C. Stuckman; Bruce E. Stuckman

(57) ABSTRACT

A client device includes a 3D slicer that operates by: automatically generating fin support data based on a selected print angle corresponding to at least one fin support configured to support the object during printing via a 3D printer, the at least one fin support including a vertical triangular fin element having a leading edge corresponding to the angular deviation of the planar surface from a vertical axis and a horizontal base element; generating updated model data by updating the model data to correspond to the print angle, to include the fin support data and further to include sprue data corresponding to a plurality of sprues that couple the leading edge of the vertical triangular fin element to the planar surface at multiple points, wherein the plurality of sprues facilitate separation of the at least one fin support from the object after printing via the 3D printer.

20 Claims, 51 Drawing Sheets

Related U.S. Application Data

12,279,701, which is a continuation-in-part of application No. 17/457,098, filed on Dec. 1, 2021, now Pat. No. 11,889,929.

(60) Provisional application No. 63/428,811, filed on Nov. 30, 2022, provisional application No. 63/381,360, filed on Oct. 28, 2022, provisional application No. 63/168,695, filed on Mar. 31, 2021, provisional application No. 63/120,906, filed on Dec. 3, 2020.

(56) References Cited

U.S. PATENT DOCUMENTS

| | | | | |
|---|---|---|---|---|
| 9,844,917 | B2 * | 12/2017 | Burhop | B29C 64/135 |
| 10,456,979 | B2 * | 10/2019 | Hartmann | B22F 10/47 |
| 10,463,148 | B2 | 11/2019 | Gober | |
| 11,363,890 | B2 | 6/2022 | Gober | |
| 2006/0254172 | A1 | 11/2006 | Arnold | |
| 2007/0267399 | A1 | 11/2007 | Flores | |
| 2008/0142494 | A1 | 6/2008 | Blake et al. | |
| 2010/0228369 | A1 * | 9/2010 | Eggers | G06T 17/10 700/98 |
| 2013/0213950 | A1 | 8/2013 | Bulgajewski | |
| 2019/0111813 | A1 | 4/2019 | Hoshi et al. | |
| 2019/0325498 | A1 | 10/2019 | Clark | |
| 2022/0175145 | A1 | 6/2022 | Pomeroy | |
| 2022/0274178 | A1 * | 9/2022 | Ceriani | B22F 10/28 |
| 2022/0363012 | A1 * | 11/2022 | Wighton | B29C 33/3842 |
| 2023/0080374 | A1 | 3/2023 | Gober | |
| 2023/0161322 | A1 * | 5/2023 | FrantzDale | G05B 19/4099 700/118 |
| 2025/0001700 | A1 * | 1/2025 | Nielsen | B33Y 80/00 |

OTHER PUBLICATIONS

Canada Intellectual Property Office; Office Action; CA Application No. 3,141,037; Mar. 1, 2023; 6 pgs.

Canada Intellectual Property Office; Office Action; CA Application No. 3,141,037; Jan. 8, 2024; 5 pgs.

* cited by examiner heating element 102 heating element 102 furnishing unit 110 furnishing unit 110 furnishing unit 110

PCB element 133

PCB element 133

PCB element 133 seating unit 112 seating unit 112 seating unit 112 top view seating unit 112 front view seating unit 112 side view seating unit 112 back view seat frame 124 front view seat frame 124 side view seat frame 124 top view seat frame 124 side view seat bottom 122 3D front view seat bottom 122 top view seat bottom 122 side view seat bottom 122 side view seat back 121 3D front view seat back 121 side view seat back 121 top view seat back 121 front view seat arm 123 top 3D view seat arm 123 side view seat arm 123 top view heating pad cover plate 134 3D front view heating pad cover plate 134 3D back view heating pad cover plate 134 top view heating pad cover plate 134 front view heating pad cover plate 134 back view heating pad cover plate 134 side view

110

110

102

Dry Formulation Preparation

General Casting Process

On-Demand Volumetric Mixing

FIG. 10
Wet casting
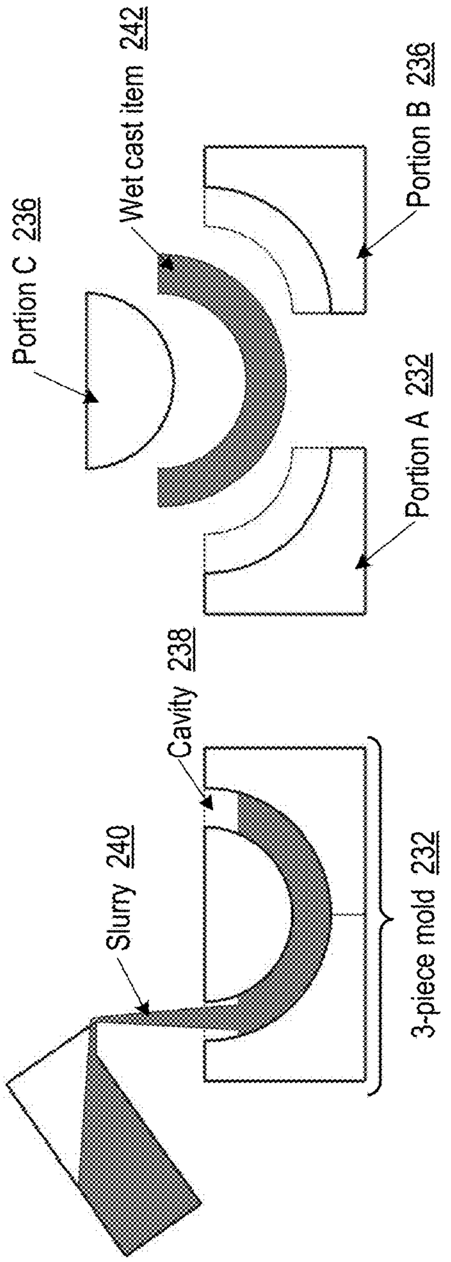
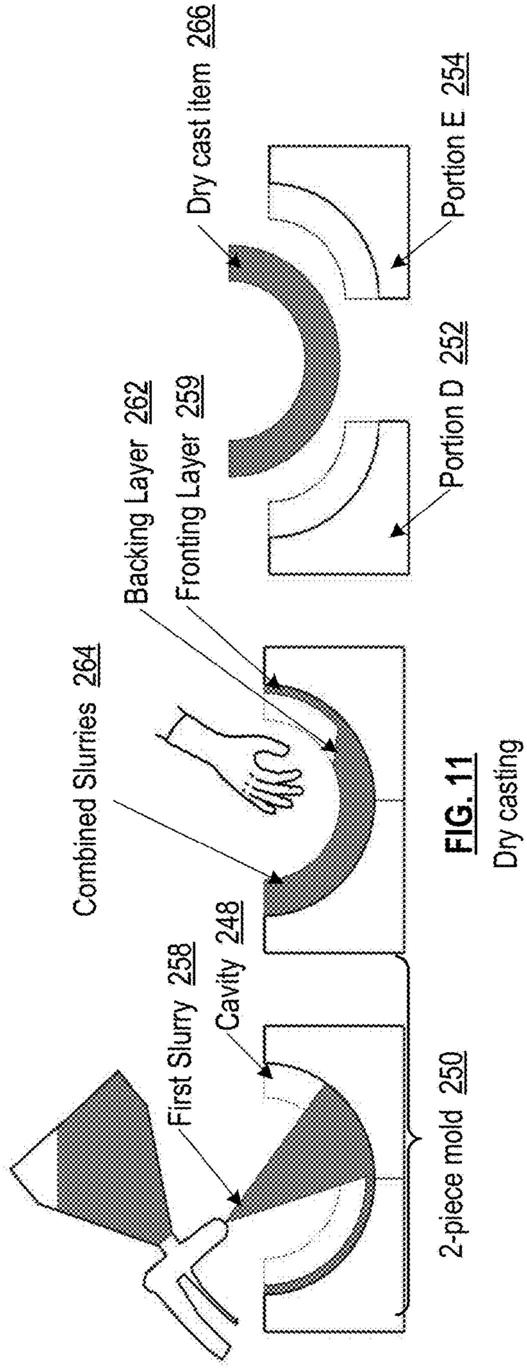
FIG. 11
Dry casting

Process steps for using the FRC described in this invention in FDM, binder jetting, and material jetting 3D printing systems.

unmagnetized concrete article magnetized concrete article

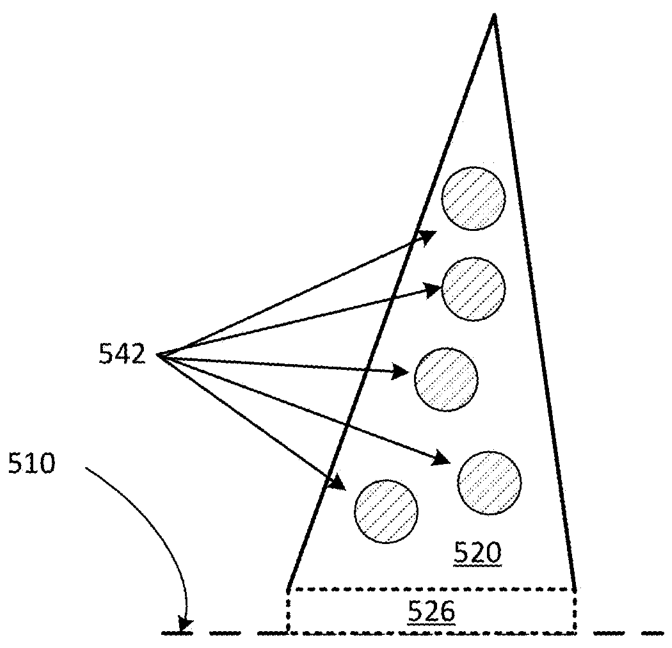

FIG. 36E

You have uploaded you model and selected a 25% print angle. Would you like to add one or more supports of the following types?

Base(s) Yes [x] No [ ]
Tree support(s) Yes [ ] No [x]
Fin Support(s) Yes [x] No [ ]

550-1

FIG. 36F

A base and two fin supports have been automatically designed based on the dimensions of your model, the 25-degree slant and your selections.

CLICK HERE to view what the final printed model with look like.

550-2

FIG. 36G

CLIENT DEVICE WITH SLICER FOR THREE-DIMENSIONAL PRINTING AND METHODS FOR USE THEREWITH

CROSS-REFERENCE TO RELATED APPLICATIONS

The present U.S. Utility Patent Application claims priority pursuant to 35 U.S.C. § 120 as a continuation-in-part of U.S. Utility application Ser. No. 18/825,673, entitled "TEMPERATURE CONTROLLED HEATING-CAPABLE SEATING UNIT", filed Sep. 5, 2024, which is a continuation-in-part of U.S. Utility application Ser. No. 18/479,257, entitled "ARTICLES OF MANUFACTURE AND CONCRETE FORMULATIONS FOR USE THEREWITH", filed Oct. 2, 2023, which claims priority pursuant to 35 U.S.C. § 119(e) to U.S. Provisional Application No. 63/381,360, entitled "CONCRETE FORMULATIONS, ARTICLES AND METHODS OF MANUFACTURE THEREOF", filed Oct. 28, 2022; and U.S. Provisional Application No. 63/428,811, entitled "CONCRETE FORMULATIONS, ARTICLES AND METHODS OF MANUFACTURE THEREOF", filed Nov. 30, 2022, each of which are hereby incorporated herein by reference in their entirety and made part of the present U.S. Utility Patent Application for all purposes.

U.S. Utility patent application Ser. No. 18/825,673 also claims priority pursuant to 35 U.S.C. § 120 as a continuation-in-part of U.S. Utility application Ser. No. 17/656,111, entitled "CONTROLLING ELEMENTS OF FURNISHING UNITS", filed Mar. 23, 2022, which is a continuation-in-part of U.S. Utility application Ser. No. 17/457,098, entitled "HEATING-CAPABLE FURNISHING UNIT", filed Dec. 1, 2021, issued as U.S. Pat. No. 11,889,929 on Feb. 6, 2024, which claims priority pursuant to 35 U.S.C. § 119(e) to U.S. Provisional Application No. 63/120,906, entitled "HEAT-CAPABLE FURNITURE", filed Dec. 3, 2020, each of which are hereby incorporated herein by reference in their entirety and made part of the present U.S. Utility Patent Application for all purposes.

U.S. Utility application Ser. No. 17/656,111 also claims priority pursuant to 35 U.S.C. § 119(e) to U.S. Provisional Application No. 63/168,695, entitled "FACILITATING EXPERIENCES BASED ON PROXIMITY-BASED INTERACTIONS WITH FURNISHING UNITS", filed Mar. 31, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE DISCLOSURE

Technical Field of the Disclosure

This disclosure relates generally to concrete formulations and concrete articles manufactured therefrom.

BRIEF DESCRIPTION OF THE SEVERAL VIEWS OF THE DRAWING(S)

FIG. 1 presents a graphical illustration of an embodiment of a furnishing unit that includes at least one heating element in accordance with various embodiments.

FIG. 2A presents a graphical illustration of an embodiment of a heating element in accordance with various embodiments.

FIG. 2B presents a deconstructed, layered illustration of an example embodiment of a heating element in accordance with various embodiments.

FIGS. 3A-3C are schematic block diagrams of embodiments of a furnishing unit in accordance with various embodiments;

FIG. 3D presents a graphical illustrations of an example embodiment of a PCB (printed circuit board) element of a furnishing unit in accordance with various embodiments;

FIG. 3E presents a deconstructed, layered illustration of an example embodiment of a PCB element of a furnishing unit in accordance with various embodiments;

FIG. 3F presents a side view graphical illustration of an example embodiment of a PCB of a furnishing unit in accordance with various embodiments;

FIG. 3G presents a back view graphical illustration of an example embodiment of a PCB of a furnishing unit in accordance with various embodiments;

Figure 4B:
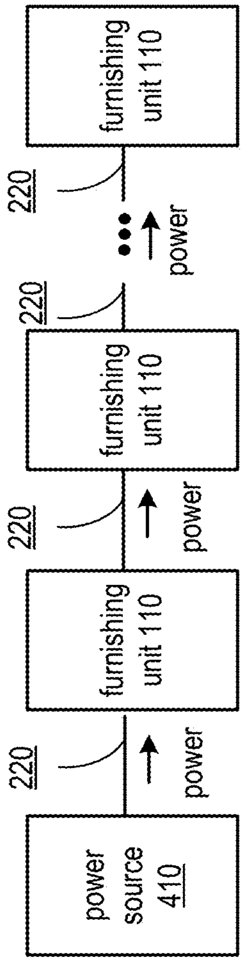
FIGS. 4A-4C are schematic block diagrams illustrating example power connections between members of a group of multiple furnishing units in accordance with various embodiments.
Figure 4C:
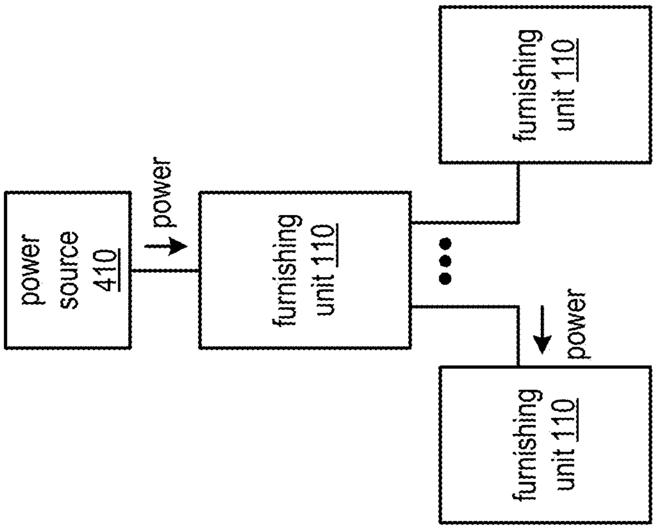
Figure 4A:
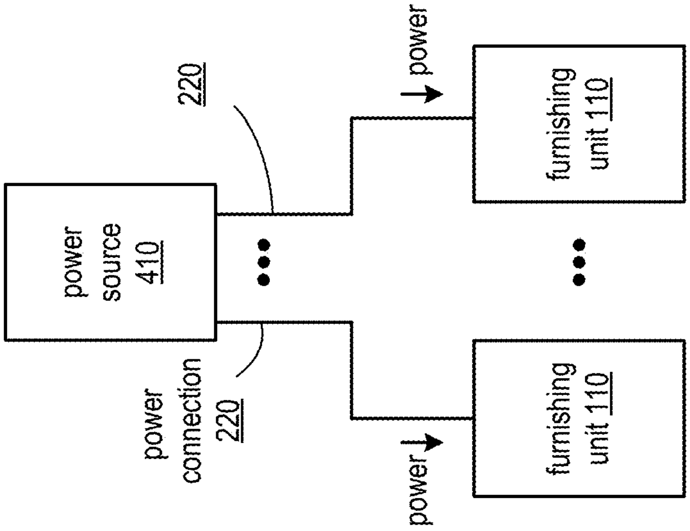
Figure 4D:
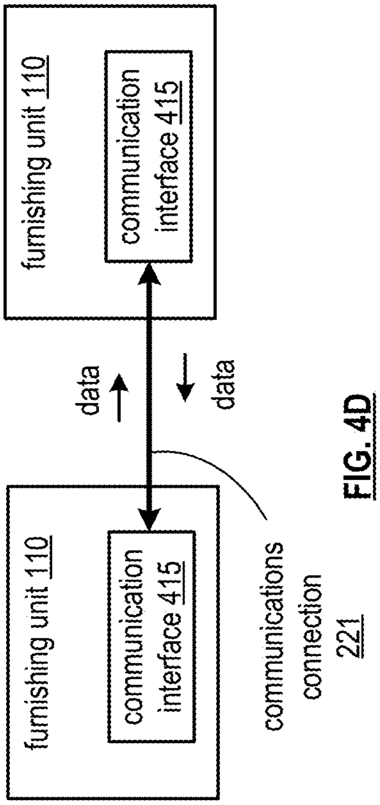
FIGS. 4D-4F are schematic block diagrams illustrating example communications connections between members of a group of multiple furnishing units in accordance with various embodiments.
Figure 4E:
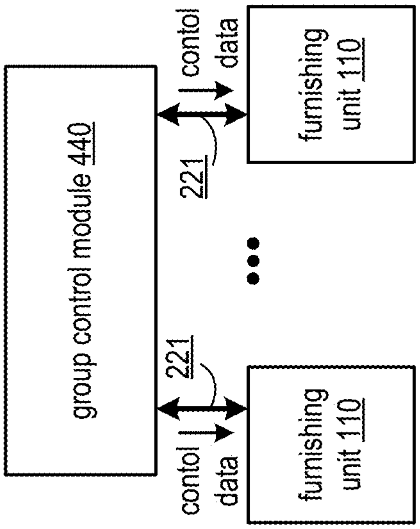
Figure 4F:
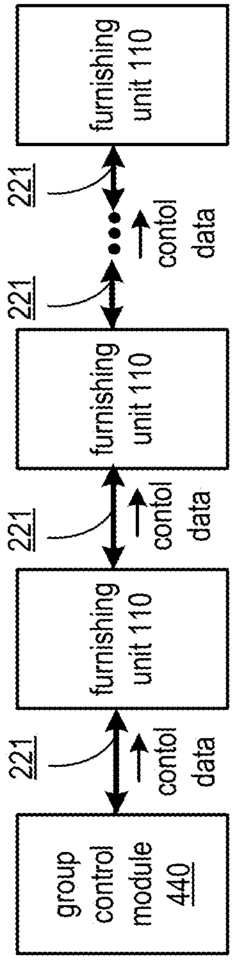
Figure 4G:
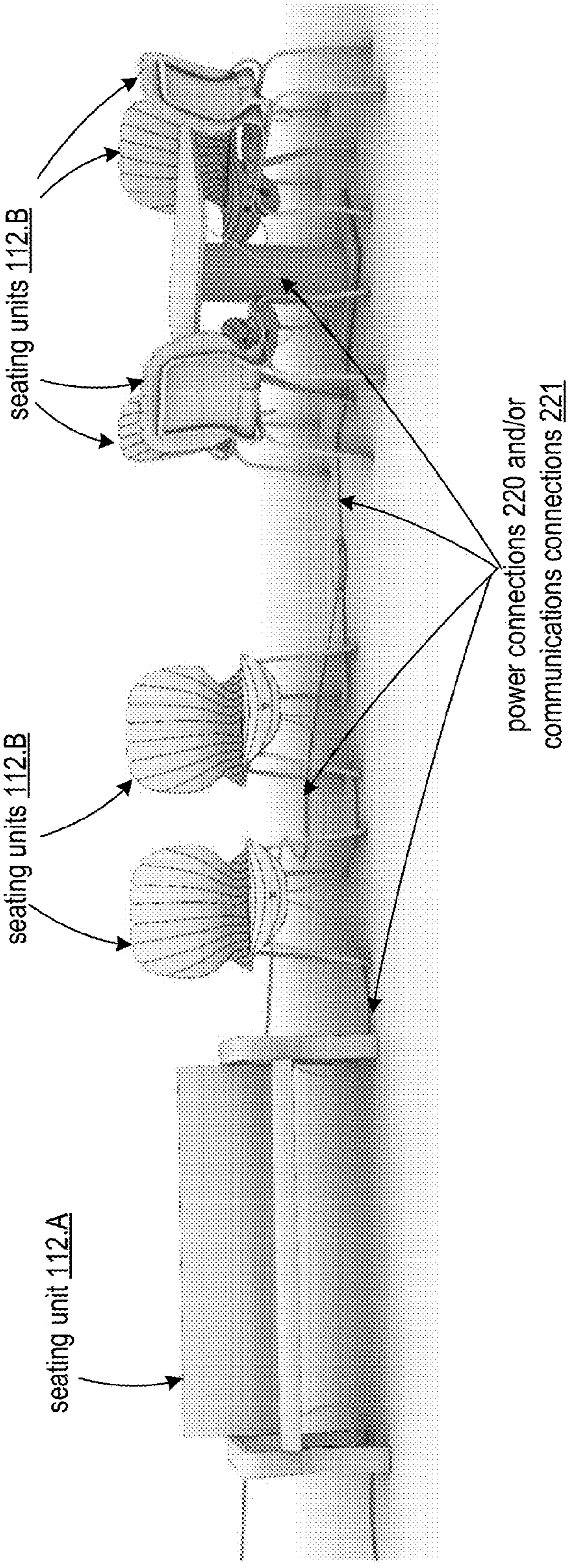
Figure 4H:
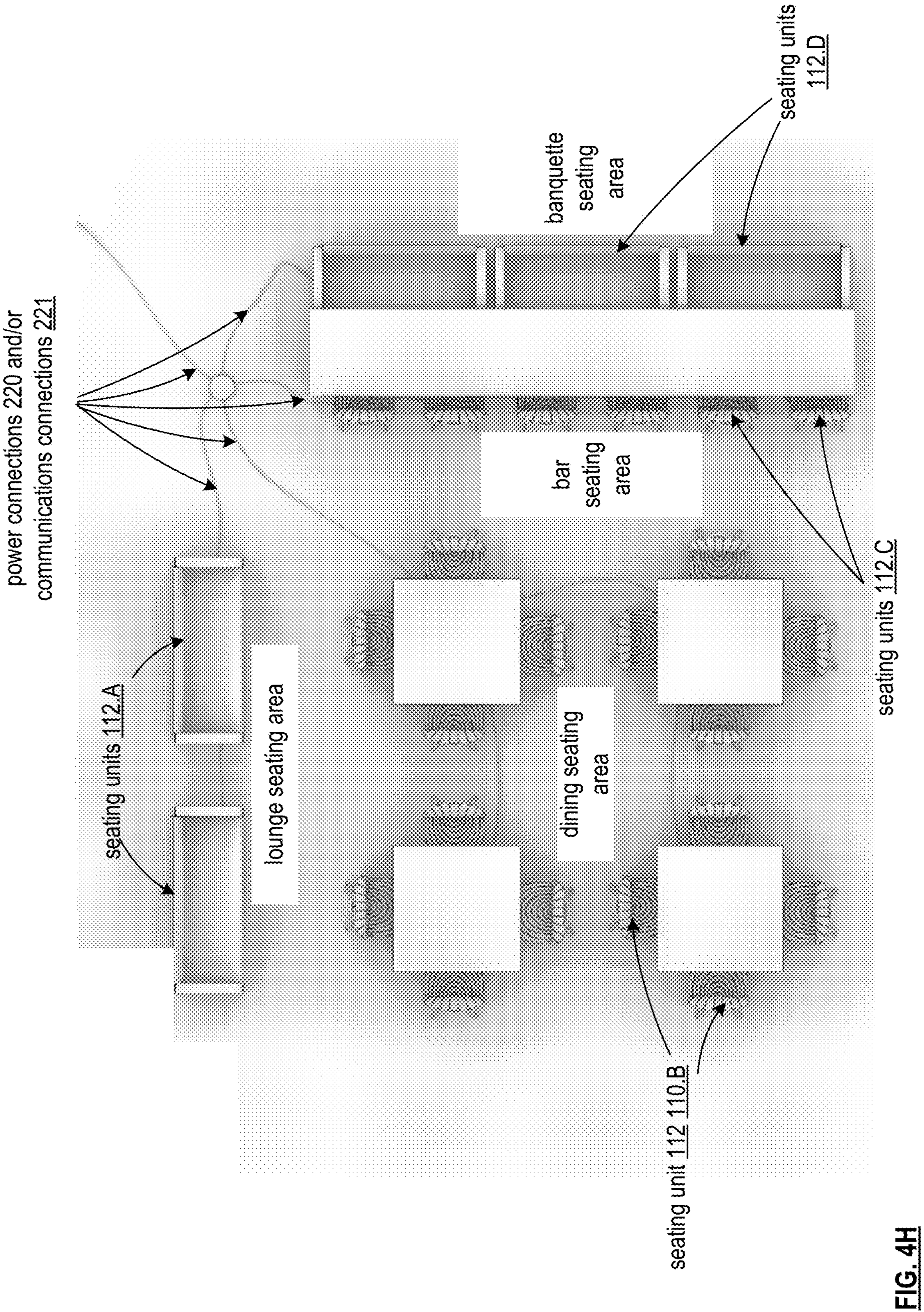
Figure 5A:
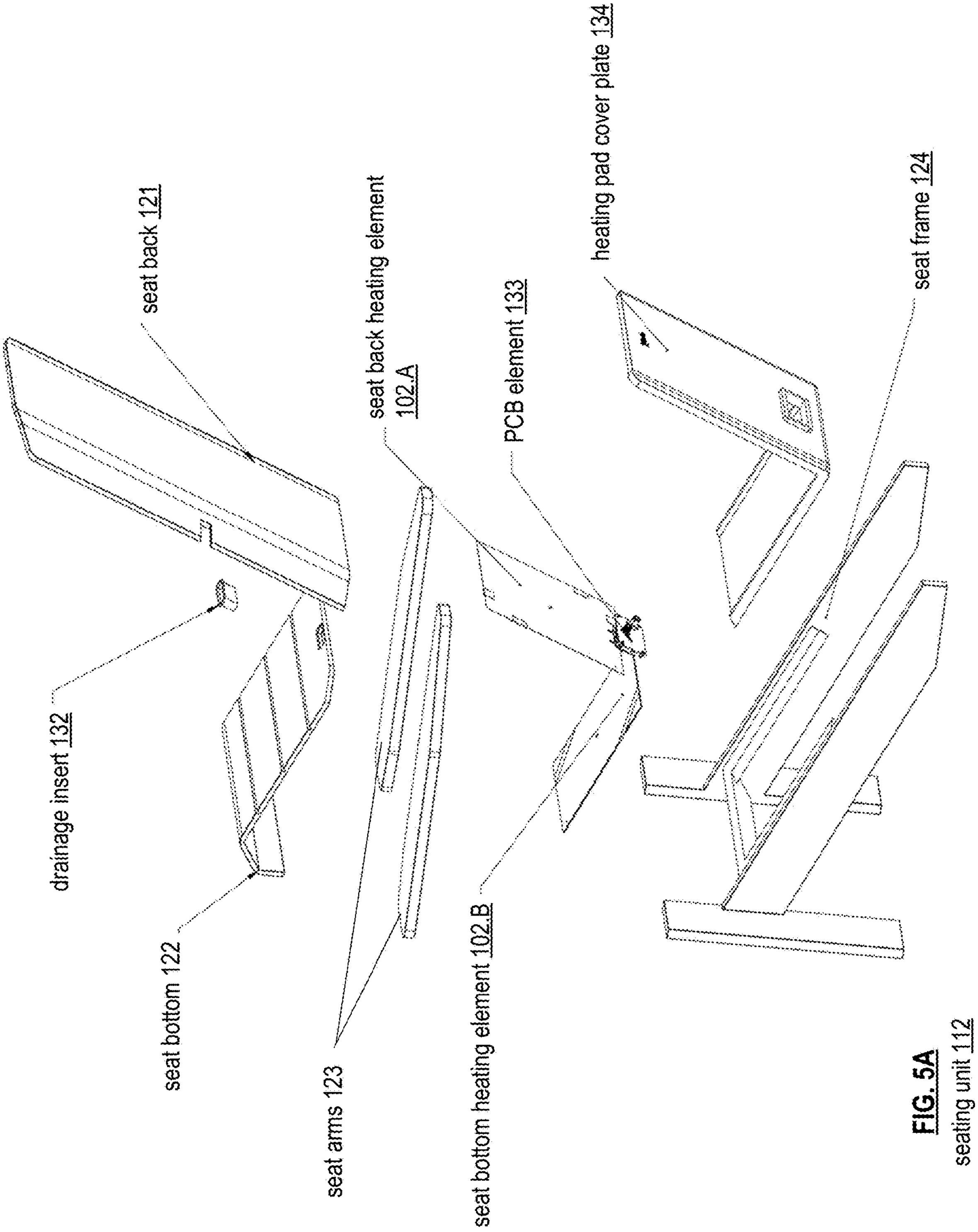
Figure 5B:
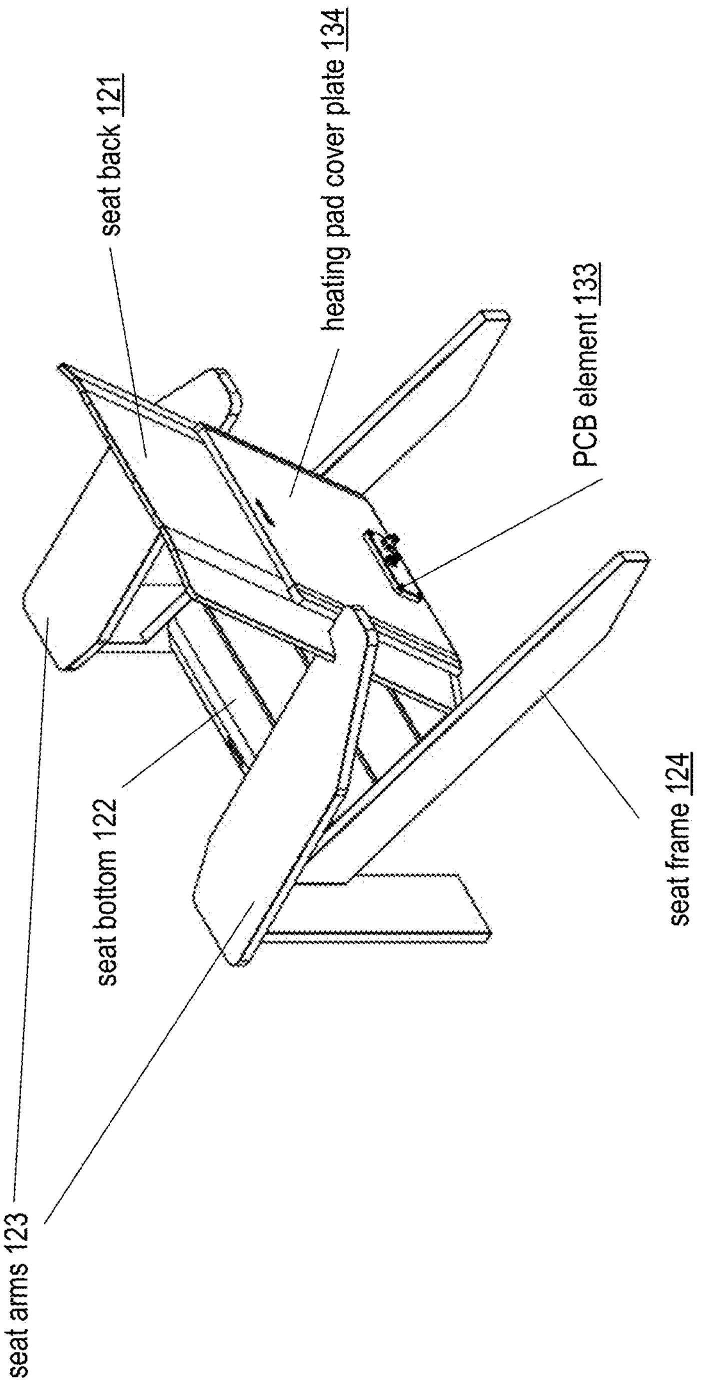
Figure 6A:
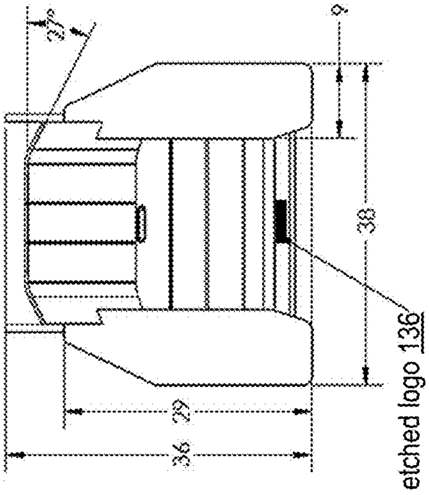
Figure 6B:
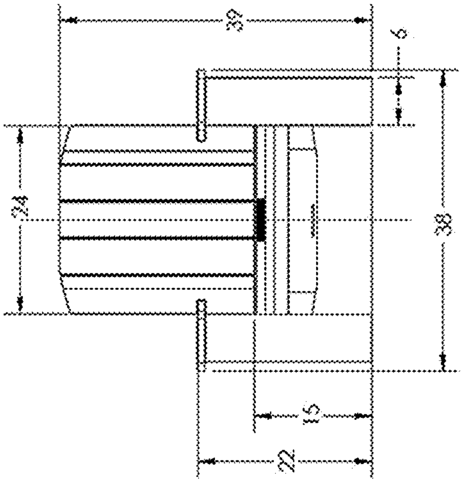
Figure 6C:
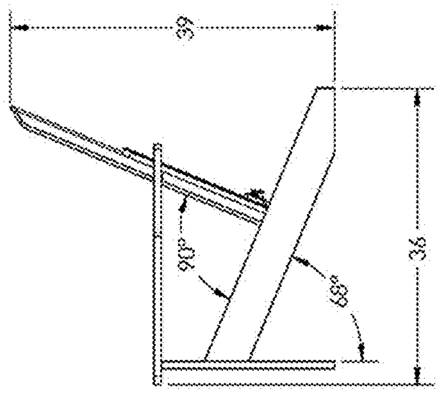
Figure 6D:
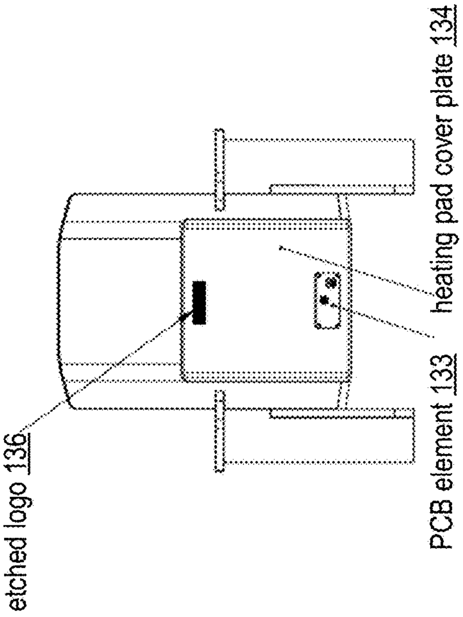
Figure 6F:
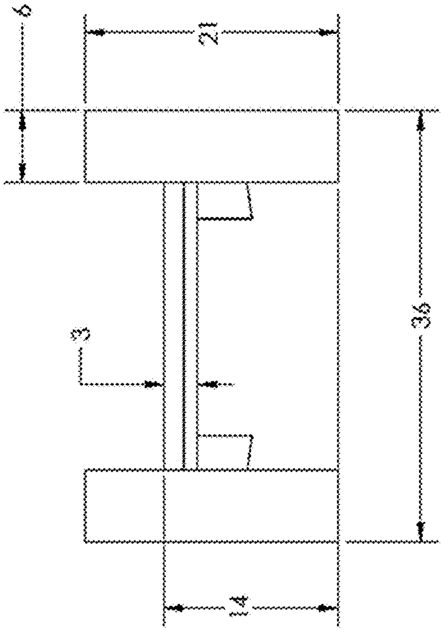
Figure 6H:
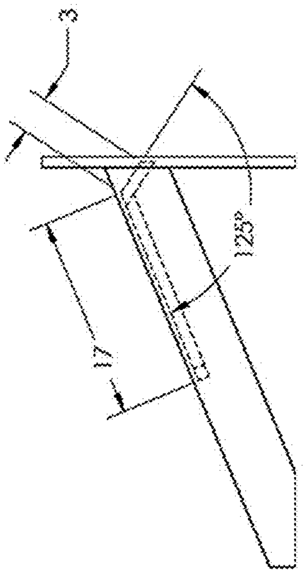
Figure 6E:
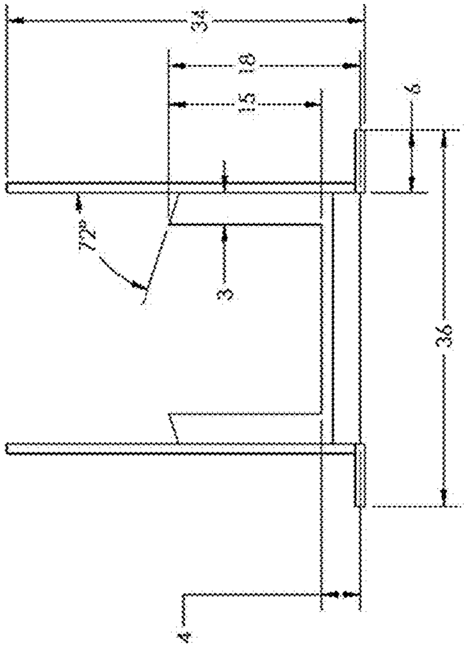
Figure 6G:
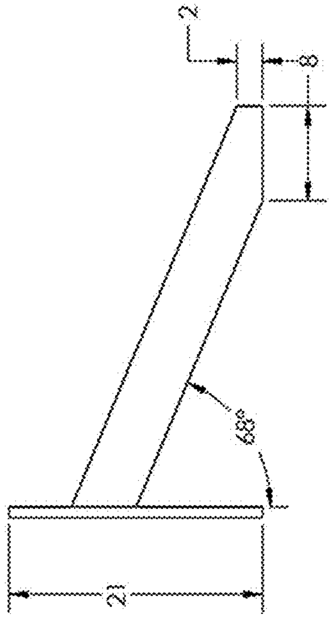
Figure 6I:
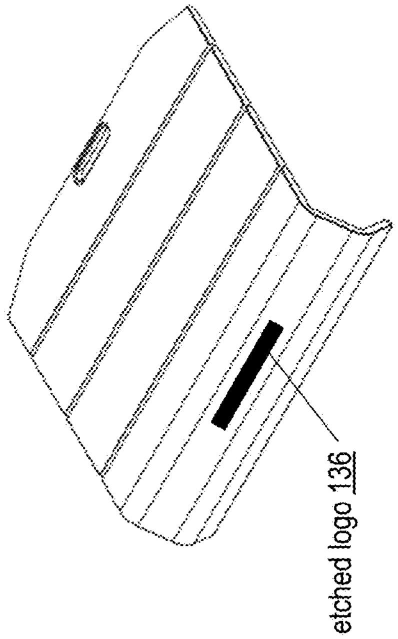
Figure 6J:
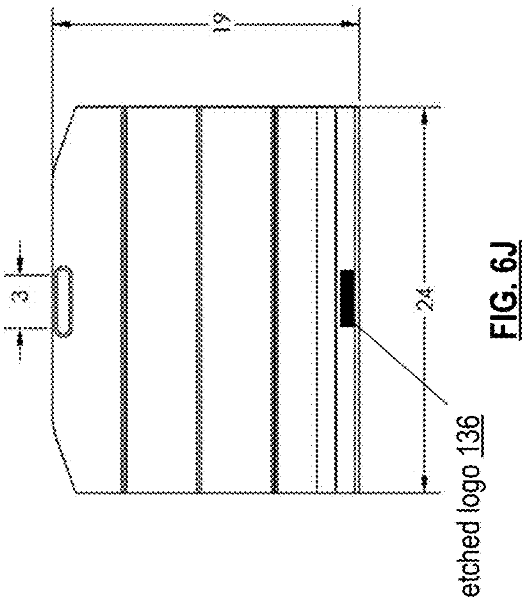
Figure 6K:
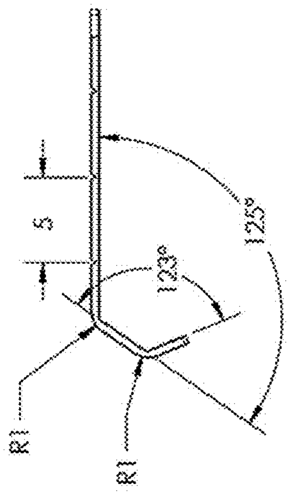
Figure 6L:
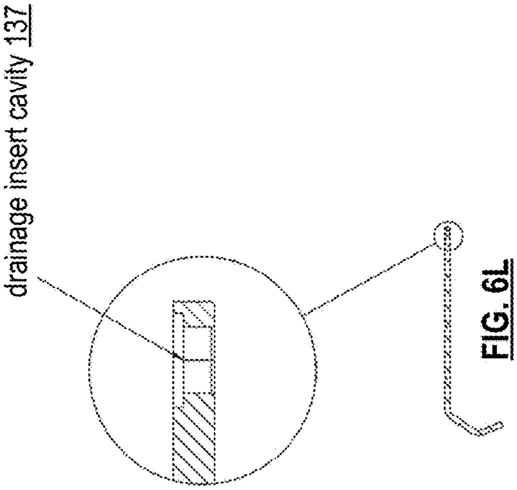
Figure 6P:
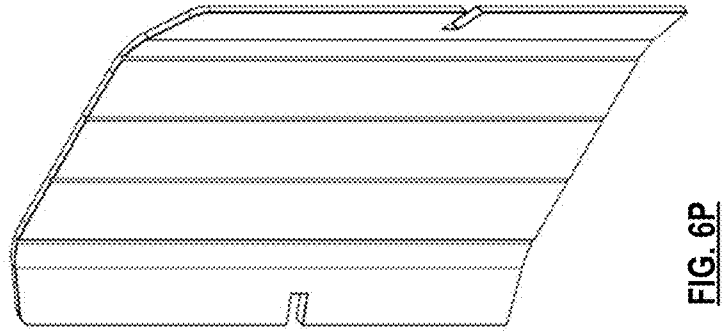
Figure 6N:
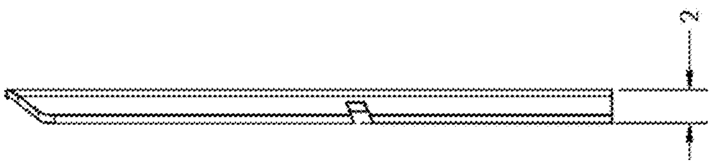
Figure 6M:
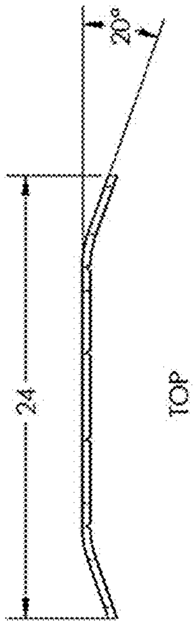
Figure 6O:
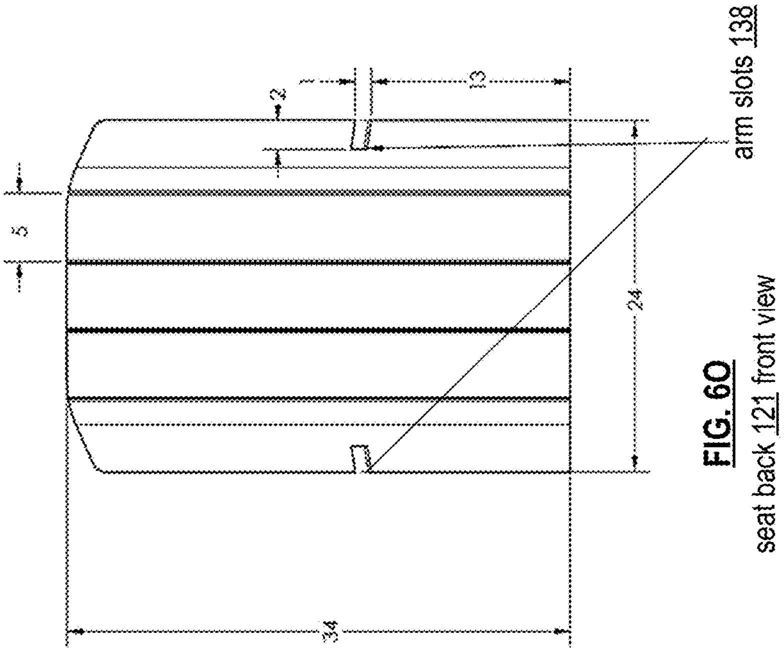
Figure 6Q:
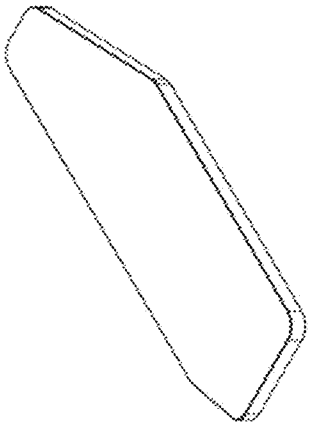
Figure 6R:
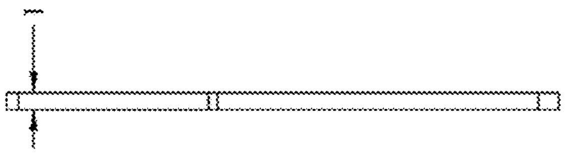
Figure 6S:
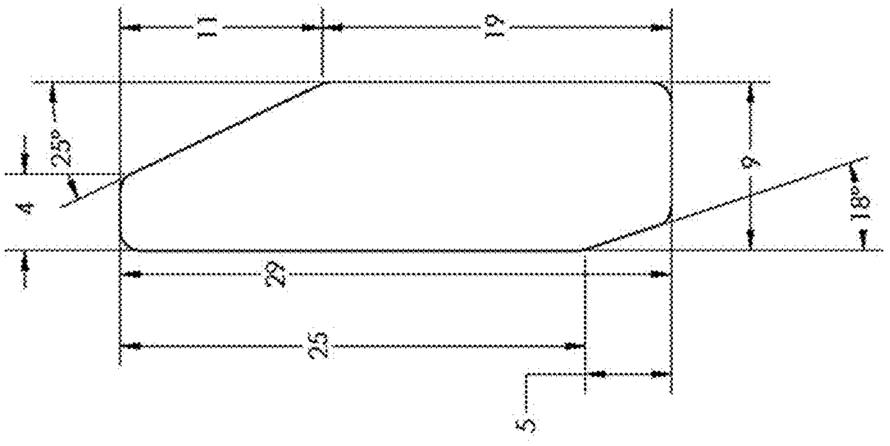
Figure 6T:
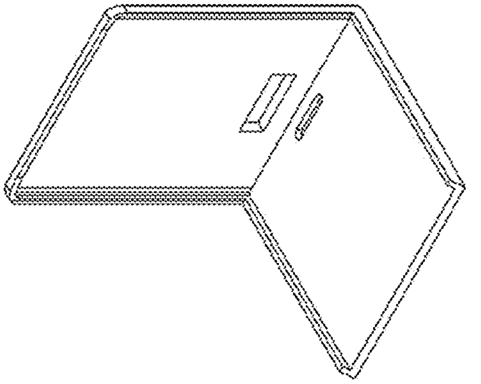
Figure 6U:
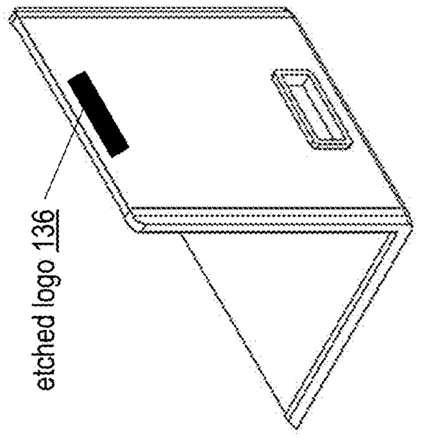
Figure 6V:
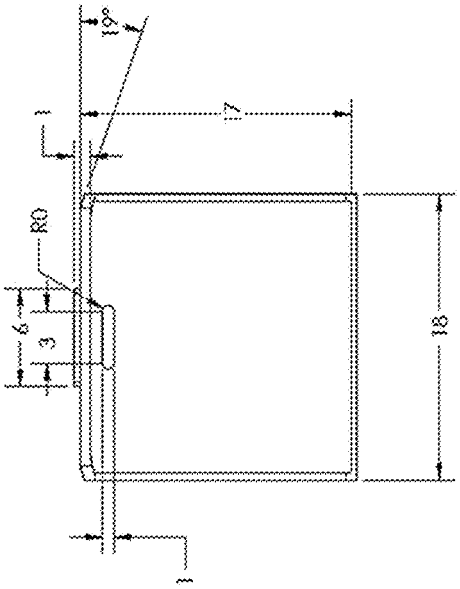
Figure 6W:
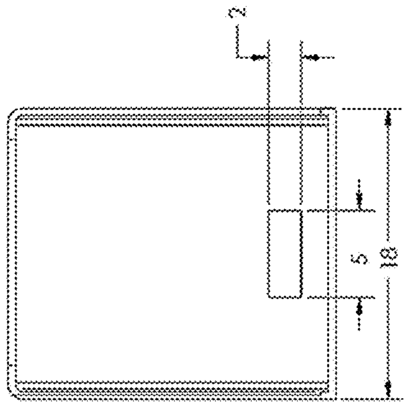
Figure 6X:
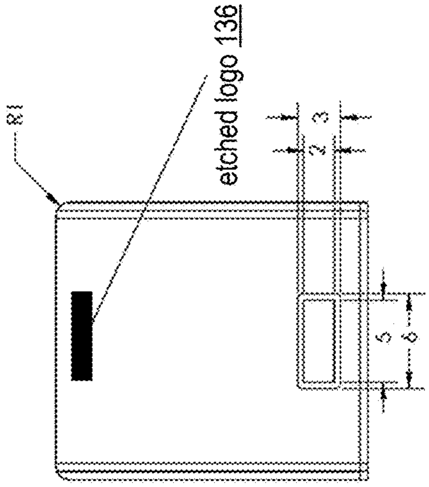
Figure 6Y:
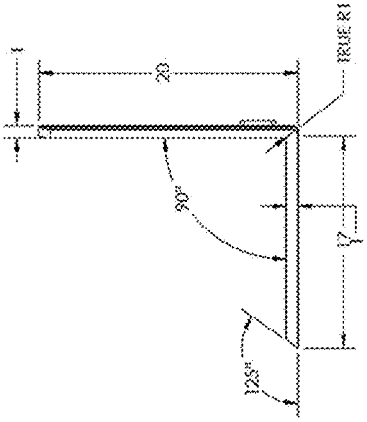
Figure 7A:
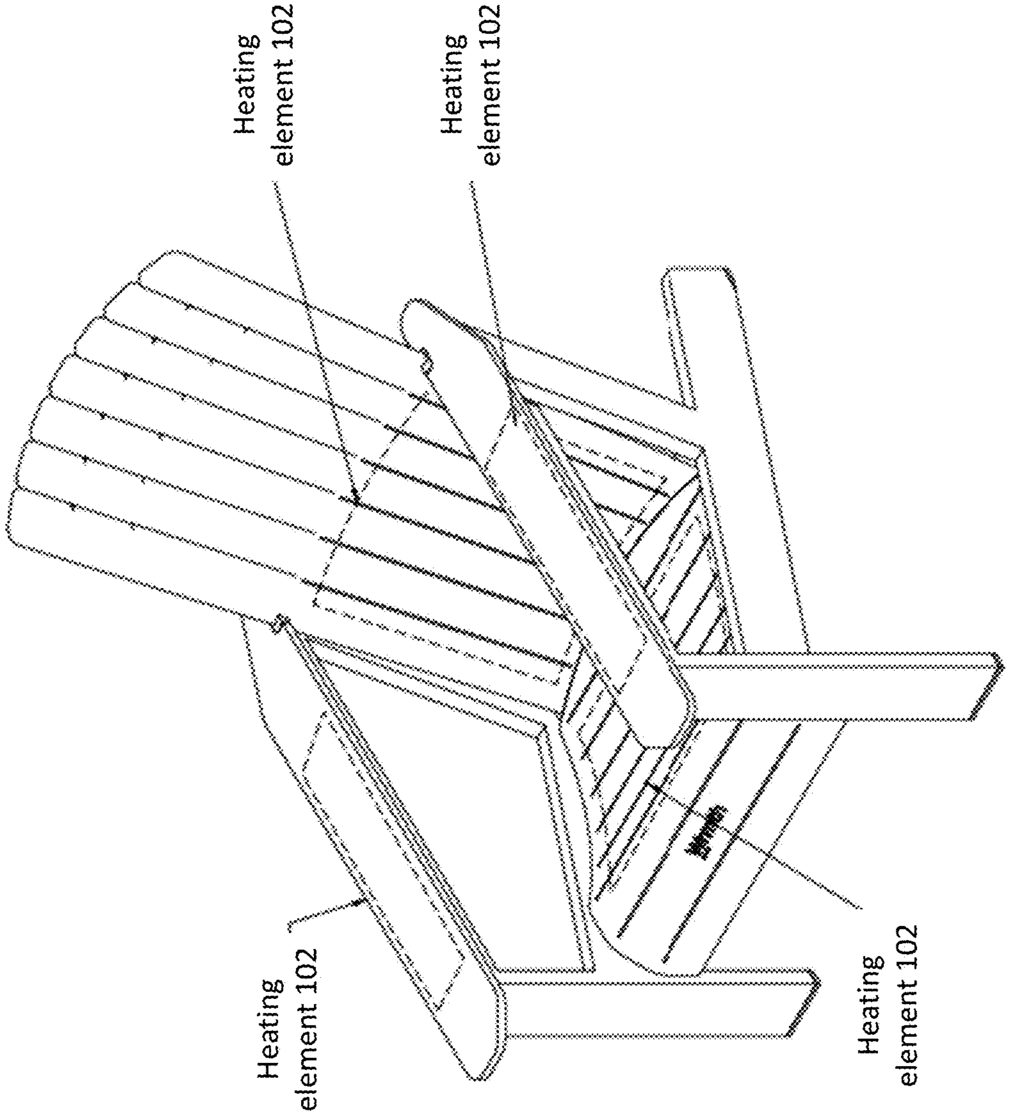
Figure 7B:
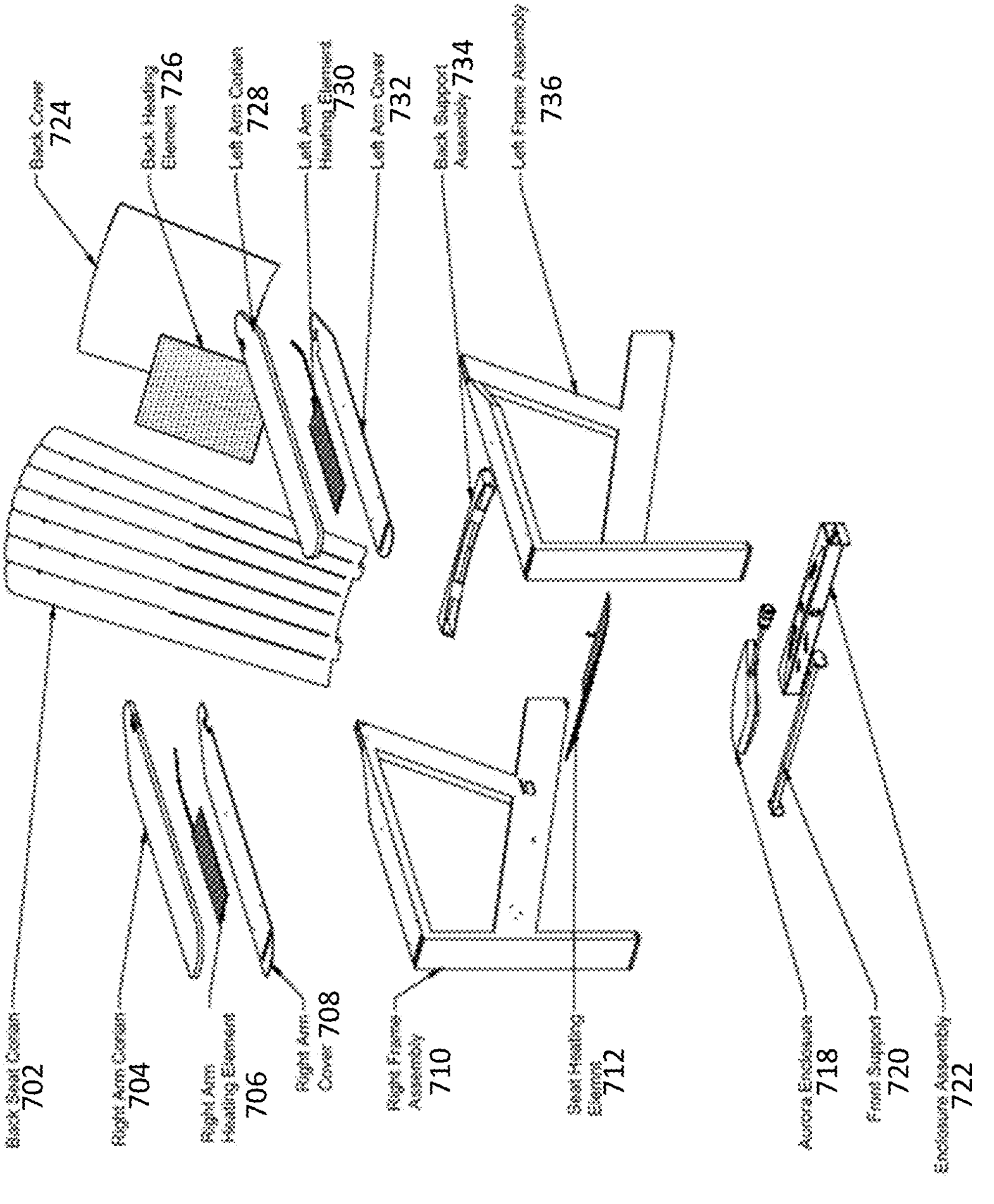
Figure 7C:
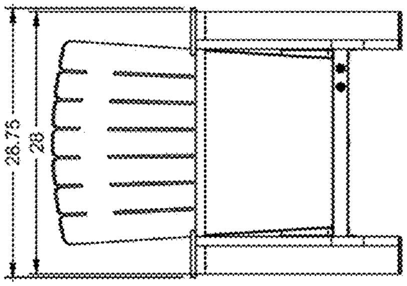
Figure 7D:
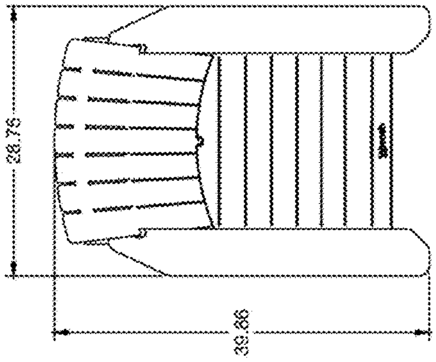
Figure 7E:
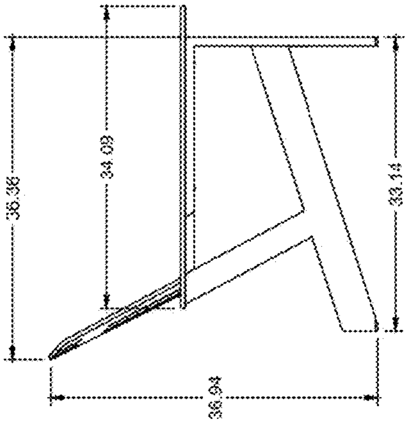
Figure 7F:
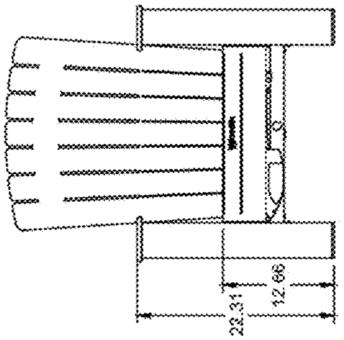
Figure 7G:
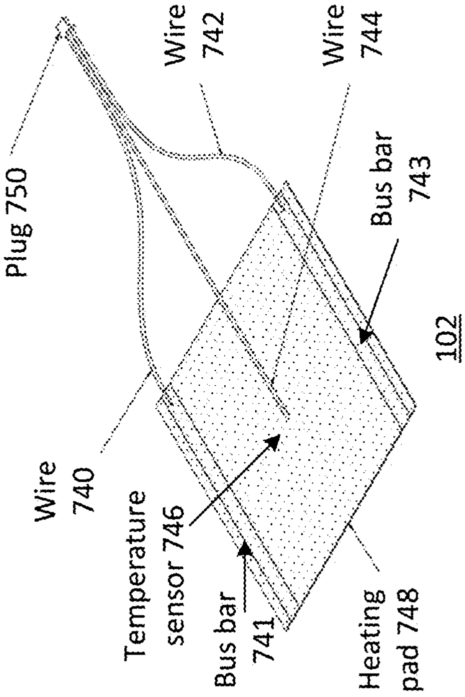
Figure 8A:
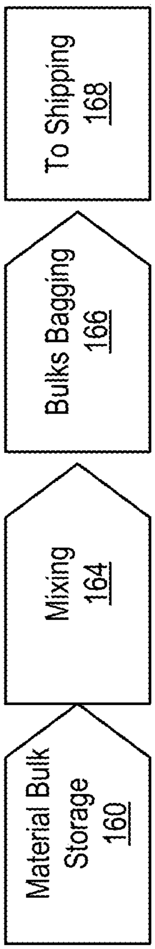
Figure 8B:
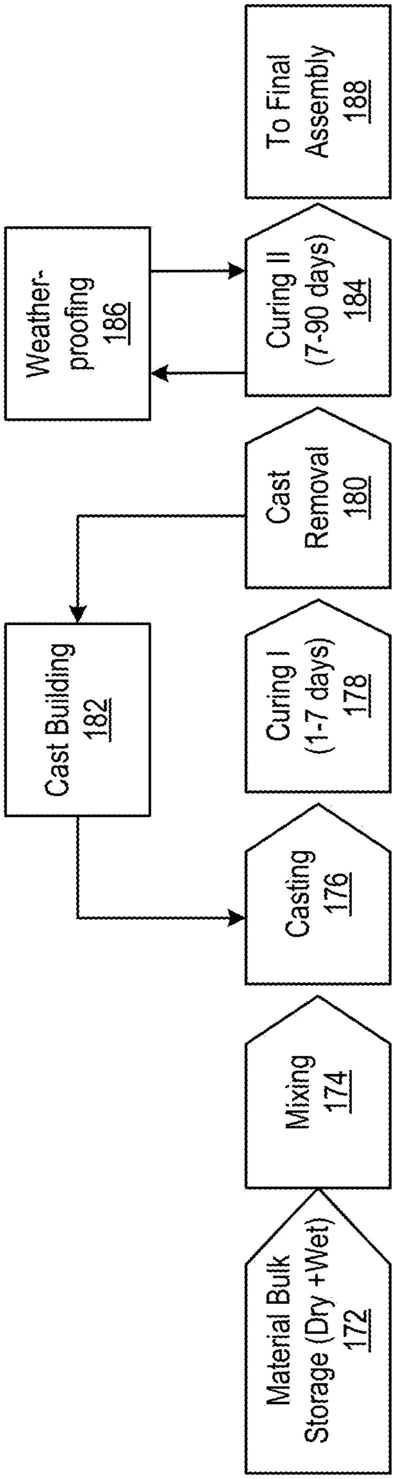
Figure 9:
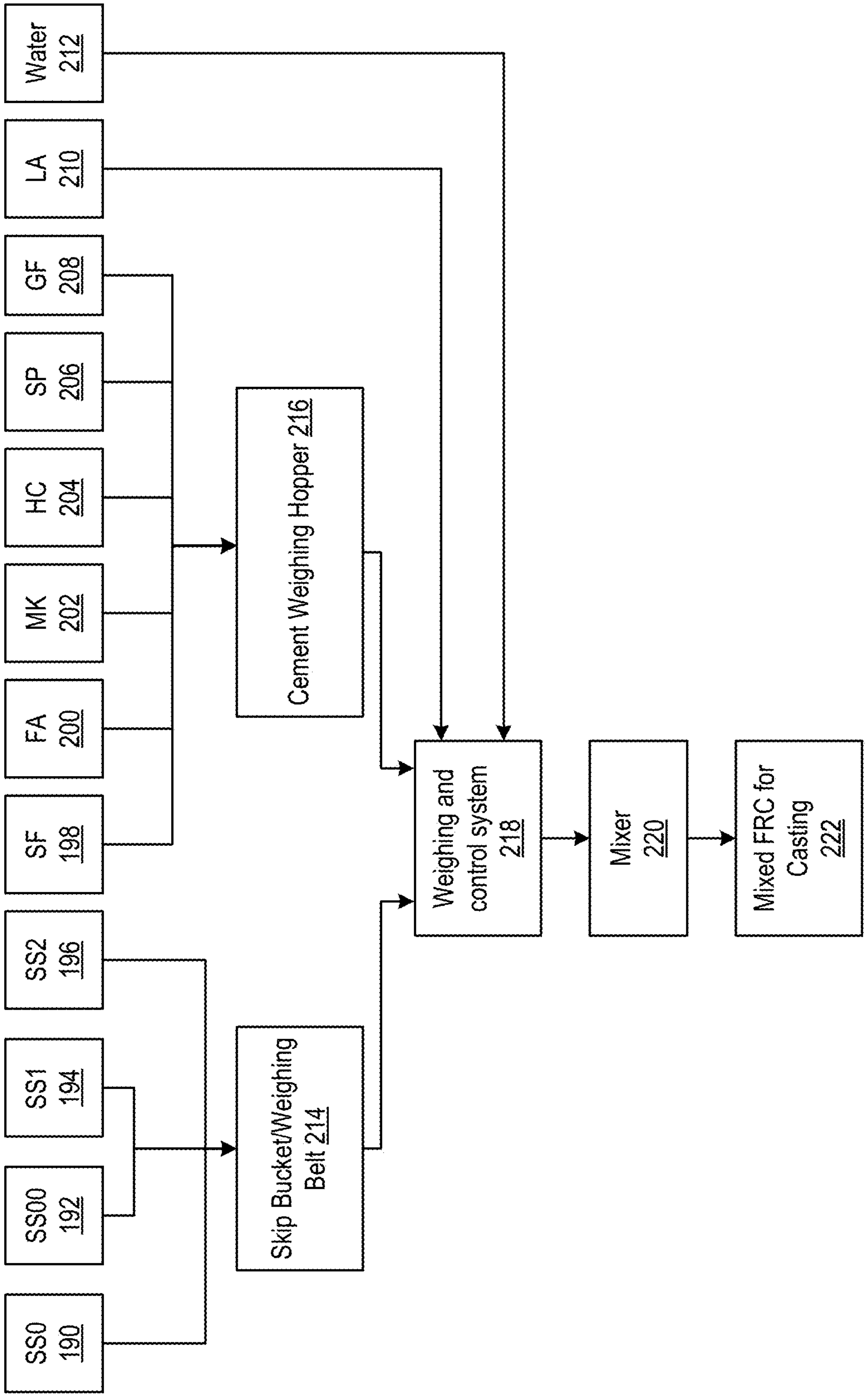
Figure 12:
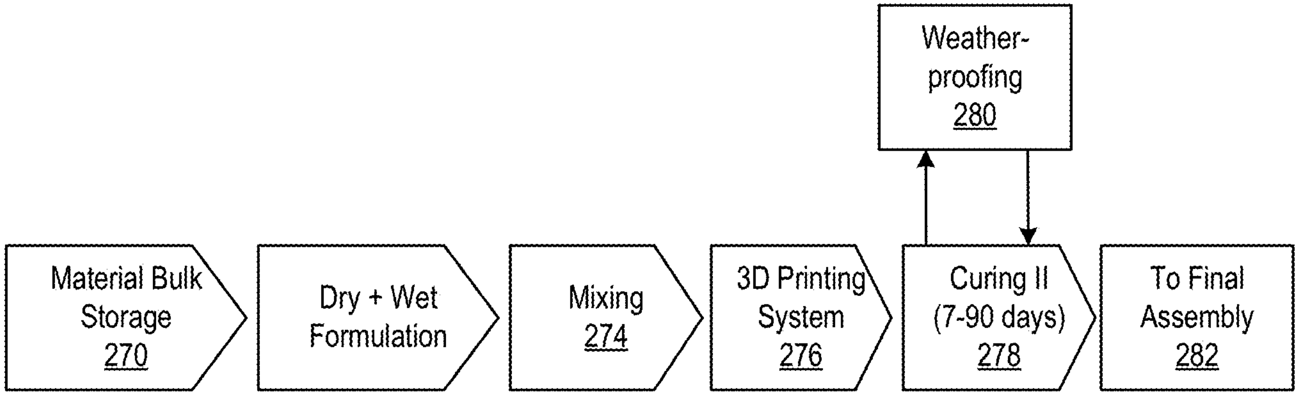
Figure 14:
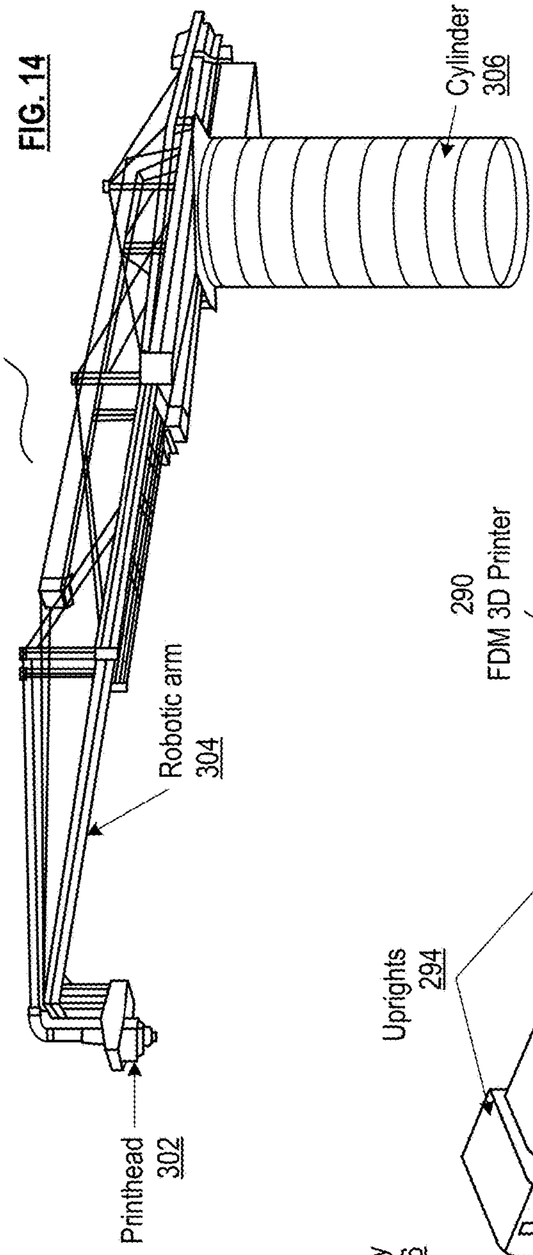
Figure 13:
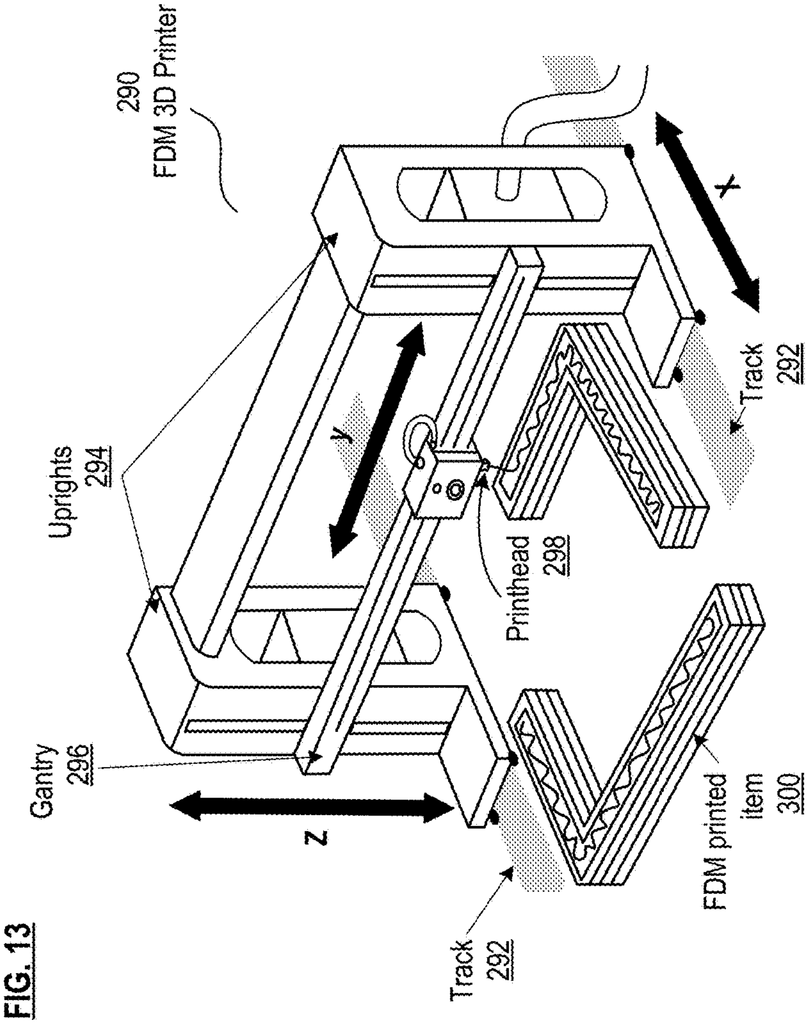
Figure 15:
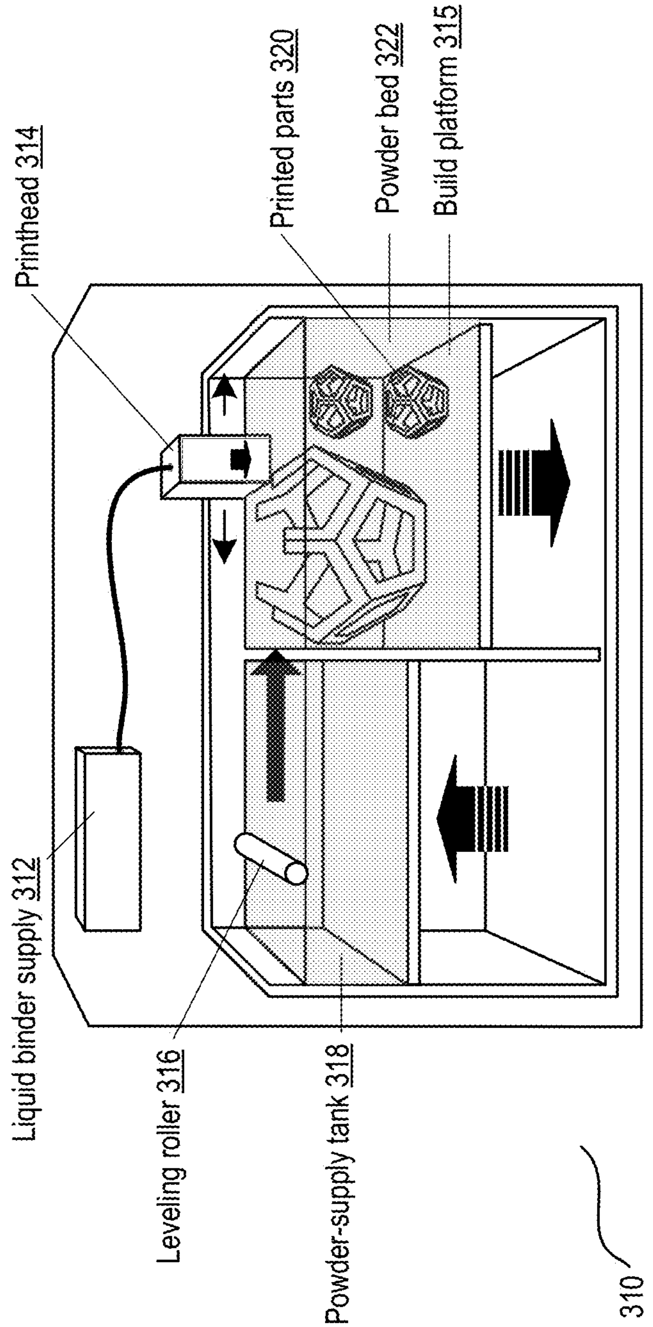
Figure 16:
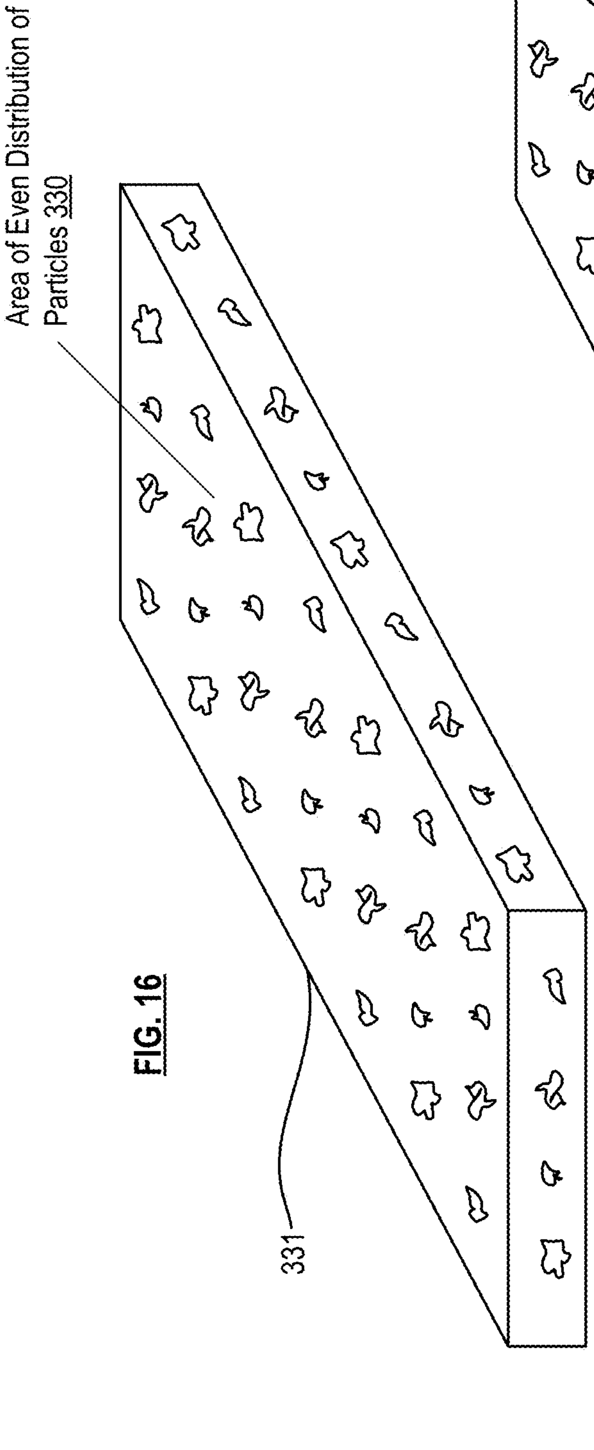
Figure 17:
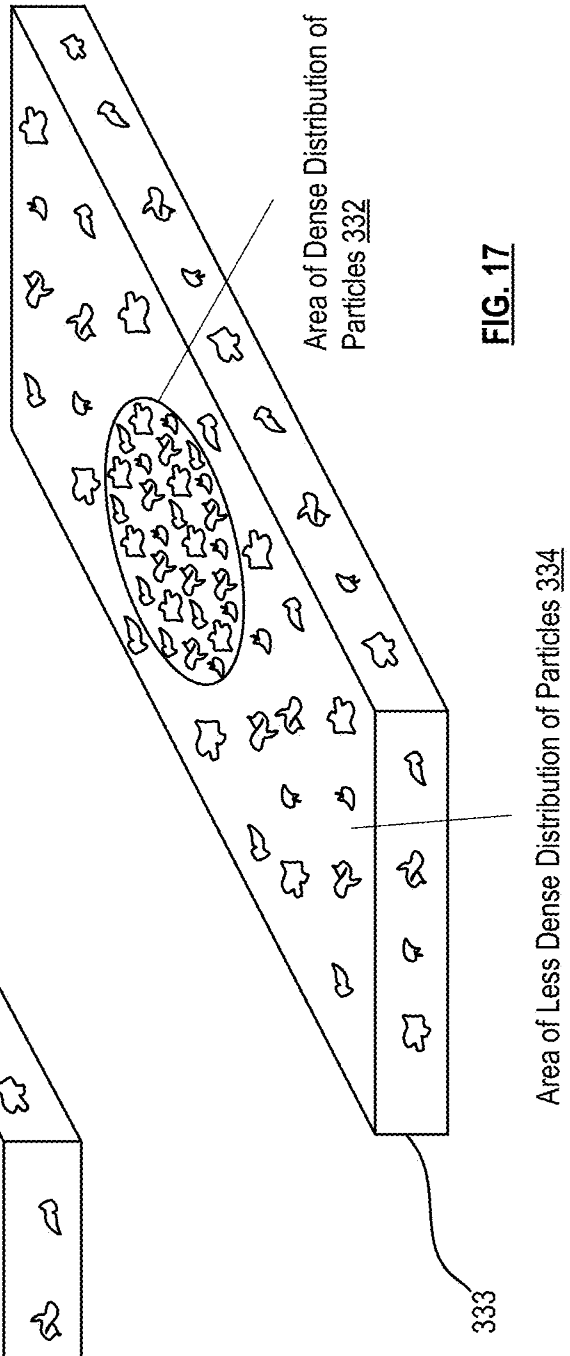
Figure 18:
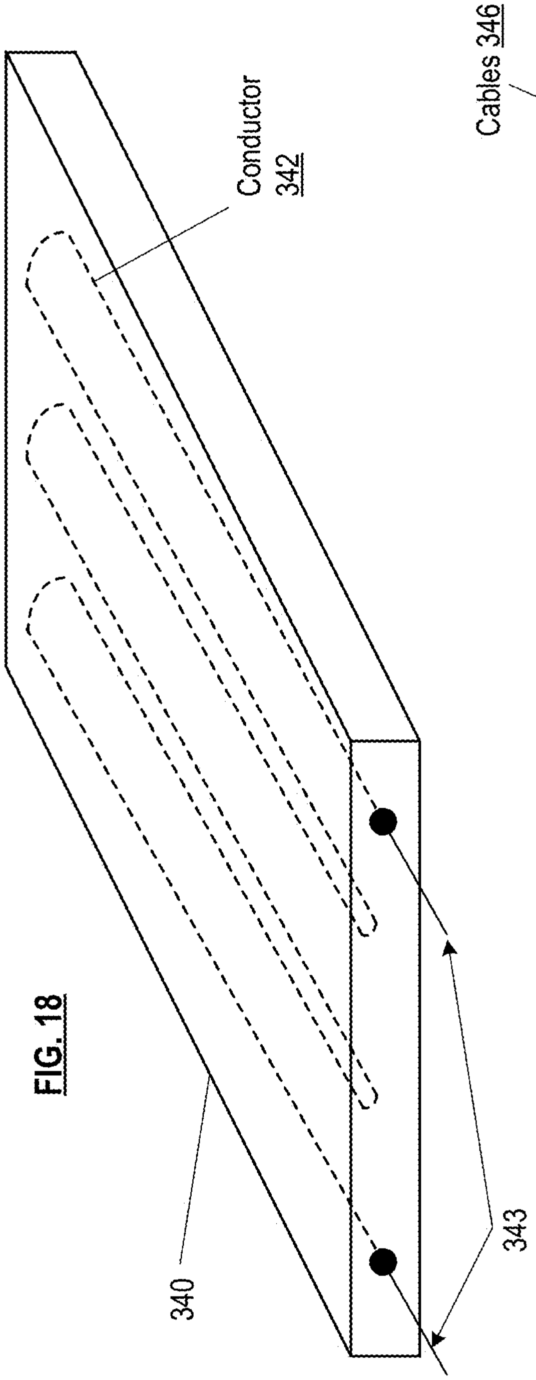
Figure 19:
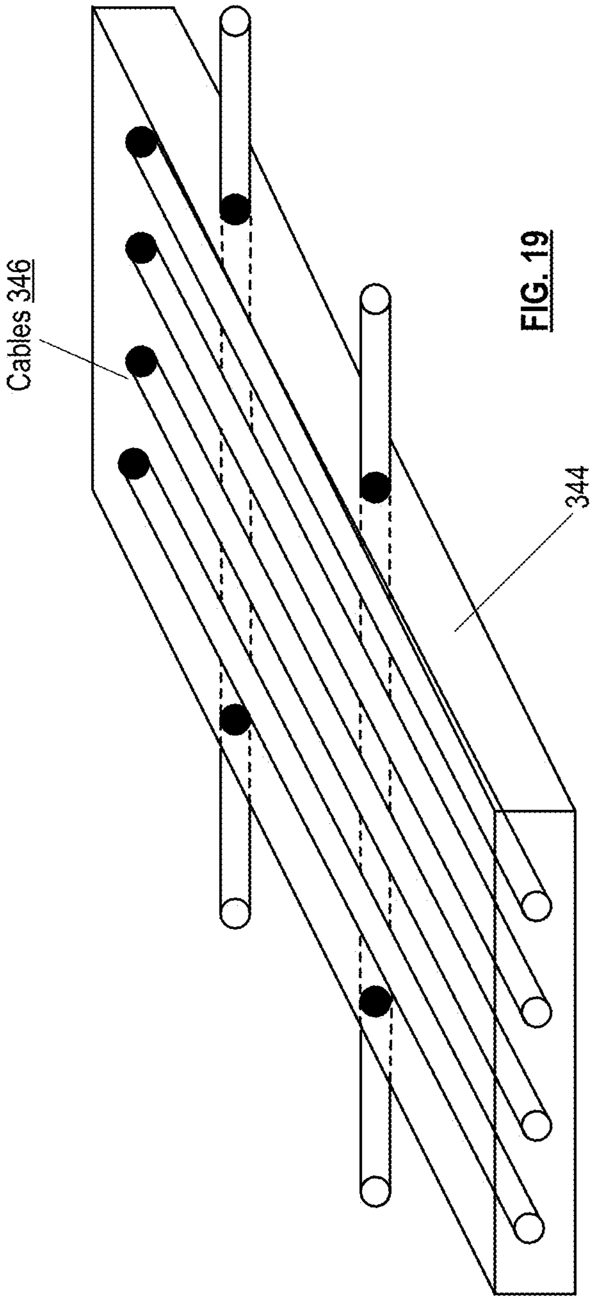
Figure 20:
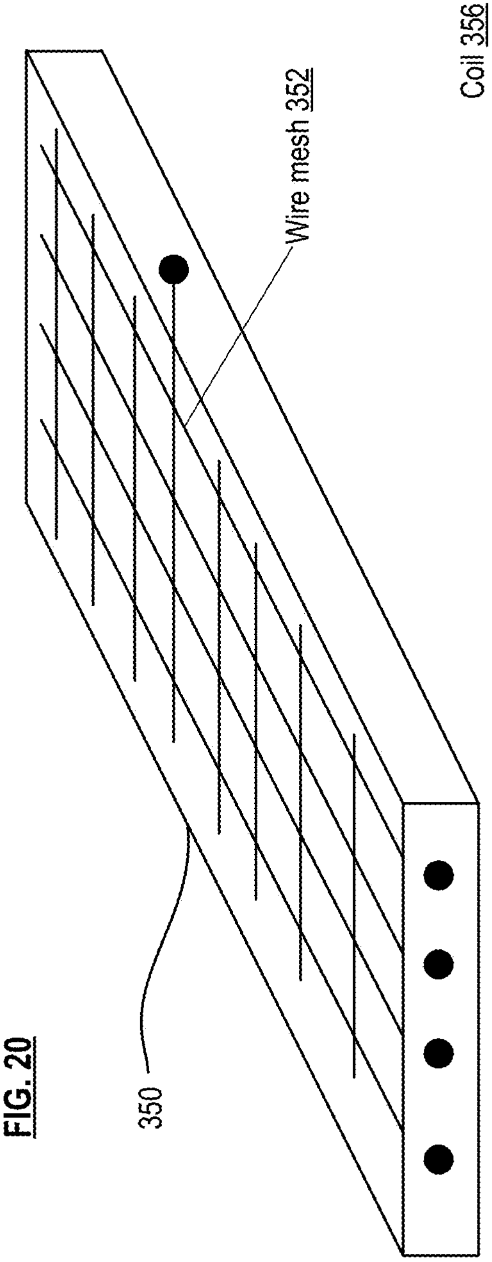
Figure 21:
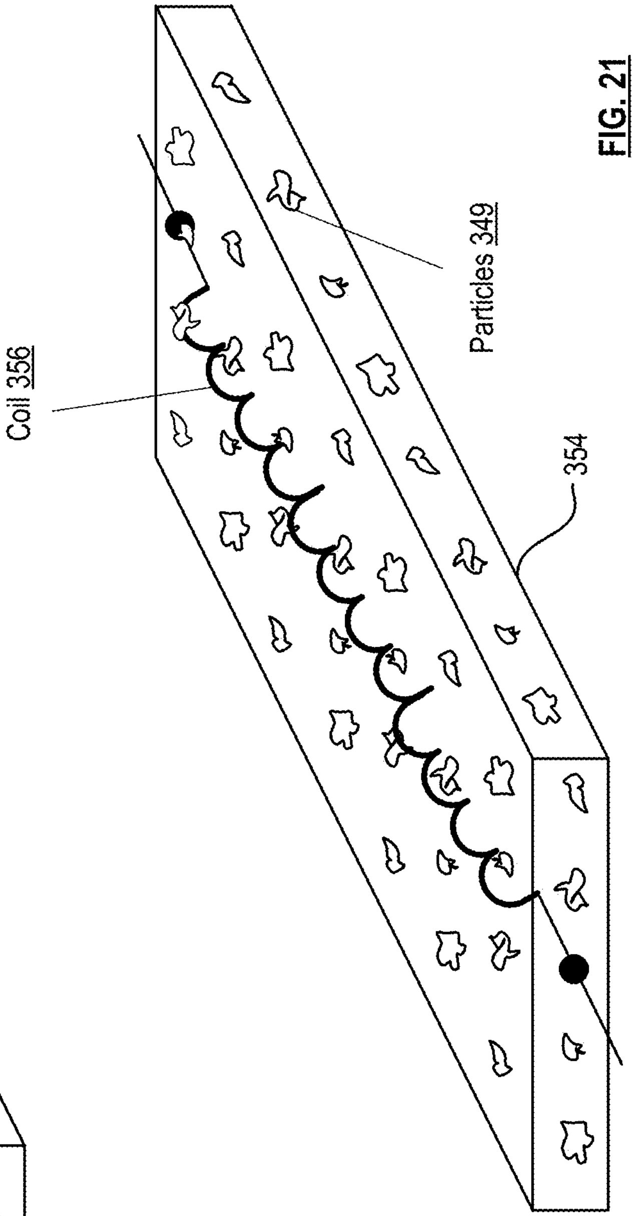
Figure 22:
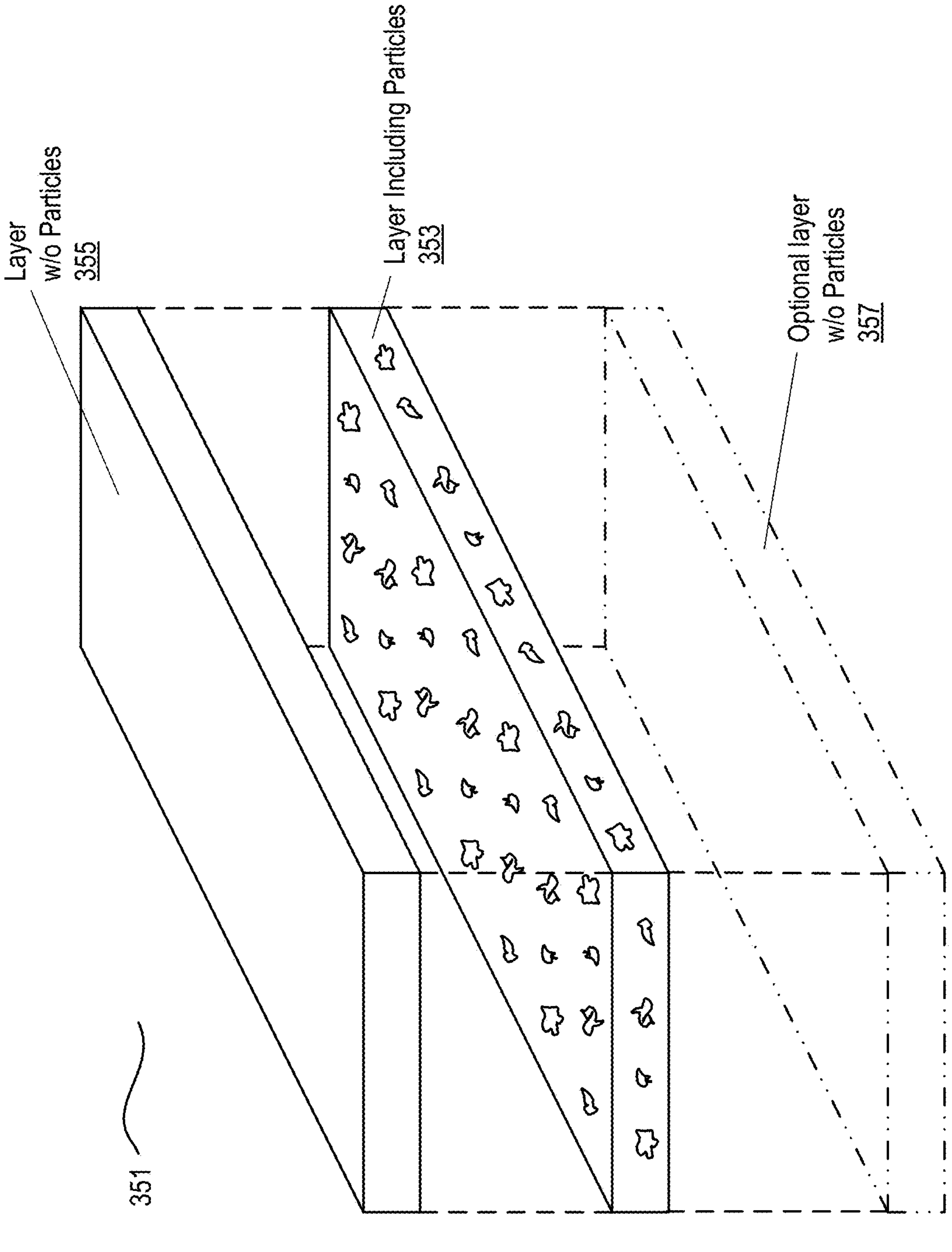
Figure 24:
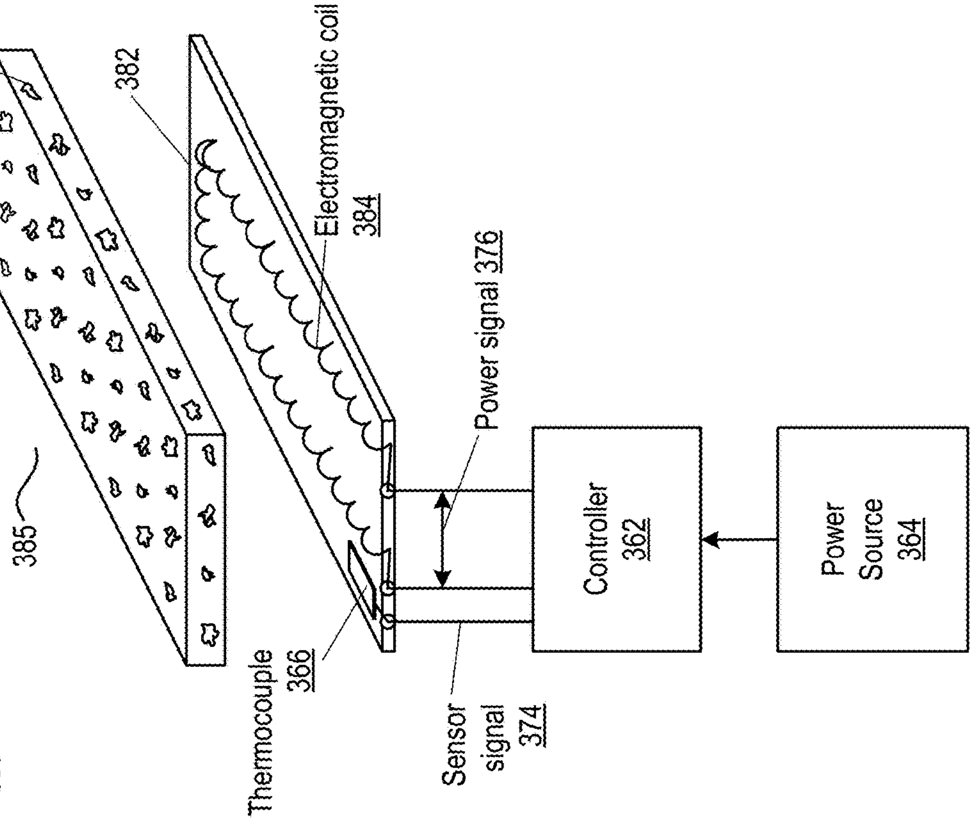
Figure 23:
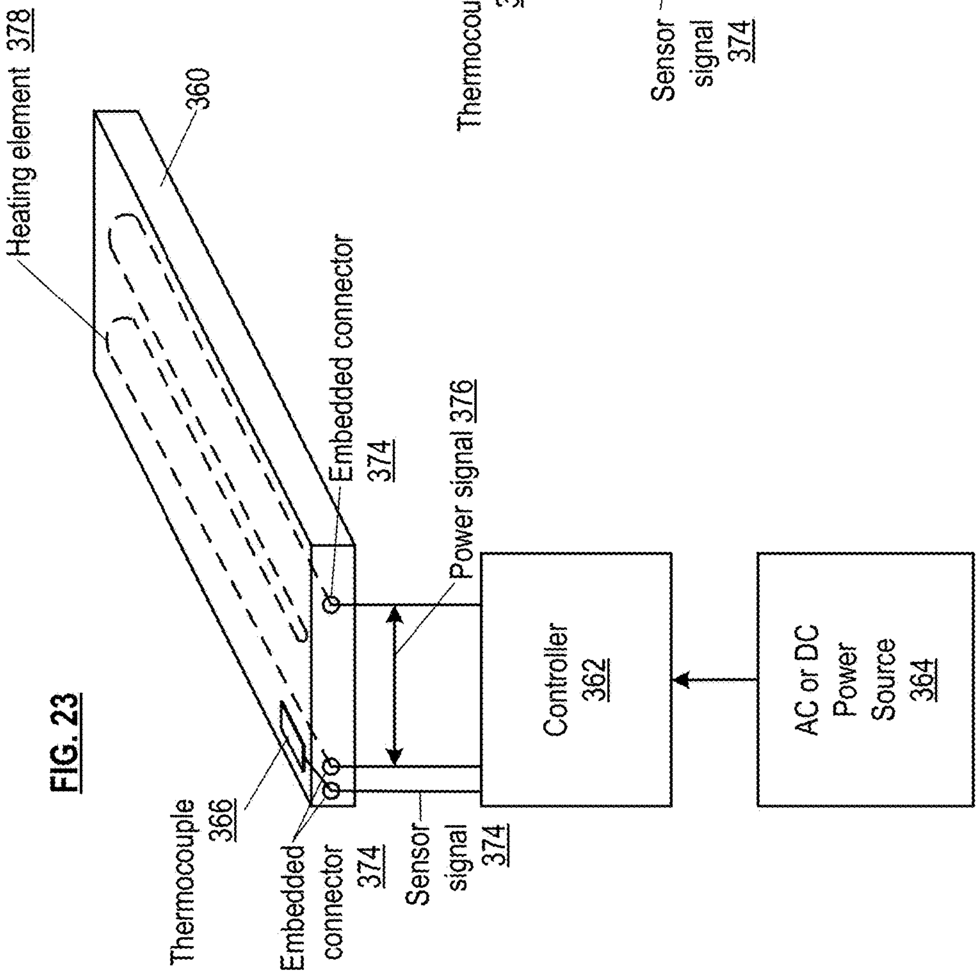
Figure 25:
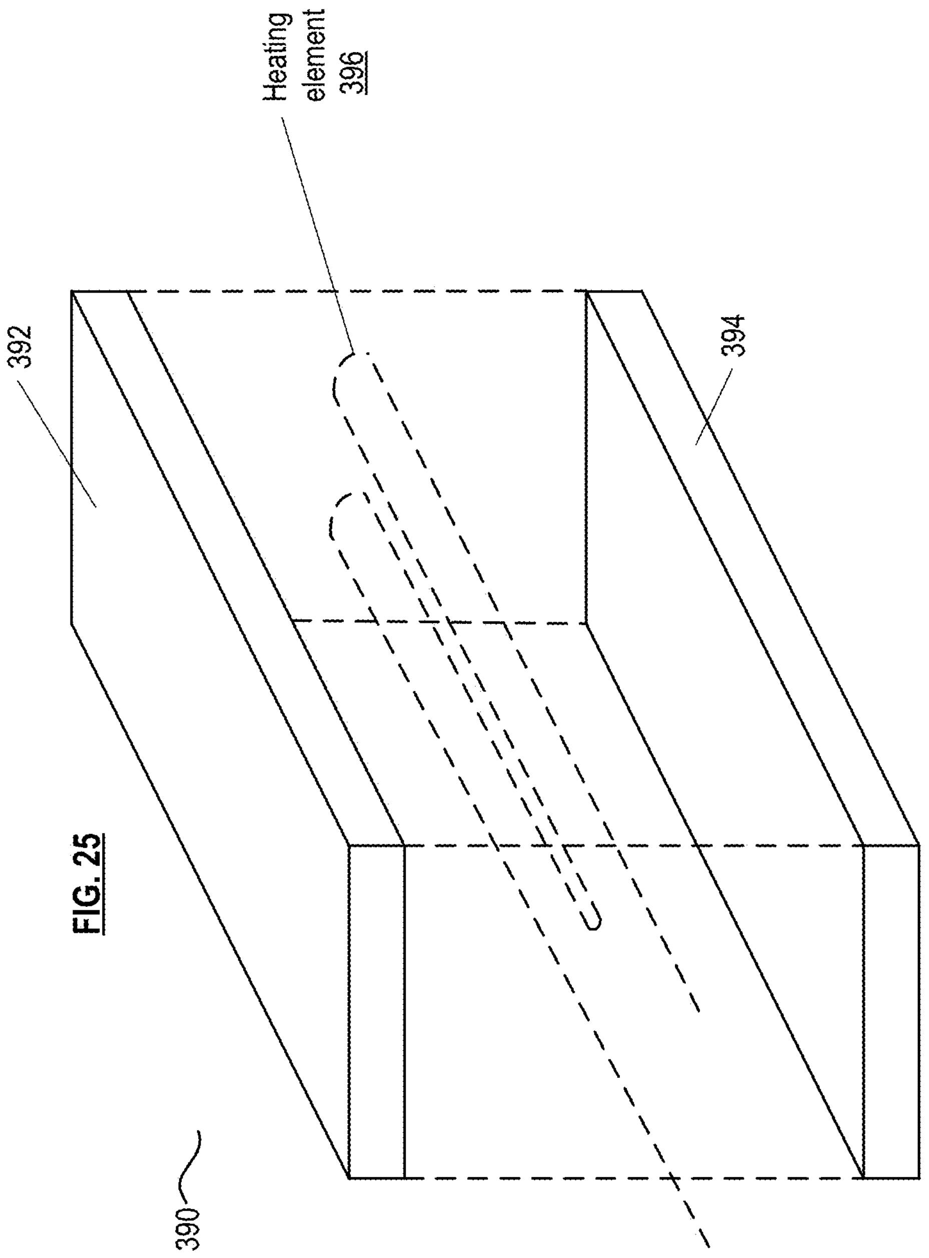
Figure 26:
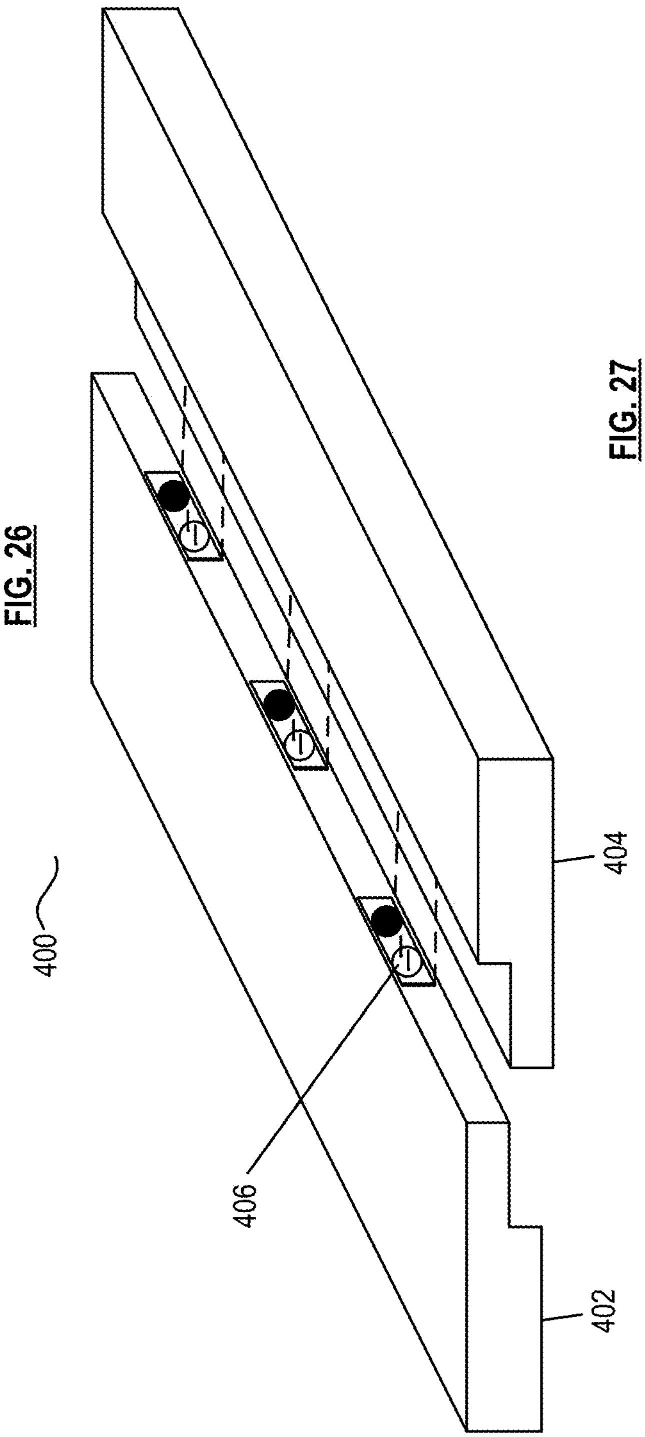
Figure 27:
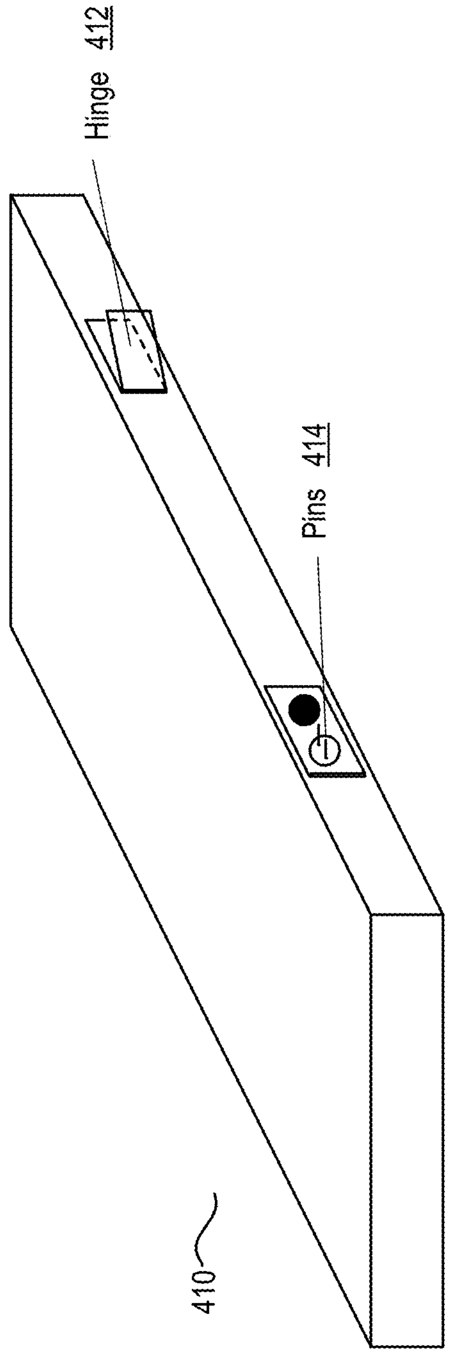
Figure 28:
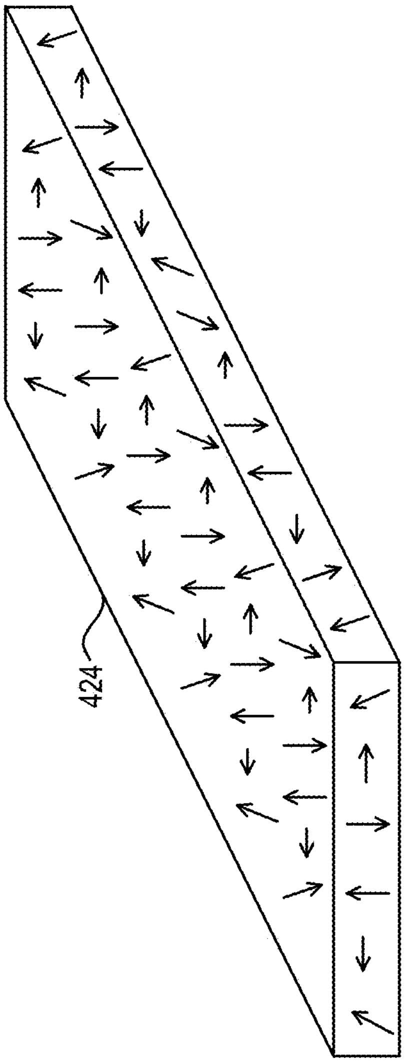
Figure 29:
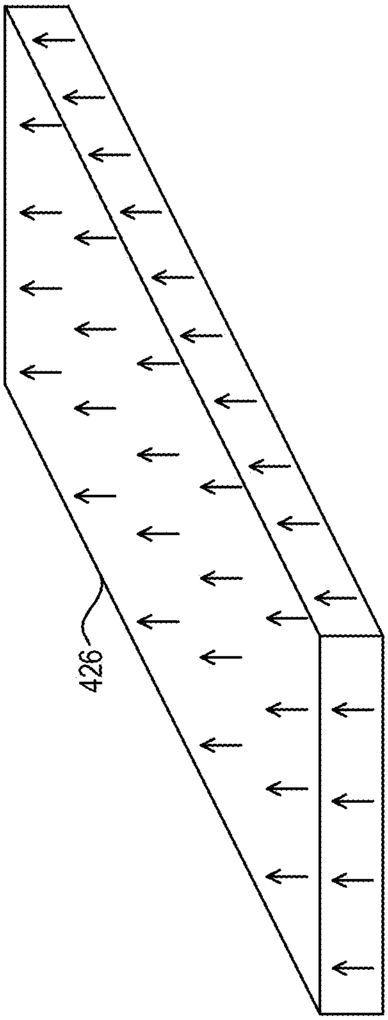
Figure 31A:
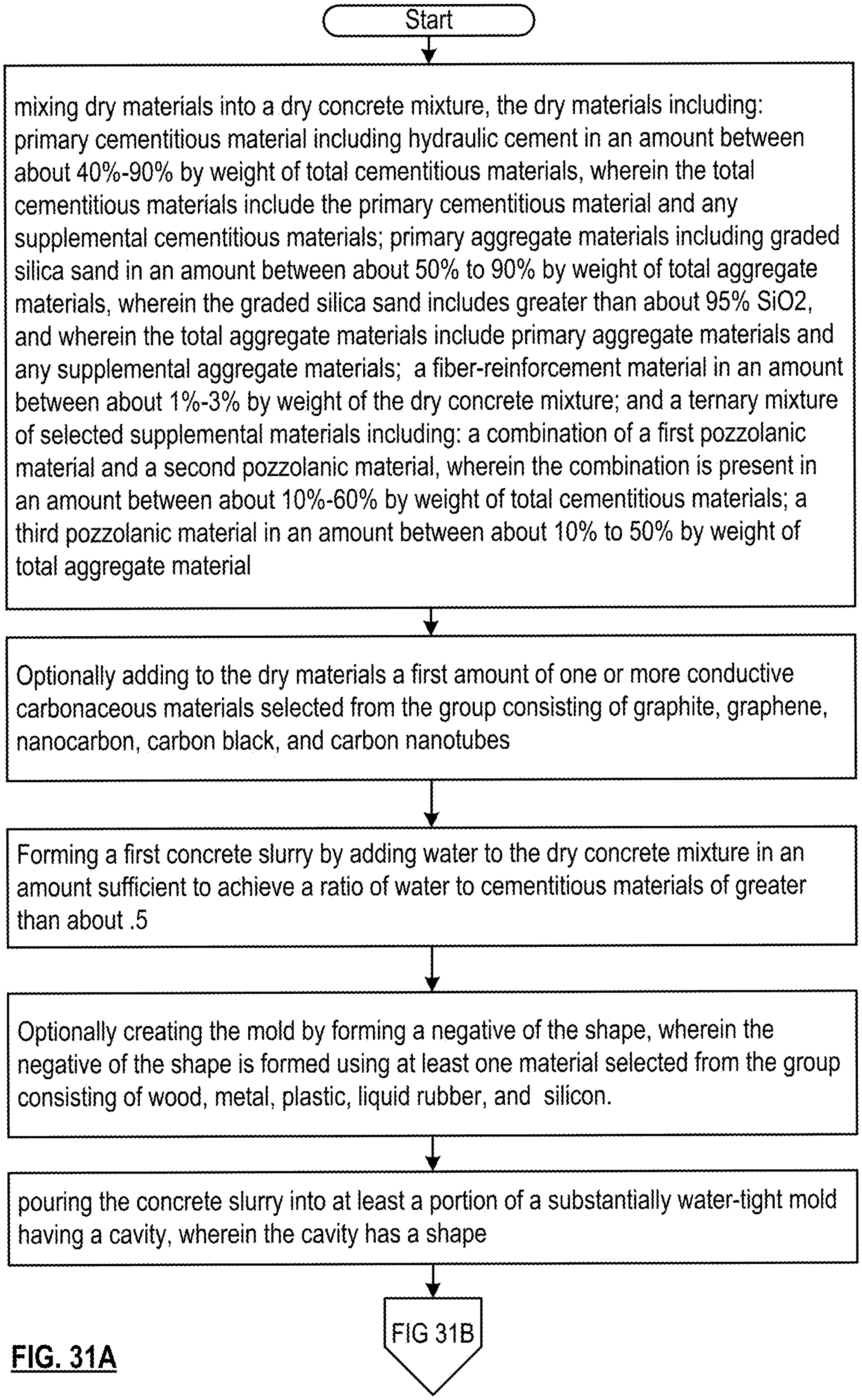
Figure 31B:
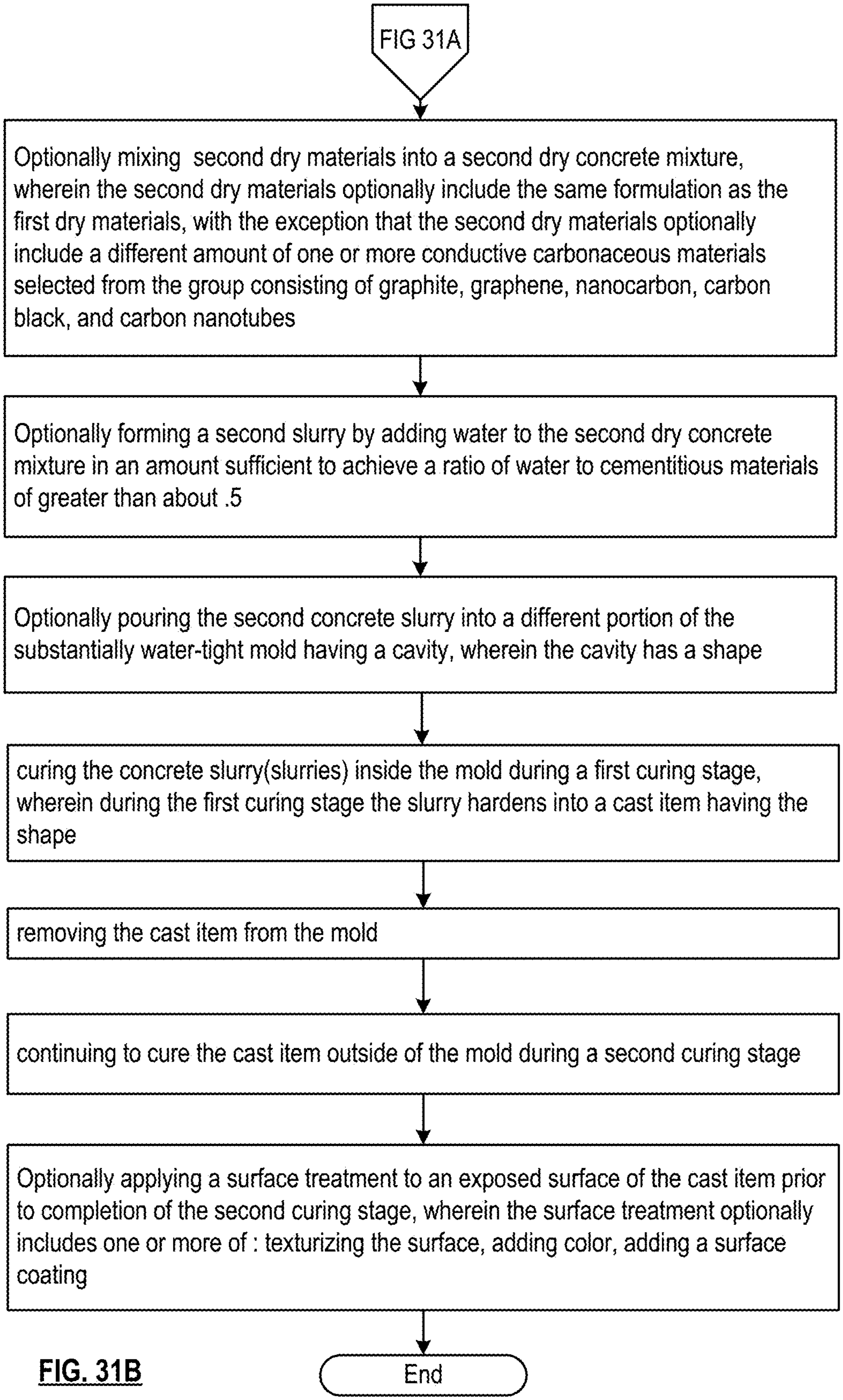
Figure 32A:
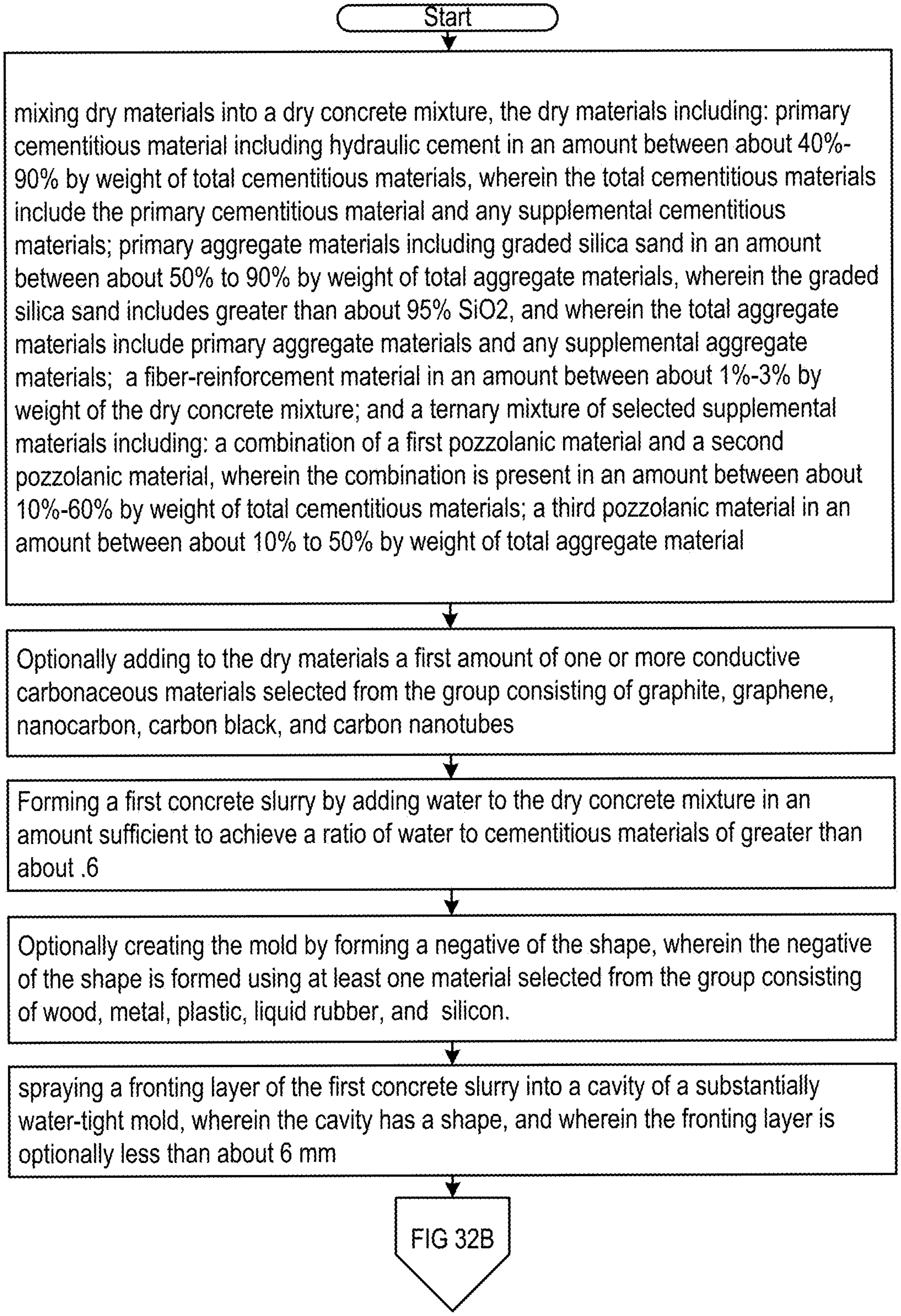
Figure 32B:
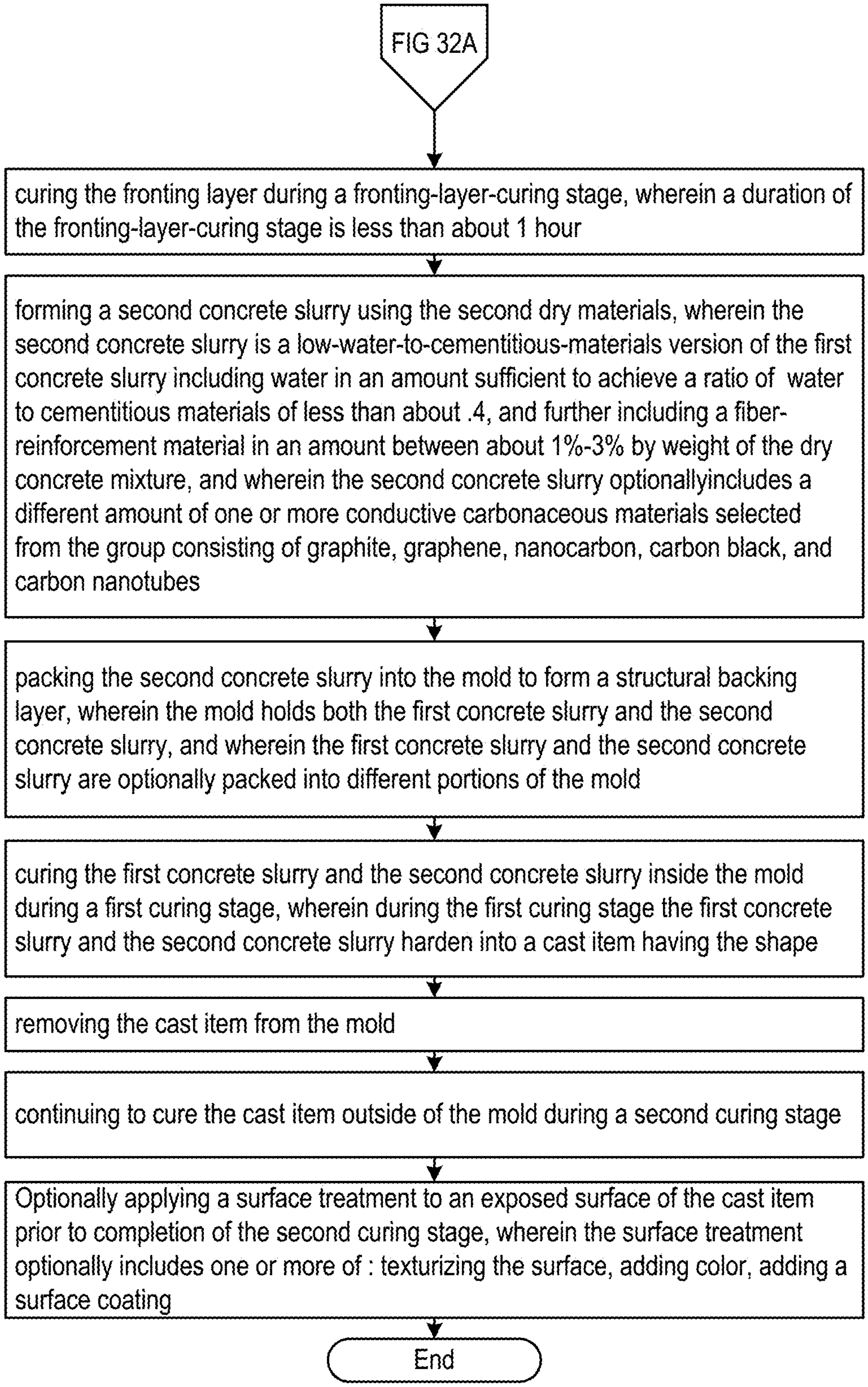
Figure 33:
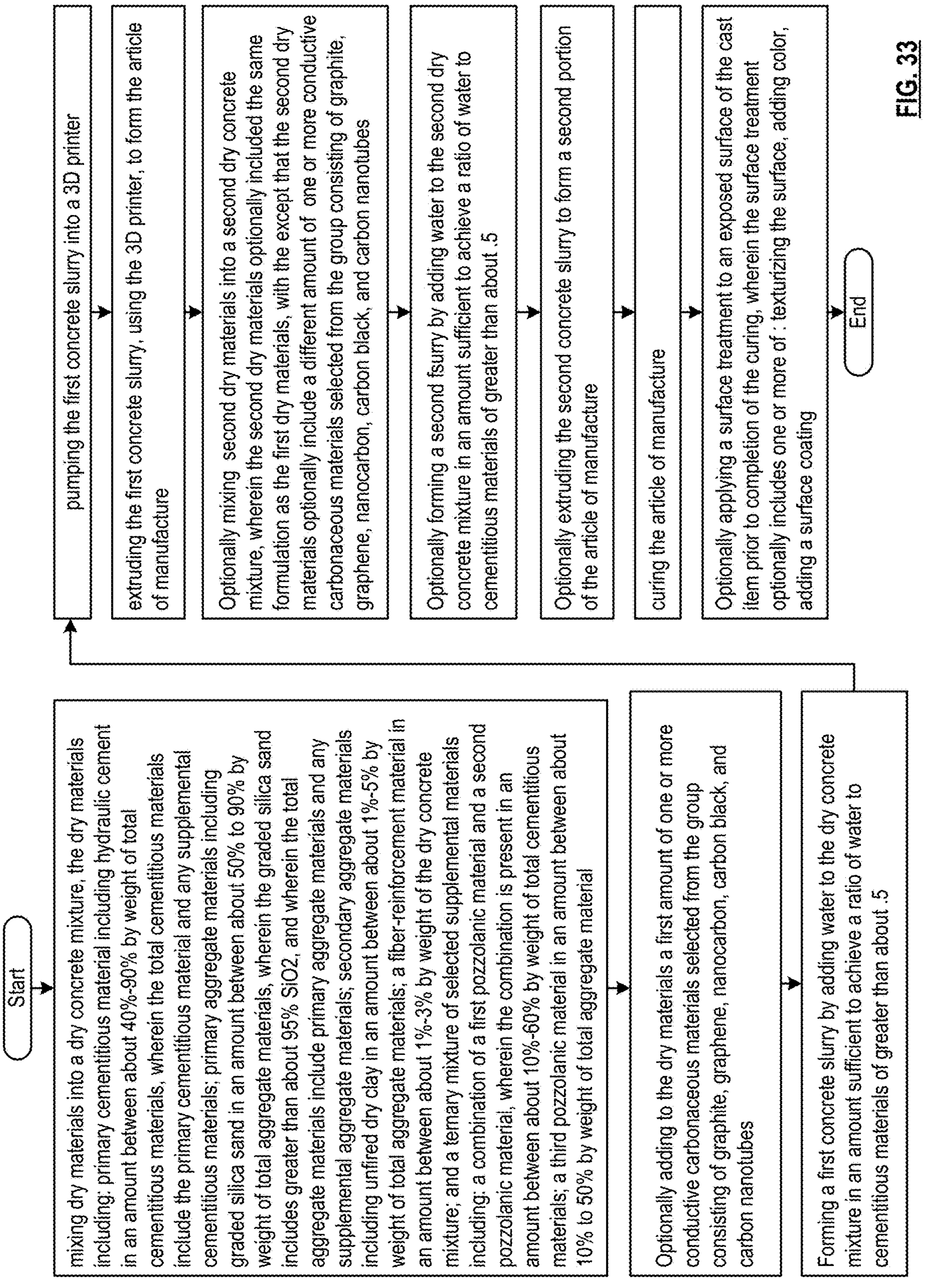
Figure 34:
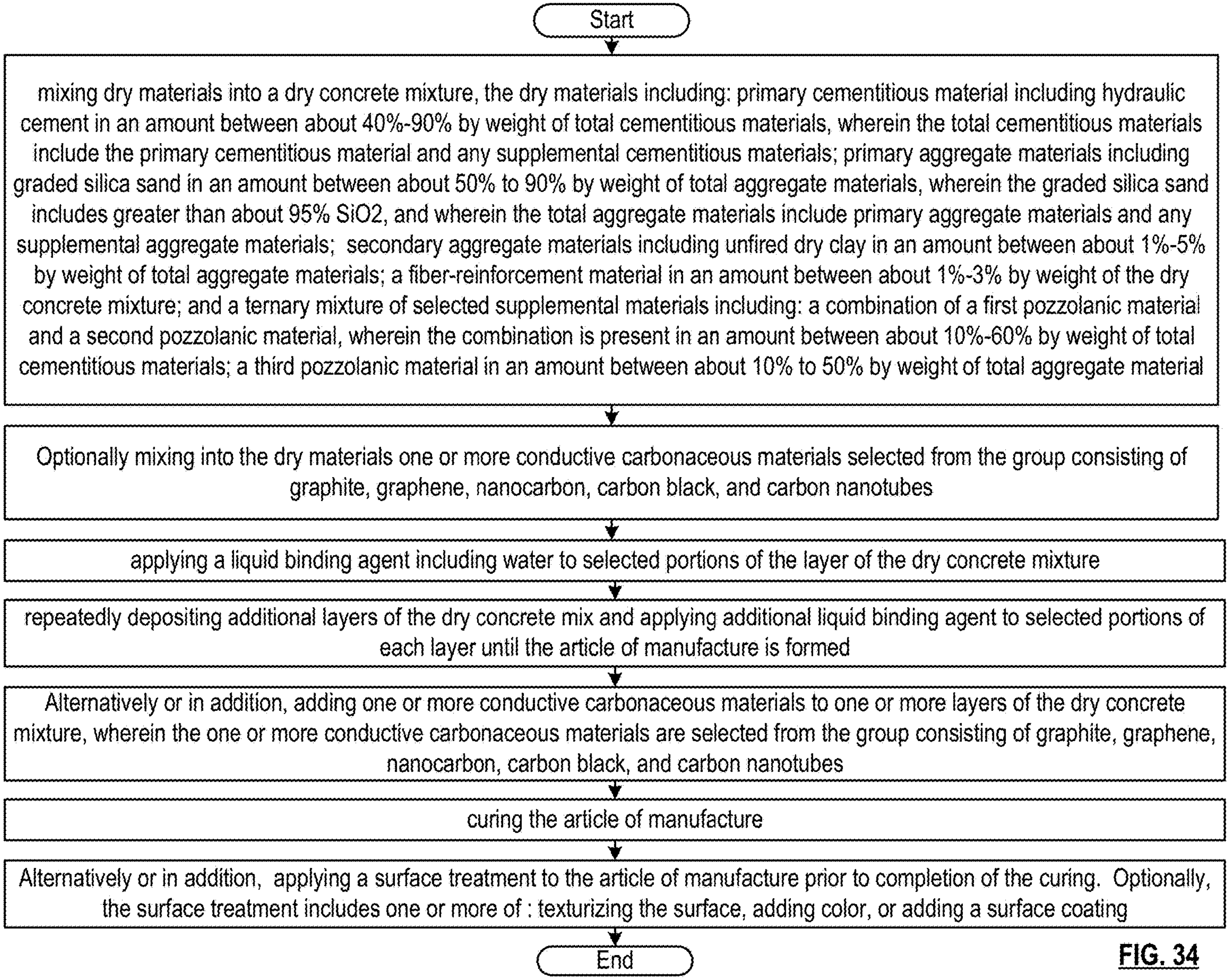
Figure 35:
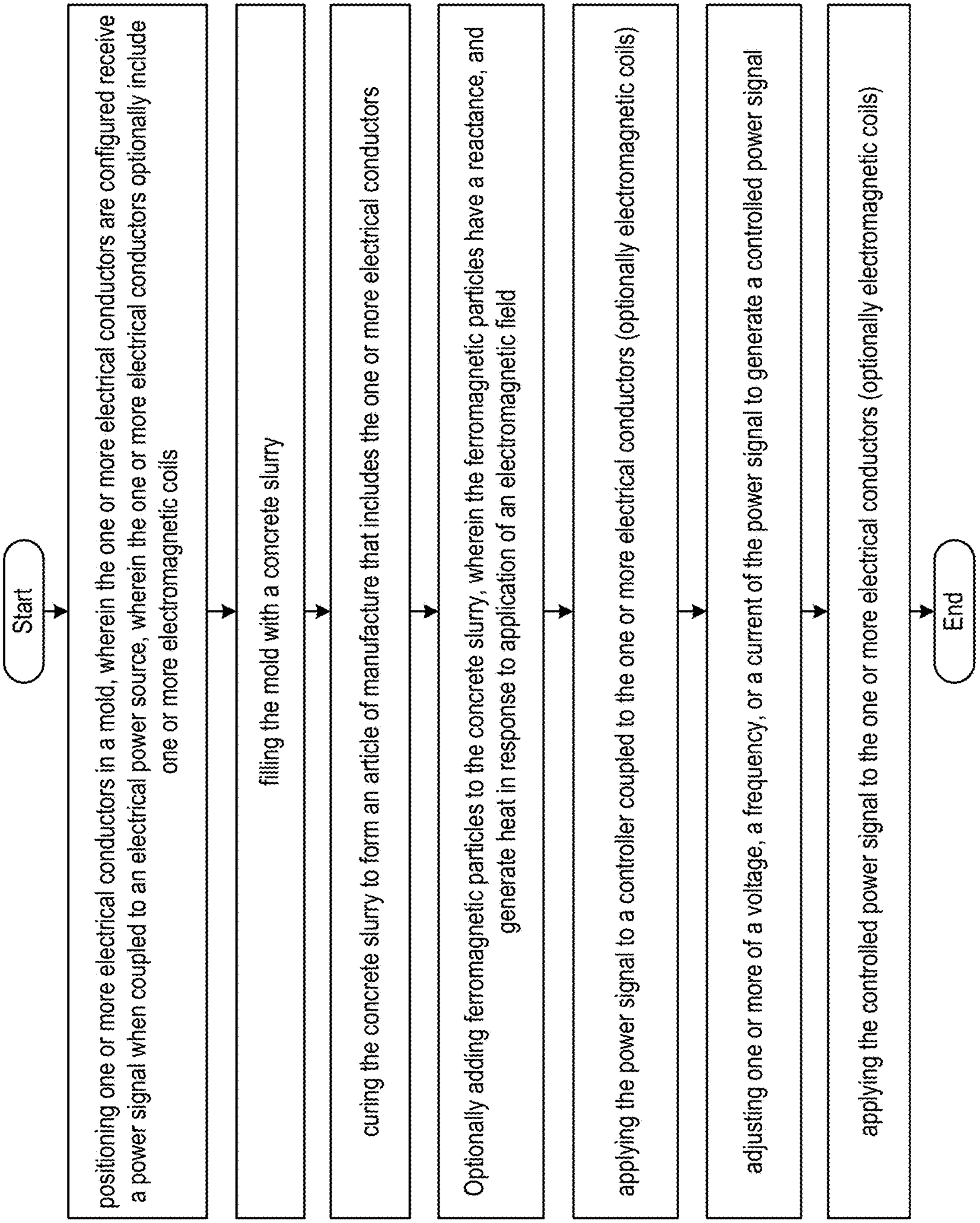

FIGS. 4G-4H present graphical illustration of example groups of multiple furnishing units connected via power connections and/or communications connections in accordance with various embodiments;

FIG. 5A presents a deconstructed, layered illustration of an example embodiment of a furnishing unit implemented as a seating unit in accordance with various embodiments;

FIG. 5B presents a three-dimensional back view of an example embodiment of a seating unit in accordance with various embodiments;

FIG. 6A presents a two-dimensional top view of an example embodiment of a seating unit in accordance with various embodiments;

FIG. 6B presents a two-dimensional front view of an example embodiment of a seating unit in accordance with various embodiments;

FIG. 6C presents a two-dimensional side view of an example embodiment of a seating unit in accordance with various embodiments;

FIG. 6D presents a two-dimensional back view of an example embodiment of a seating unit in accordance with various embodiments;

FIG. 6E presents a two-dimensional top view of an example embodiment of a seat frame of a seating unit in accordance with various embodiments;

FIG. 6F presents a two-dimensional front view of an example embodiment of a seat frame in accordance with various embodiments;

FIG. 6G presents a two-dimensional side view of an example embodiment of a seat frame in accordance with various embodiments;

FIG. 6H presents a two-dimensional side view of an example embodiment of a seat frame in accordance with various embodiments;

FIG. 6I presents a three-dimensional front view of an example embodiment of a seat bottom of a seating unit in accordance with various embodiments;

FIG. 6J presents a two-dimensional top view of an example embodiment of a seat bottom in accordance with various embodiments;

FIG. 6K presents a two-dimensional side view of an example embodiment of a seat bottom in accordance with various embodiments;

FIG. 6L presents a two-dimensional side view of an example embodiment of a seat bottom in accordance with various embodiments;

FIG. 6M presents a two-dimensional top view of an example embodiment of a seat back of a seating unit in accordance with various embodiments;

FIG. 6N presents a two-dimensional side view of an example embodiment of a seat back in accordance with various embodiments;

FIG. 6O presents a two-dimensional front view of an example embodiment of a seat back in accordance with various embodiments;

FIG. 6P presents a three-dimensional front view of an example embodiment of a seat back in accordance with various embodiments;

FIG. 6Q presents a three-dimensional top view of an example embodiment of a seat arm of a seating unit in accordance with various embodiments;

FIG. 6R presents a two-dimensional side view of an example embodiment of a seat arm in accordance with various embodiments;

FIG. 6S presents a two-dimensional top view of an example embodiment of a seat arm in accordance with various embodiments;

FIG. 6T presents a three-dimensional front view of an example embodiment of a heating pad cover plate of a seating unit in accordance with various embodiments;

FIG. 6U presents a three-dimensional back view of an example embodiment of a heating pad cover plate in accordance with various embodiments;

FIG. 6V presents a two-dimensional top view of an example embodiment of a heating pad cover plate in accordance with various embodiments;

FIG. 6W presents a two-dimensional front view of an example embodiment of a heating pad cover plate in accordance with various embodiments;

FIG. 6X presents a two-dimensional back view of an example embodiment of a heating pad cover plate in accordance with various embodiments;

FIG. 6Y presents a two-dimensional side view of an example embodiment of a heating pad cover plate in accordance with various embodiments;

FIG. 7A presents a perspective view of an example embodiment of a furnishing unit in accordance with various embodiments;

FIG. 7B presents an exploded view of an example embodiment of a furnishing unit in accordance with various embodiments;

FIG. 7C presents a back view of an example embodiment of a furnishing unit in accordance with various embodiments;

FIG. 7D presents a top view of an example embodiment of a furnishing unit in accordance with various embodiments;

FIG. 7E presents a side view of an example embodiment of a furnishing unit in accordance with various embodiments;

FIG. 7F presents a front view of an example embodiment of a furnishing unit in accordance with various embodiments;

FIG. 7G presents a perspective view of an example embodiment of a heating element in accordance with various embodiments;

FIG. 8A is a process diagram illustrating preparing dry materials for ready-mix cement and concrete formulations, in accordance with various embodiments;

FIG. 8B is a process diagram illustrating a process of casting concrete articles in accordance with various embodiments;

FIG. 9 is a process diagram illustrating on-demand volumetric mixing of concrete components in accordance with various embodiments;

FIG. 10 is a diagram illustrating wet casting concrete articles in accordance with various embodiments;

FIG. 11 is a diagram illustrating dry casting concrete articles in accordance with various embodiments;

FIG. 12 is a process diagram illustrating a process of 3D printing concrete articles in accordance with various embodiments;

FIG. 13 is a diagram illustrating a gantry-style layered-extrusion 3D concrete printer in accordance with various embodiments;

FIG. 14 is a diagram illustrating a robotic-arm-style layered-extrusion 3D concrete printer in accordance with various embodiments;

FIG. 15 is a diagram illustrating a binder-jetting 3D concrete printer in accordance with various embodiments;

FIG. 16 is a diagram illustrating a concrete article formed of a concrete formulation including conductive carbonaceous materials distributed evenly throughout the article in accordance with various embodiments;

FIG. 17 is a diagram illustrating a concrete article formed of one or more concrete formulations including conductive carbonaceous materials including areas having varying densities of conductive carbonaceous materials in accordance with various embodiments;

FIG. 18 is a diagram illustrating a concrete article including an embedded resistive conductor in accordance with various embodiments;

FIG. 19 is a diagram illustrating a pre-stressed concrete article including embedded resistive conductive cables in accordance with various embodiments;

FIG. 20 is a diagram illustrating a concrete article including an embedded resistive conductive wire mesh in accordance with various embodiments;

FIG. 21 is a diagram illustrating a concrete article including both an embedded electromagnetic coil and embedded conductive carbonaceous particles in accordance with various embodiments;

FIG. 22 is a diagram of a layered concrete article having a first layer formed of a concrete formulation including added conductive carbonaceous materials, a second layer formed of a concrete formulation without added conductive carbonaceous materials, and an optional third layer in accordance with various embodiments;

FIG. 23 illustrates a concrete article including a heating element connected to a controller and a power source in accordance with various embodiments;

FIG. 24 illustrates a concrete article having a first concrete layer including inductive heating particles and a second concrete layer including an electromagnetic coil in accordance with various embodiments;

FIG. 25 illustrates a multi-layer concrete article of manufacture including a heating element inserted between layers in accordance with various embodiments;

FIG. 26 illustrates a concrete article of manufacture including two members shaped to facilitate mutual engagement according to various embodiments;

FIG. 27 illustrates a concrete article of manufacture including attachment fasteners according to various embodiments;

FIG. 28 illustrates a concrete article of manufacture including ferromagnetic particles when the article is in an unmagnetized state in accordance with various embodiments;

FIG. 29 illustrates a concrete article of manufacture including ferromagnetic particles in a magnetized state in accordance with various embodiments;

FIG. 30 A illustrates a wired temperature sensor used to provide temperature input to thermostats or other controllers in accordance with various embodiments;

FIG. 30 B illustrates a wired temperature sensor used to provide temperature input to thermostats or other controllers in accordance with various embodiments;

FIG. 30 C illustrates a wire-free temperature sensor used to provide temperature input to thermostats or other controllers in accordance with various embodiments;

FIG. 31A shows a flowchart illustrating the beginning steps from the start of a method of wet casting a concrete article in accordance with various embodiments;

FIG. 31B shows a flowchart illustrating continuing steps to the end of the method of wet casting a concrete article in accordance with various embodiments;

FIG. 32A shows a flowchart illustrating the beginning steps from the start of a method of dry casting a concrete article in accordance with various embodiments;

FIG. 32B shows a flowchart illustrating continuing steps to the end of the method of dry casting a concrete article in accordance with various embodiments;

FIG. 33 is a flowchart illustrating a method of 3D printing a concrete article using fused deposition model (FDM) 3D printing in accordance with various embodiments;

FIG. 34 is a flowchart illustrating a method of 3D printing a concrete article using binder jetting in accordance with various embodiments; and FIG. 35 is a flowchart illustrating a method of forming a concrete article of manufacture including embedding electrical conductors in accordance with various embodiments.

Figure 36A:
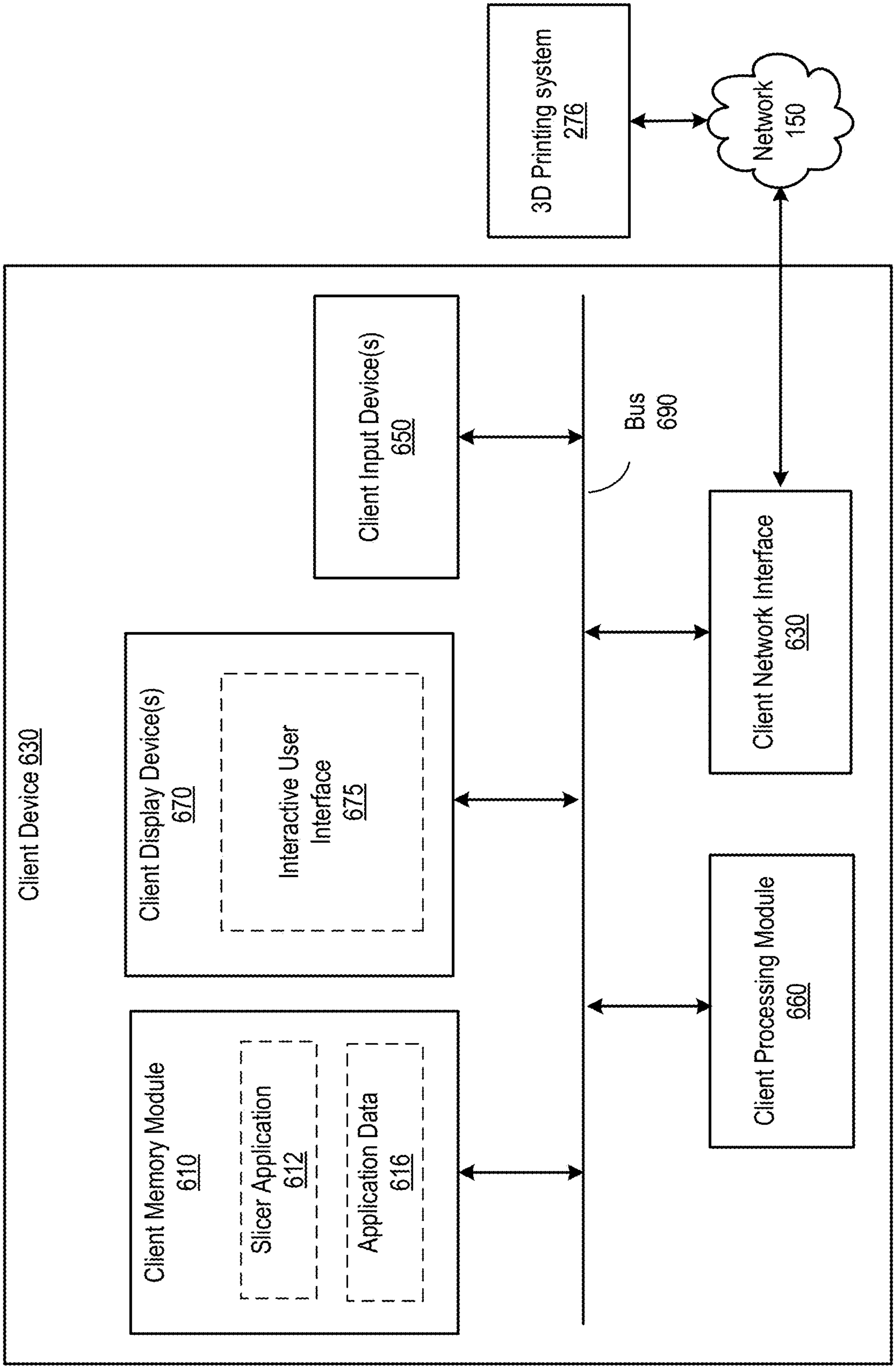

FIG. 36A is a block diagram illustrating an example client device.

Figure 36C:
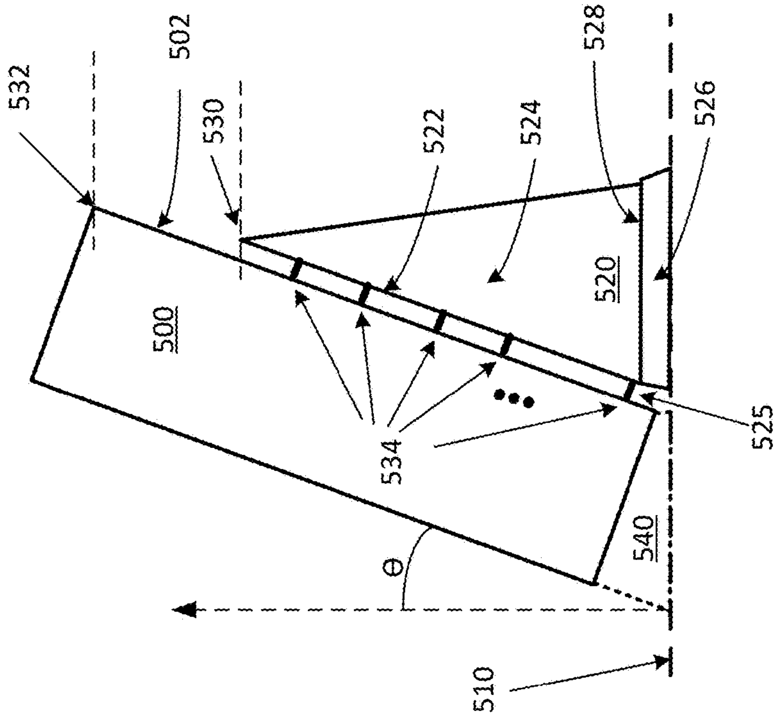
Figure 36B:
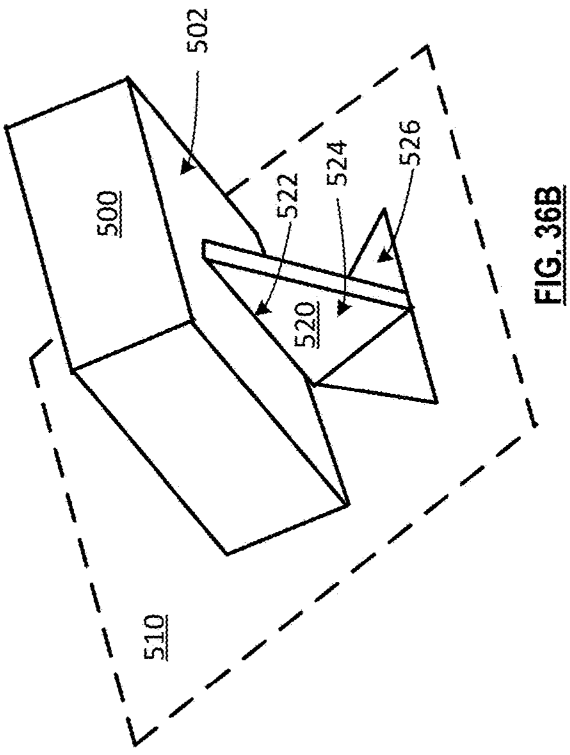

FIG. 36B is a pictorial diagram illustrating a perspective view of an example of a 3D printed object with a fin support.

FIG. 36C is a pictorial diagram of a side view illustrating an example of a 3D printed object with a fin support.

Figure 36D:
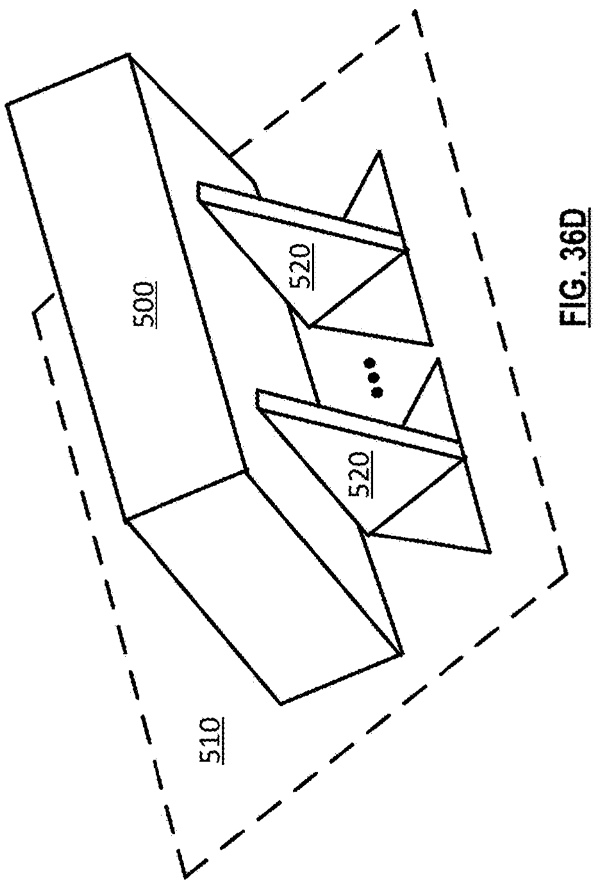

FIG. 36D is a pictorial diagram illustrating a perspective view of an example of a 3D printed object with multiple fin supports.

FIG. 36E is a pictorial diagram of a side view illustrating an example of a 3D printed object with a fin support.

FIG. 36F is a pictorial diagram of an example client device screen display.

FIG. 36G is a pictorial diagram of an example client device screen display.

Figure 36H:
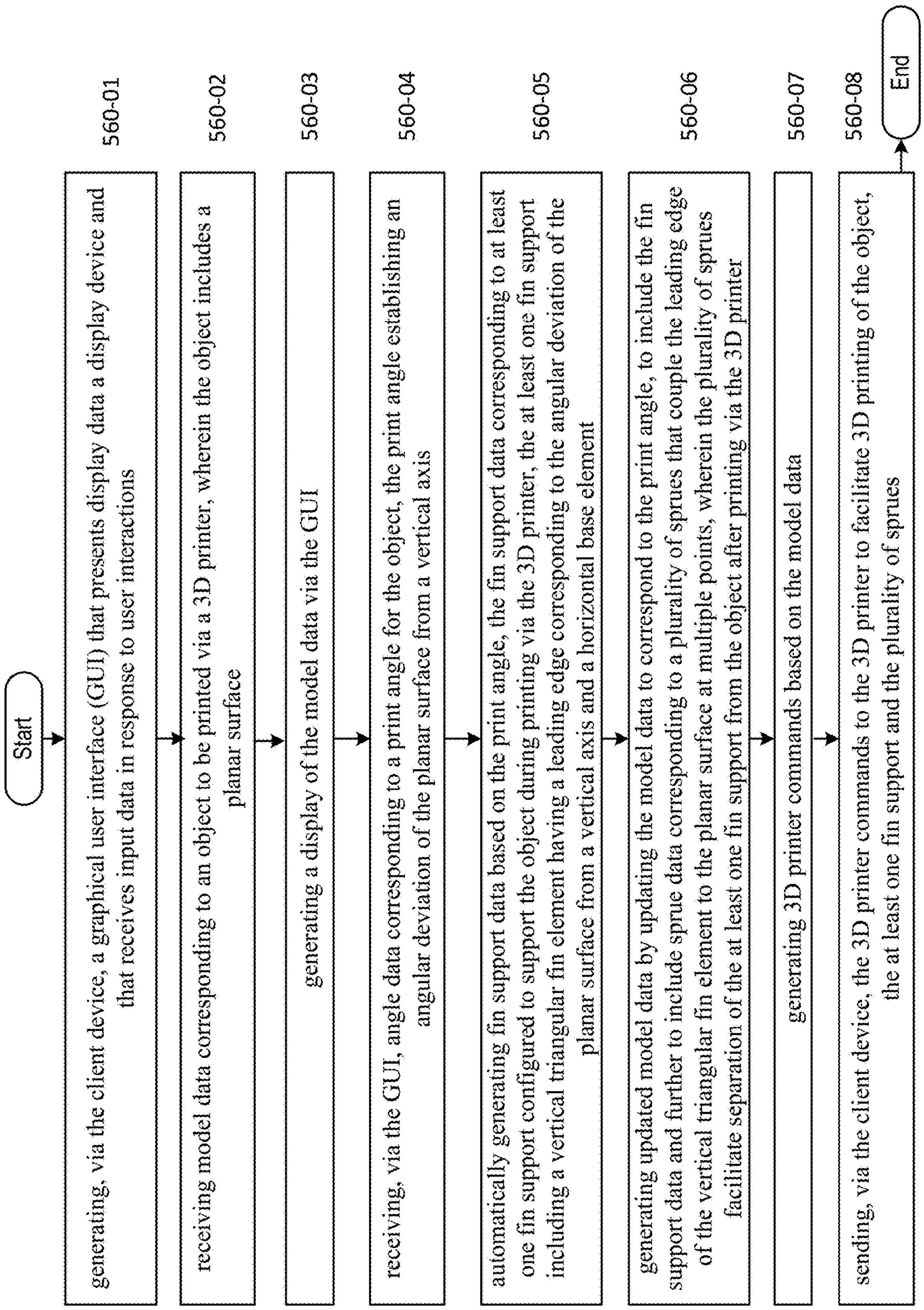

FIG. 36H is a flowchart diagram illustrating an example method.

DETAILED DESCRIPTION OF THE DISCLOSURE

Figure 1:
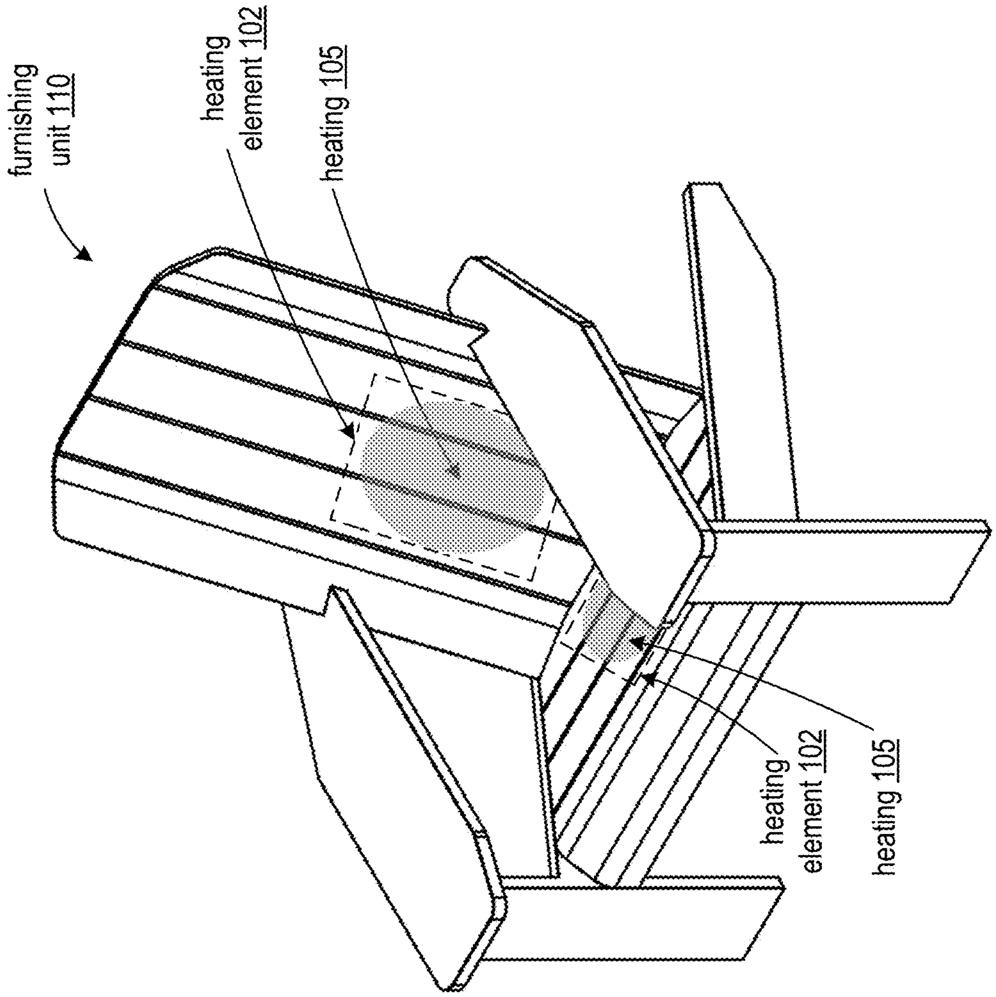

FIG. 1 illustrates a three-dimensional front view of an embodiment of heating-capable furnishing unit 110. A heating-capable furnishing unit 110 can include at least one heating element 102 be operable to provide heating 105 to a user in proximity to the heating-capable furnishing unit 110.

As used herein, a furnishing unit 110 can include a functional and/or decorative unit that is utilized in an indoor and/or outdoor environment, such as at a user's home, a commercial establishment, a park or recreational area, or other location. Furnishing units 110 can be permanently installed in a particular location, can be located in a predetermined location within a predefined physical boundary, and/or can move around within predefined physical boundary.

As depicted in the example of FIG. 1, a furnishing unit 110 can correspond to an article furniture such as a chair in which a user can sit. In other similar embodiments, furnishing unit 110 can correspond to another article of furniture implemented as a seating unit in which one or more people can sit, such as another type of chair, a couch, a stool, a bench, a banquette, and/or any other article of furniture providing means of sitting by the user. While seated in the furnishing unit 110, the at least one heating element 102 can provide heating 105 to the user.

Any embodiment of furnishing unit 110 that similarly includes at least one heating element 102 that provides heating 105 to at least one person in the vicinity can be implemented as: any other an article of furniture such as a table, bar-top, and/or other furniture providing a surface for dining, placing plates and/or glassware, and/or gathering; one or more furnishings providing lighting such as a lamp and/or light fixture; one or more furnishings providing heating such as an outdoor heating lamp; one or more furnishings providing music and/or other audio such as speakers; one or more furnishings providing decorative storage such as shelving units; window furnishings such as blinds and/or curtains; outdoor furnishings such as patio furniture, landscaping elements, rock features, floral features, plant features, outdoor sculptures and/or art, and/or water features; pools, hot tubs, and/or elements within a pool and/or hot tub, such as benches, rocks, pool sides, a pool bottom, and/or other elements of a pool that are optionally submerged when the pool and/or hot tub is filled with water and operable to heat occupants within the pool and/or hot tub; configurable elements upon furnishings such as decorative handles, knobs, hooks, and/or faucets; vehicles such as cars, boats, planes, other road vehicles, other water vehicles, and/or other aerial vehicles; structural elements such as walls, floors, ceilings, pillars, beams, bricks, stones; and/or any other articles of furniture, decorative units, functional units, accessories, infrastructure elements, and/or other types of products of a building interior, outdoor patio, and/or any other indoor and/or outdoor space.

In various embodiments, one or more furnishing units 110 are deployed in an outside environment where people gather and where the air temperature may become uncomfortably cold. The furnishing units 110 can provide heating to users to combat these cold temperatures to provide comfort to users while in this cold environment.

In addition or in the alternative, one or more furnishing units 110 can be implemented as cooling-capable furniture for outside situations where the air temperature may become uncomfortably warm, and can be operable to cool the user via at least one fan and/or other cooling system.

Figure 2A:
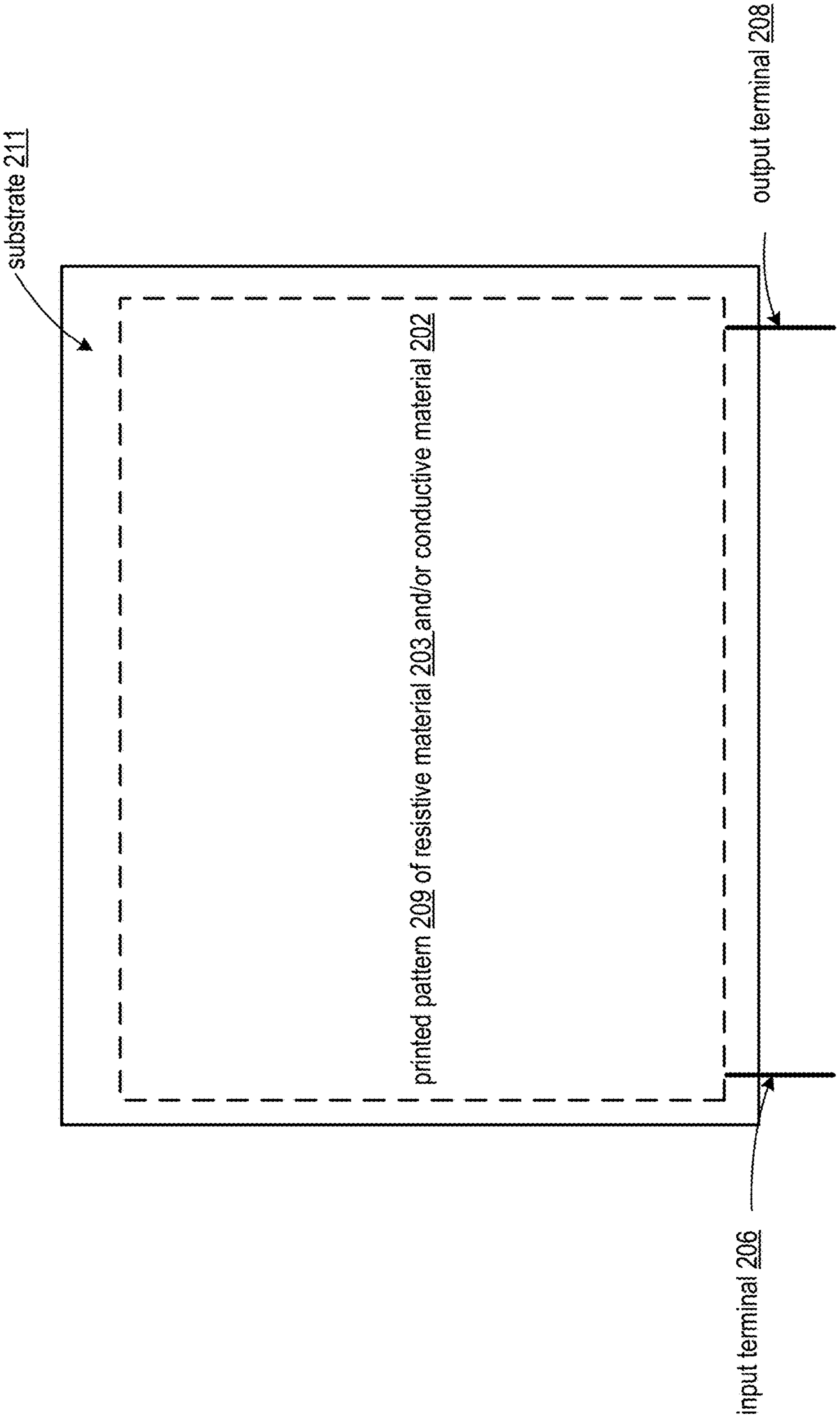
Figure 2B:
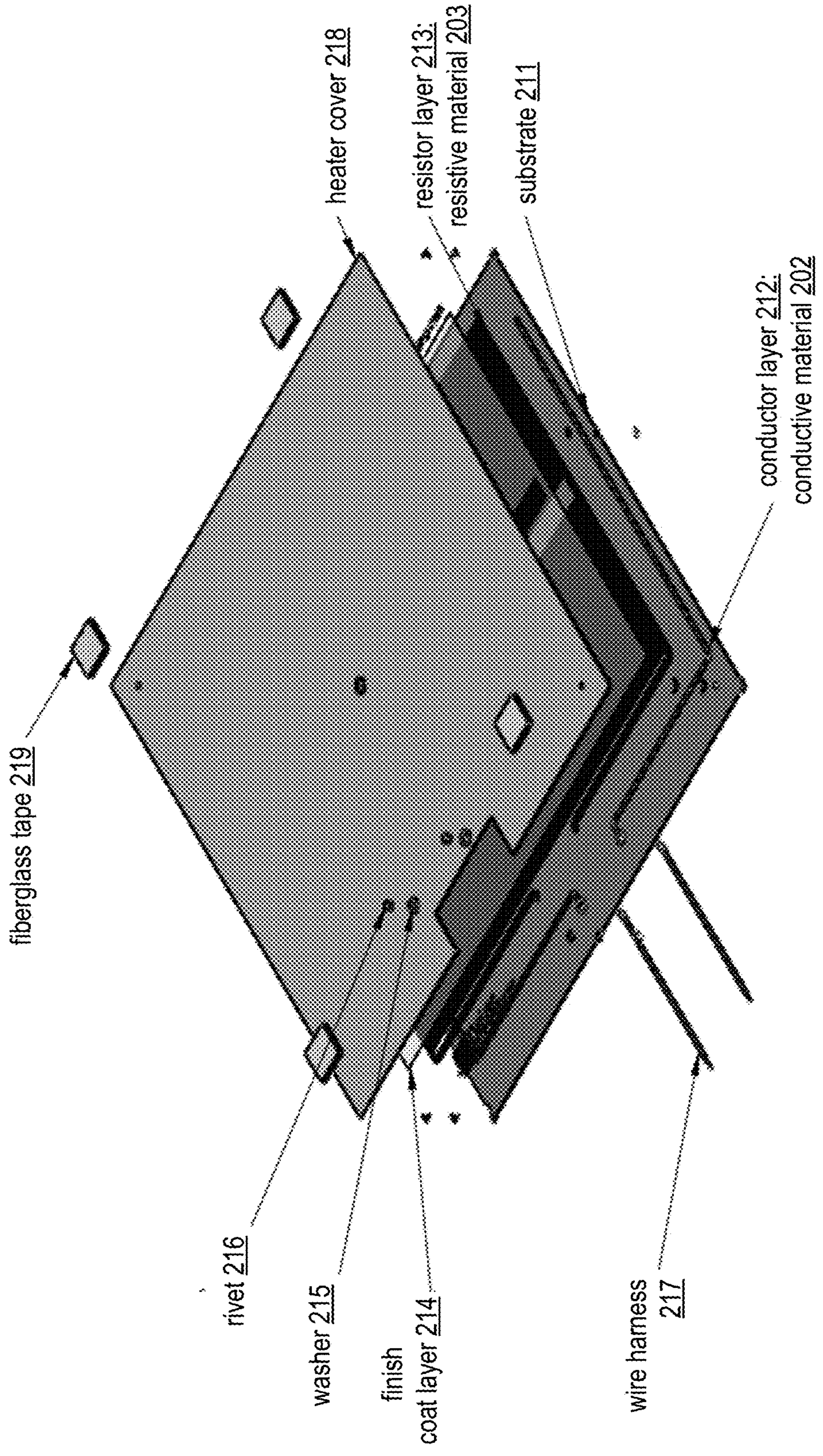

FIGS. 2A and 2B present example embodiments of heating element 102. Some or all features and/or functionality of the heating element 102 of FIGS. 2A and/or 2B can be utilized to implement the heating element 102 of FIG. 1 and/or any other embodiment of heating element 102 described herein.

In some embodiments, at least one heating element 102 of furnishing unit 110 can be implemented as a resistive heating element. For example, this resistive heating element is formed by printing a resistive material 203 onto a substrate 211. The resistive material 203 can be implemented as a heating-capable thick- or thin-film resistive material onto a substrate. In one example, a graphite- or graphene-based paste is printed onto a mica or like substrate. Other suitable thick- or thin-film materials having resistive heating capability are known such as those disclosed in U.S. Pat. No. 6,037,572 which is incorporated herein by reference.

In some embodiments, the substrate is comprised of 0.5 mm thick low smoke mica. The substrate can be implemented via any other thickness and/or other material.

As illustrated in FIG. 2A, such a resistive material 203 can be printed upon substrate 211 in accordance with a printed pattern 209. In one implementation, the film of resistive material is printed as a grid of fine lines. The lines can be printed as parallel lines, as a single meandering maze-like line, as a generally square or generally circular pattern, or the like. The deposited film material can have uniform or variable thickness with line widths and line spacing also being uniform or variable. The resistive material can be of uniform composition throughout or different regions of the deposited film can have different composition; for example, to provide relatively low and high resistivity regions. In one implementation, differences in resistivity of different parts of a thick- or thin-film heating element are used to direct applied current as required to establish a particular heating pattern. For example, an outer zone of a heating area is heated to a higher temperature than an inner central zone. Such an arrangement is adapted for chair backs where the spine marks a position of higher pressure compared to other parts of the sitter's back. Similarly, for a chair seat where the buttocks have higher pressure areas than surrounding areas. In one implementation, local thermostats are used to switch in and switch out parts of the pattern as limit temperatures are reached.

In various embodiments of the furnishing unit 110, the material of the resistive heating element, whether a film or a discrete wire or filament, has a positive temperature coefficient and so experiences an increase in electrical resistance when its temperature is raised. Depending on desired heating characteristics, in an alternative embodiment, the material has a linear or negative temperature coefficient.

In some embodiments of the furnishing unit 110, an associated film of conducting material can also be printed as a grid of input and output conducting material lines to connect the resistive lines to input and output terminals, and can thus be included in the printed pattern 209 as illustrated in FIG. 2A. If the heating element is a meandering resistive element, whether embodied as a wire or deposited film, an input terminal is electrically connected to one end of the element and an output terminal is electrically connected to the other end of the element. In an implementation specifically for a pattern of separate resistive lines, a conducting strip is printed to be integral with input ends of resistive element lines and another conducting strip is printed to be integral with output ends of resistive element lines. In one implementation, the conducting layer is overprinted on the resistive layer and connections between respective resistive and conducting lines are made vertically. Input and output conductive strips can be connected to input and output terminals 206 and 208, respectively, of a standard or tailored power receptacle or, via an electrical lead, to a plug.

In some embodiments of the furnishing unit 110, printing of resistive and conductive leads of printed pattern 209 can be by any of screen printing, ink drop printing, etc., tailored to the film material being used and the substrate to which the print material is being applied. For added integrity deposited conducting and resistive lines can be baked. The input and output terminals are in one implementation riveted to the adjacent rigid substrate.

FIG. 2B illustrates an example embodiment of heating element 102. Heating element 102 can be implemented via a plurality of layers that include substrate 211; a resistive layer 213 of resistive material 203, for example, printed upon the substrate 211 in the printed pattern 209 as discussed in conjunction with FIG. 2A; and/or a conductor layer 212 of conductive material 202, for example, printed upon the substrate 211 in the printed pattern 209 as discussed in conjunction with FIG. 2A.

As illustrated in FIG. 2B, the plurality of layers can further include a finish coat layer 214 and/or a heater cover 218. As illustrated in FIG. 2B, the heating element 102 can further include one or more washers 215, one or more rivets 216, one or more segments of fiberglass tape 219, and/or other fastenings or materials facilitating attaching of the layers to each other and/or to the furnishing unit. As illustrated in FIG. 2B, the heating element 102 can further include wire harness 217, for example, implementing the input terminal 206 and output terminal 208 of FIG. 2A.

In some embodiments, the heating element 102 is configured to operate at 120 volts and/or 250. Watts, or under different voltage and/or power specifications.

In some embodiments of the furnishing unit 110, the heating element is mated to a surface part of an article of heating-capable furniture. In one implementation, the article is a piece of stock construction material such as wood, metal, ceramic, glass, fiberglass, carbon, MDF board, clay, Formica™, Corian™, Solid surface, laminates, Glass fiber reinforced-plastic, gypsum, concrete, composite materials such as cement, concrete, bio polymers, plastics, sintered/engineered stones, glass fiber reinforced Gypsum (GFRG) and the like which may be referred to as composite stone, manmade stone and/or artificial stone materials or the like for use in the manufacture of an article of heating-capable furniture. In an alternative implementation, the article is a surface part of the finished article itself, such as a piece of furniture, a vehicle, a boat, a floor, a pool or the like, with the resistive heating material and input and output conductors printed, coated, or otherwise applied directly to the surface part itself and with a protective layer applied over the heating element.

In some embodiments of the furnishing unit 110, an intermediate layer of thermal transfer material is located on the heating 'side' between the heating element and an overlying substrate. The transfer material can be made flowable during manufacturing to enable adaptation to low level surface formations or roughness in either or both of the heating element and the substrate. The transfer material can have high thermal conductivity to minimize heat lost during transfer from the heating element to the substrate. As an alternative to a flowable material, the transfer layer can be made pliable both to adapt to surface irregularities of a substrate and heating element and to adapt to the overall curvature of a substrate such as a chair part. In one implementation, the thermal transfer layer is itself deposited, as by vapor deposition or other suitable deposition method, or printed, as by screen printing, or other suitable printing method, directly onto the surface of the thick or thin film heating layer. In some embodiments, the thermal transfer layer is implemented as finish coat layer 214 of FIG. 2B and/or the overlying substrate is implemented as the heater cover 218.

In some embodiments of the furnishing unit 110, an intermediate thermally insulating layer is located on the non-heating 'side' between the heating element and an underlying substrate. The insulating material can act as a heat shield to minimize heat loss from the back or non-heating side of a piece of furniture such as a chair and can be supplemented by a reflecting layer of material to reflect heat back the heating side. The heat shield can also prevent generated heat from inadvertently and/or undesirably heating another person or item in the locality of furniture that is being deliberately heated.

In some embodiments of the furnishing unit 110, a robust resistive heating element is formed as a winding resistive heating wire or filament. In an implementation, the wire or filament is contained within a facing or housing material such as silicone rubber. The silicone rubber acts to protect the element from outside conditions; also, to provide flexibility allowing the heating element to be bent around an article to be heated; and particularly in the case of use of facing material, to act to concentrate the projection of generated heat towards the object being heated while acting as a shield to limit heat from being directed away from the object being heated. The housed heating element can, in one embodiment, be secured to an underlying body by anchors such as screw-mounted brackets.

In various embodiments of the furnishing unit 110, the heating element, as supplemented by any heat transfer layer and/or insulating layer has an acrylic or Solid surface covering to render the structure resistant to deterioration from weather effects, such as a thermoformed acrylic or solid surface covering, a planar acrylic or solid surface covering, or other covering.

In various embodiments of the furnishing unit 110, dielectric material such as an epoxy is coated on a surface of a base material such as stock building material or an article of furniture. A resistive heating element such as any of a winding resistive wire, a lattice of resistive wires, or a printed lattice of resistive lines is then laid over or applied to the dielectric layer and a second layer of dielectric such as epoxy covers the resistive element. The stock material so produced is used to construct an item such as furniture, vehicles, boats, floors, pools, etc. As an alternative to a flowable epoxy, the heating element is sandwiched between layers of Corian™, Solid surface or like laminar material.

In another embodiment, the furniture material may be impregnated with Nano Carbon of Nano Graphene particles at appropriate concentrations and distributions so as to generate tortuosity, leading to heating of the entire material when energized. This is particularly applicable to composite materials such as cement, concrete, bio polymers, plastics, sintered/engineered stones, glass fiber reinforced Gypsum (GFRG) and the like which may be referred to as composite stone, manmade stone and/or artificial stone materials.

In various embodiments of the furnishing unit 110, a sheet of substrate material bearing a heating element is embedded inside a cast material such as concrete. In one implementation, the embedded structure is first encased in an inert material to protect it from reaction with damaging chemicals used or produced in the course of the casting process. In another embodiment, heating elements are embedded in an injection molded material such as plastics.

In various embodiments of the furnishing unit 110, an item such as a chair is 3D printed and/or additive manufactured. At an intermediate stage in the course of printing, heating element material is put in place on, or applied to, the partially printed item. The printing process is then continued so that the heating elements are embedded in the completed printed item. In one implementation, the heating element is deposited as a thick film resistive layer. In another implementation, wires, filaments, or rods of resistive material are placed on the surface of the partially printed object or are placed within containing housings forming part of the partial print. In a further implementation, both conductive and resistive elements are formed in the partial print so as to provide elements of a heating circuit. In a variation, the heating element itself is printed into the object during the printing process by switching from the flowable base material, such as a plastic, to a flowable resistive metal component, switching back to base material, etc., until the resistive metal heating element is completed. Conducting leads to the heating element can optionally be also printed 'on the fly'.

In various embodiments of the furnishing unit 110, a heat storage medium such as a clay brick, or ceramic or feolite is lodged into stock manufacturing material, or into an article of furniture at a position adjacent a resistive heating element. In use, the heat storage medium is heated up during a heat storage cycle. At other times, even if there is no active heating of the heat storage medium, the previously heated medium releases its stored heat to warm a sitter or like user of the article of furniture. In one implementation, the heat storage medium is embedded in a 3D printed and/or additive manufactured article of furniture during manufacture together with the associated heating element. In another implementation, the heat storage medium is added as part of the 3D material to be printed. In addition or in the alternative, a heat spreader medium, such as a piece or sheet of aluminum or other material, may be used to extend the heating coverage beyond the specific location of the heating element. In another implementation, the heating element comprises a mix of chemicals that exothermically react when electric current is passed through the mix, with the chemical returning to their initial state upon cooling when current flow ceases.

In various embodiments of the furnishing unit 110, a phase change material (PCM), such as an organic or salt hydrate PCM, is lodged into stock manufacturing material, or into an article of furniture at a position adjacent a resistive heating element. In use, the PCM is heated up during a heating cycle to precipitate a first direction phase change and then is allowed to cool to precipitate a reverse direction phase change. Controlled power is applied to the heating element in a cycle that releases latent heat from the PCM to warm a sitter in a warming period and absorbs latent heat in a cooling period either deliberately to cool a sitter or like user or to cool the article of furniture when no warming effect is required. In one implementation, the PCM is embedded in a 3D printed and/or additive manufactured article of furniture during manufacture together with the associated heating element. In another implementation, the PCM is added as part of the material, such as a 3D material and/or additive manufacturing material, to be printed, additive manufactured, and/or produced via another deposition process.

In various embodiments of the furnishing unit 110, particularly in the case of 3D printing of a heating-capable article of furniture, in one implementation, optical fibers, optical sources and related control devices are embedded in the 3D printed and/or additive manufactured object during manufacture. In use optical circuits and effects therefrom are used to indicate, for example, active heating level and/or current temperature. In one example, optical display technology is used in the structure of a heating-capable chair or like item so that it glows in response to the item changing temperature. In a related implementation, the item glows with a shade that depends on the actual temperature of the item or part of it.

Figure 3A:
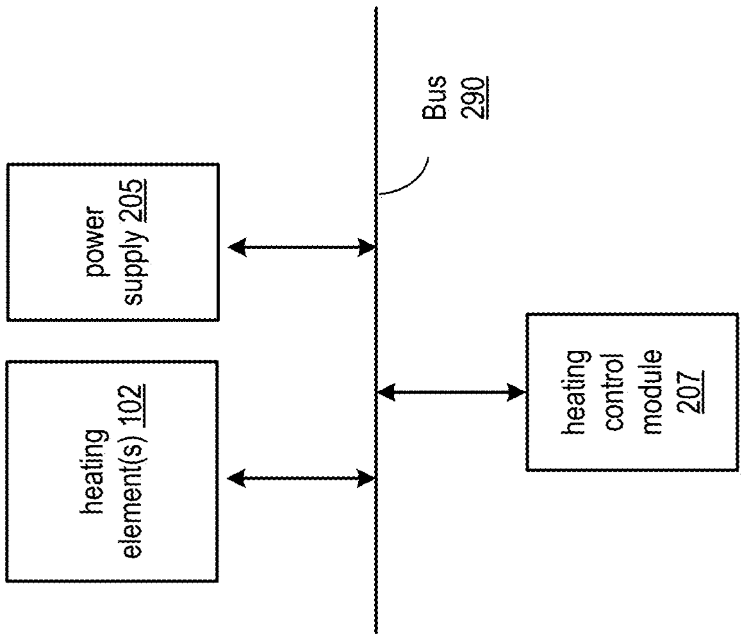
FIG. 3H illustrates a set of example visual indications for a set of heating states displayed by furnishing unit based on progressive button interaction in accordance with various embodiments.
FIG. 3I is a schematic block diagram of an example embodiment of a PCB element of a furnishing unit in accordance with various embodiments.

FIG. 3A presents a schematic block diagram of an embodiment of furnishing unit 110. A bus 290 of furnishing unit 110, such as at least one wired and/or wireless connection, can facilitate powering of at least one heating element 102 of the furnishing unit 110 via a power supply 205, optionally based on control data generated by a heating control module 207. Some or all features and/or functionality of the furnishing unit 110 of FIG. 3A can implement the furnishing unit 110 of FIG. 1 and/or any other embodiment of furnishing unit 110 described herein.

A furnishing unit 110 can include at least one heating element 102, which can be integrated into one or more portions of the furnishing unit as illustrated in FIG. 1, for example, to heat different parts of a person's body and/or otherwise supply heating in corresponding locations.

The furnishing unit 110 can further include a heating control module 207. The heating control module 207 can generate control data corresponding to configuration of the furnishing unit 110. This control data can cause the furnishing unit 110 to turn on and/or off, to supply heat at one of a set of multiple heating levels, and/or to otherwise change state of and/or configure functionality of the heating 105 delivered via furnishing unit 110.

In some embodiments, the heating control module 207 can include and/or can communicate with at least one user input device. In such embodiments, the control data can correspond to and/or be based on user input to the user input device, where a user configures the functionality of the heating 105 delivered via furnishing unit 110 via interaction with the user input device. The heating control module 207 can generate the control data via at least one processing module, at least one memory module, corresponding circuitry, at least one communications interface, at least one user input device, and/or other means.

In some embodiments, a user input device implementing heating control module 207 includes least one switch, knob, button, lever, touchscreen displaying a graphical user interface, and/or other user input device. The user input device can be integrated within and/or in proximity to the furnishing unit, and can be actuated and/or toggled by a user in proximity to the furnishing unit. An example embodiment of a heating control module 207 of furnishing unit 110 implemented to include a button is illustrated in FIGS. 3D-3H.

In some embodiments, a user input device separate from furnishing unit 110 communicates with heating control module 207 to facilitate transmission of user input data, where heating control module 207 includes a communication interface. For example, the user input device is implemented as a remote control device for the furnishing unit 110 that transmits an IR signal or other short range wireless communication signal for receipt by the communication interface to facilitate generation of and/or receipt of control data configuring the heating 105 by furnishing unit 110. As another example, the user input device is implemented as a smart phone or other personal device of the user that executes application data corresponding to the furnishing unit that causes the user input device to display a graphical user interface for interaction by the user to enable the user to configure the heating 105 by furnishing unit 110. The smart phone or other personal device can communicate with the furnishing unit 110 via a Bluetooth connection, Wi-Fi connection, local area network connection, or other wired and/or wireless communication medium.

In some embodiments, the heating control module 207 can automatically generate control data without user intervention, for example, based on sensor input and/or received communications indicating environmental changes to which the heating 105 should adapt. For example, the furnishing unit 110 can further include at least one light sensor, temperature sensor, humidity sensor, pressure sensor, audio sensor, occupancy sensor, weather sensor, timer or clock, geolocation sensor, or other sensor utilized to determine changes in state data that causes the heating control module 207 to automatically change and/or otherwise configure the heating 105. For example, presence of a user can be detected via a pressure sensor, occupancy sensor, Wi-Fi connection with a device of the user, Bluetooth connection with a device of the user, radio frequency or other signal received from and/or detected as being transmitted by a device of the user, LIDAR proximity detection, or other means of detecting presence of a user in proximity. When presence is detected the heating elements 102 can turn on automatically based on detection of a person occupying the seat and/or otherwise being in proximity to the furnishing unit. As another example, the temperature sensor and/or other weather sensors can detect weather data that is processed by heating control module 207 to facilitate changing the heating level outputting by heating element 102 based on the outdoor temperature, or other weather elements such as wind or precipitation, changing.

In some embodiments, some or all of this state data processed by heating control module 207 can be received via a wired and/or wireless connection with the Internet and/or other communication network, for example, via a Wi-Fi connection and/or other network connection. For example, current weather data, reservation data for an establishment that includes the furnishing unit indicating reservation of the chair, and/or other data can be transmitted to the furnishing unit 110 via this network connection to cause the chair to determine to turn on and/or of, or configure the level of heating 105 by heating elements 102 based on determining corresponding temperature or other weather conditions, use by a user and/or particular person with particular preferences, or other information.

In some embodiments, furnishing units 110 generate and/or transmit data to other furnishing units 110 for processing, where heating control module 207 optionally utilizes data received from other furnishing units 110 to generate control data or otherwise configure heating 105 by heating element 102. Embodiments of a communication network of furnishing units is discussed in further detail in conjunction with FIGS. 4D-4H.

The heating elements 105 can be operable to supply heating based on being powered via a power supply 205. For example, the power supply 205 facilitates delivery of current that renders resistive heating elements of heating elements

105 to produce heat. In some embodiments, a power receptacle is mounted at a suitable position on the item to be heated, for example, underneath a chair seat. The power supply 205 can optionally further power the heating control module 207 and/or other electrical components of furnishing unit 110. Power supply can be implemented to supply AC or DC power, and can be implemented via a standard outlet connection, a battery, or other power supply. In some embodiments, the power supply is implemented via a step-down transformer and/or other transformer.

In various embodiments of the furnishing unit 110, as an alternative to a mechanical plug and receptacle arrangement, a power transfer unit includes input and output members that are attached to each other through an easy-release mechanism. In one embodiment, the easy-release mechanism eliminates conventional male to female connectors by using a combination of friction and/or magnetism to hold one member to the other. The level of friction and/or magnetic attraction are set sufficiently high so as to avoid light collisions from disconnecting the power transfer members from one other, while supporting safety by enabling disconnection if tension within the lead exceeds a pre-set safety level. The power system can use standard 120 volts or may, through transformer circuitry mounted on the chair or at another near location, enable use of lower voltage, especially if warranted or mandated for safety and/or certification reasons. Engagement of the power transfer members, whether of standard or dedicated design, can be such that upon deliberate or accidental disengagement of members at the power transfer unit, an associated electrical lead is spring-returned to a storage position. This can reduce the chance of accident or damage occurring in the event that a chair is inadvertently moved past the limit position set by the extension lead tethering.

In some embodiments, as an alternative to Mains power supply, a battery or battery pack may be used to connect to the furniture and provide system power. In an embodiment circuitry can be applied to render an individual piece of furniture adaptable to either this form of power or Mains Alternating current. This can use a custom or standard connector, and/or can include an external adapter in one or both modes of operation.

Figure 3B:
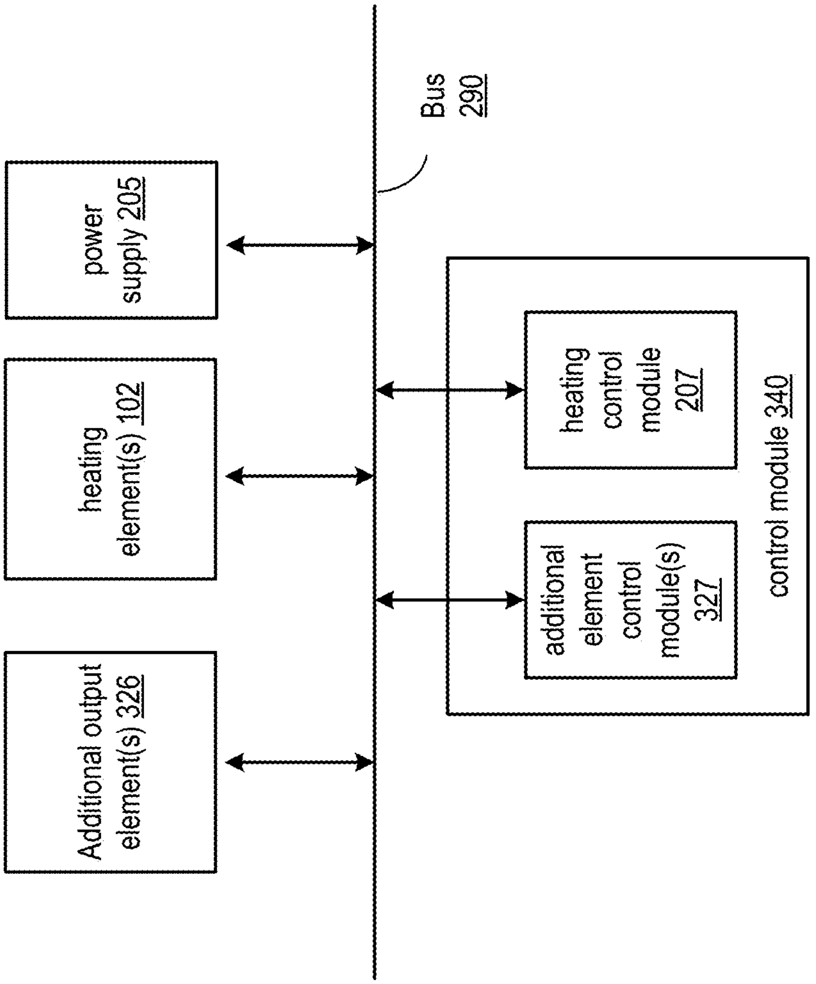

FIG. 3B illustrates an embodiment of furnishing unit 110 that further includes and/or is in proximity to at least one additional electrically-powered output element 326. Some or all features and/or functionality of FIG. 3B can implement the furnishing unit 110 of FIG. 3A, of FIG. 1, and/or any other embodiment of furnishing unit 110 described herein.

Power supply 205 of a given furnishing unit 110 can be utilized to not only power heating element 102, but to further power at least one ancillary devices at or near the location of the article of furniture implementing furnishing unit 110. In particular, the heating power to an article of furniture such as a chair can offers the opportunity to implement electrically powered ancillary devices at or near the location of the article of furniture. In some embodiments, additional electrically-powered output elements 326 can share the same power supply 205 with heating element 102 through a step-down transformer, or another transformer.

Some or all additional electrically-powered output elements 326 can be controlled via corresponding additional element control modules 327. For example, a control module 340 is implemented to control heating via heating element 102 as well as configuration of other electrically-powered output elements 326, where these different elements are controlled separately or in tandem. For example the control module 340 can be operable to generate control data that causes; distributing and/or modulating of power delivered to both the heating element 102 as well as various additional electrically-powered output elements 326; turning the heating element 102 and/or additional electrically-powered output elements on and/or off over time; changing the level of output or other configuration of the heating element 102 and/or additional electrically-powered output elements 326 at various times; or other configuration of the heating element 102 and/or additional electrically-powered output elements. For example, the control module 207 can collect and/or generate control data based on status information of the power supply 205, the heating element 102, and/or least one additional electrically-powered output element 326 the furniture, such as on/off, warming up, at temp, fault, and the like.

The control module 340 can be implemented via at least one processing module, at least one memory module that stores operational instructions executed by the at least one processing module causing the processing module to generate control data and/or configure functionality of the heating element 102 and/or additional electrically-powered output elements. The control module 340 can be implemented via other circuitry that enables control of the power delivered and/or configuration of heating element 102 and/or one or more additional electrically-powered output elements 326.

In some embodiments, at least one additional electrically-powered output element 326 can be implemented as at least one wireless charging station. The wireless charging station can be implemented via a charging coil mounted on the article of furniture to be heated and shares the same supply, such as via a step-down transformer, as the heating element. The charging coil can be, for example, suitably mounted or located under a chair seat, on or under the arm of a chair, near the lip of a table, etc., to permit charging of cell phones, laptop computers and similar devices.

In addition or in the alternative, at least one additional electrically-powered output element 326 can be implemented as at least one lighting device, such as at least one light emitting diode (LED), at least one embedded optical fiber, optical sources, a display device displaying graphical image data, and/or related control devices. For example, LED lighting of the ground below the furniture to be heated, can share the same supply (e.g. through a step-down transformer) as the heating element and/or can be controlled by its own control circuitry, can share the use of the heater control circuitry, and/or can be controlled via control module 340. As another example, LED backlighting of a translucent or transparent company Logo on the furniture to be heated, shares the same supply (e.g. through a step-down transformer) as the heating element and/or can be controlled by its own control circuitry, can share the use of the heater control circuitry, and/or can be controlled via control module 340.

In another implementation LED lighting of the ground below the furniture and/or LED backlighting of the translucent or transparent company logo on the furniture to be heated, shares the same supply (e.g. through a step-down transformer) as the heating element and may be controlled by its own control circuitry, share the use of the heater control circuitry, and/or can be controlled via control module 340. Control data generated by the control module 340 and/or other control circuity can enable the various lighting to provide ambient effects, such as Breathing, pulsing, beating, changing color, changing intensity, flashing, and/or other LED effects. The lighting device can otherwise be implemented: to render the object visible in the dark for safety purposes; denote whether the furnishing unit is in use or available; to present corporate logos; to present a display which changes dynamically in response to music or other stimulus and/or which displays media data such as video data or gaming data, or other purposes.

In some embodiments, the control data can be generated to configure some or all of these various lighting effects, or other output, based on user configuration data generated by a user, such as data received via a user input device, accessed in a user account via the network, and/or otherwise determined as having been pre-set, selected in real time, and/or otherwise configured by a user, such as an owner of the furnishing unit 110, person running a corresponding establishment that contains the furnishing unit 110, or person sitting in and/or in proximity to the furnishing unit 110.

In some embodiments, the control data can be generated to automatically configure these lighting effects based on other state data, and/or based on control data received from another source. For example, the lighting can change to indicate whether or not the furnishing unit is currently occupied by and/or reserved by a user, where the lighting turns on or off, changes color, intensity, flashing pattern, or other effect based on detecting whether the furnishing unit is currently occupied. This can include processing data collected via pressure sensors or occupancy sensors of the furnishing unit to determine whether a user is sitting in and/or in proximity to the furnishing unit. This can alternatively or additionally include processing data received via a communication channel indicating the user has reserved and/or paid for use of the furnishing unit 110, for example, via a server system of a corresponding establishment. This can alternatively or additionally include processing data received via a credit card reader or other financial transaction terminal integrated within the furnishing unit 110 indicating the user has paid for use of the furnishing unit 110.

As another example, in some embodiments, the control module 340 or other control circuitry accepts musical input, and processes the music to exercise variations in the lighting effects. The musical input can be received via at least one microphone of the furnishing unit and/or a known characteristics of a currently played playlist such as a tempo of the music can be accessed, received, or otherwise determined. This music can be played via speakers at a corresponding establishment and/or indoor or outdoor space.

Alternatively or addition, this music can optionally be played via speakers integrated within the furnishing unit 110 as an additional electrically-powered output element 326 sharing the power supply 205. For example, a user such as an owner of the establishment or person currently sitting in and/or in proximity to the furniture can select a song, playlist, radio station, configure volume, or otherwise configure the music via a user input device. In addition or in the alternative, in furnishing unit 110 can receive the music via a communication interface, such as music from a radio station, and/or retrieved via the Internet or other network. In addition or in the alternative, in furnishing unit 110 can access the music to be played in its own memory and/or in other memory accessible by processing resources of furnishing unit 110.

In some embodiments, the control data can be generated to automatically configure these lighting effects based on automatically adapting to other chairs and/or furniture sharing the same circuit and/or in a same physical area to provide effects expanding across the group. These group-based effects can be automatically selected and/or can be tuned by or pre-selected for the owner and/or current user of the furniture. Embodiments illustrating a group of furniture that communicate are discussed in further detail in conjunction with FIGS. 4D-4H.

Figure 3C:
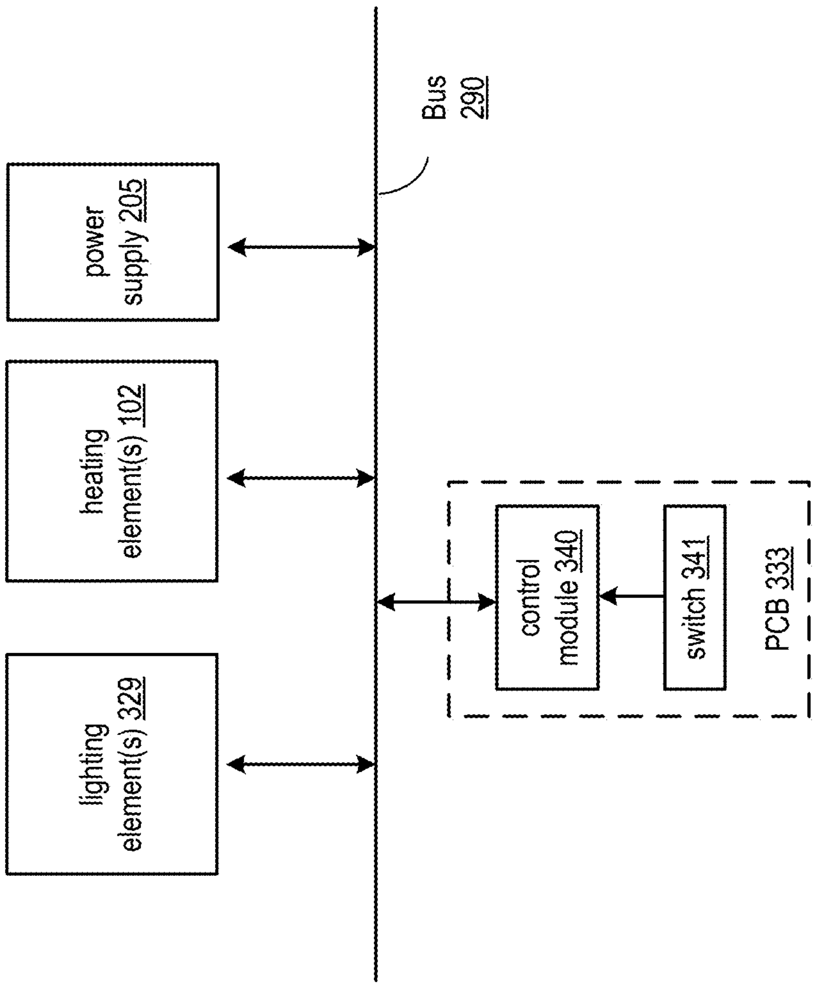

FIG. 3C illustrates an example embodiment of a furnishing unit 110 that implements functionality of control module 340 via a printed circuit board (PCB) 333 that includes a switch 341. Some or all features and/or functionality of the furnishing unit 110 of FIG. 3C can be utilized to implement the furnishing unit 110 of FIG. 3A, of FIG. 1, and/or any other embodiment of the furnishing unit 110 described herein.

In some embodiments, manual toggling of, and/or other interaction with, switch 341 via user input can cause corresponding changes to the power delivered to one or more heating elements 102 to turn heating elements on and off, and/or to change the intensity of heating 105 generated by heating elements 102 between multiple different heating levels. Manual toggling of, and/or other interaction with, switch 341 via user input can further cause corresponding changes to the power delivered to one or more lighting elements 329, such as turning of lighting elements 329 on and/or off and/or otherwise configuring the state of one or more lighting elements 329.

FIGS. 3D-3H illustrate an example embodiment of a PCB element 133 of a furnishing unit 110. Some or all features and/or functionality of the PCB element 133 of FIGS. 3D-3H can be integrated within the furnishing unit 110 of FIG. 1 and/or any other embodiment of furnishing unit 110 described herein. Some or all features and/or functionality of the PCB element 133 of FIGS. 3D-3H can be utilized to implement some or all of the control module 340 of FIGS. 3B and/or 3C and/or some or all of the heating control module 207 of FIGS. 3A and/or 3B.

Figure 3E:
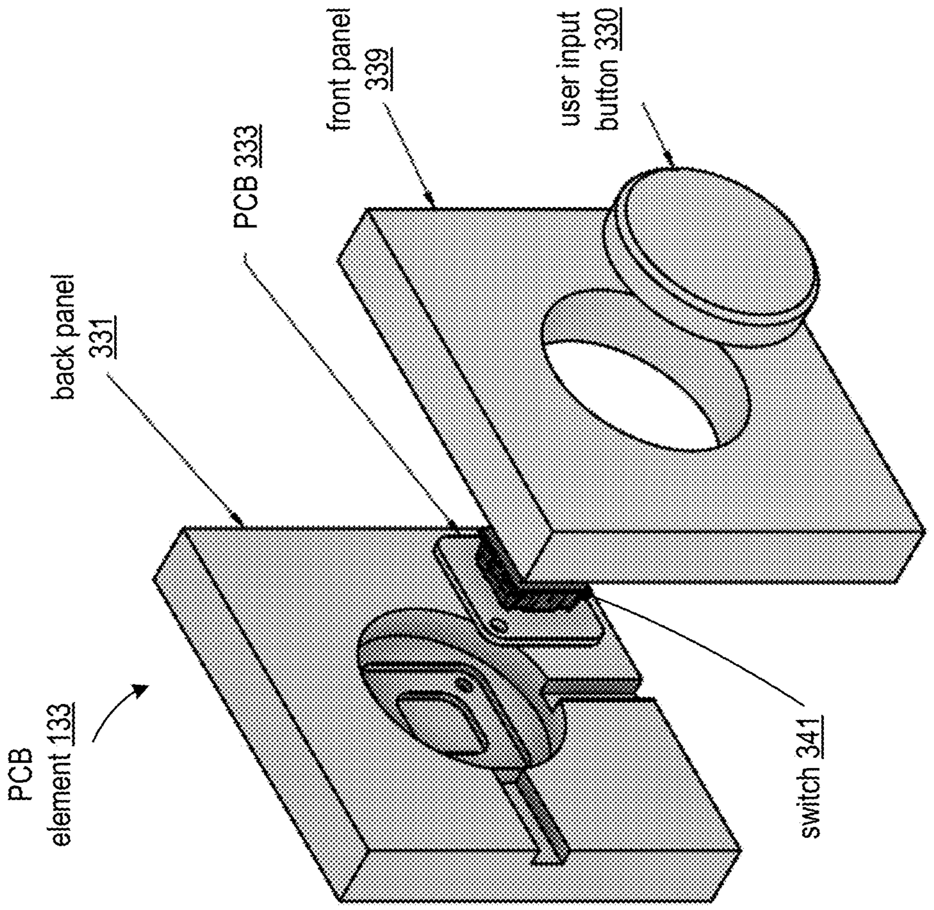
Figure 3D:
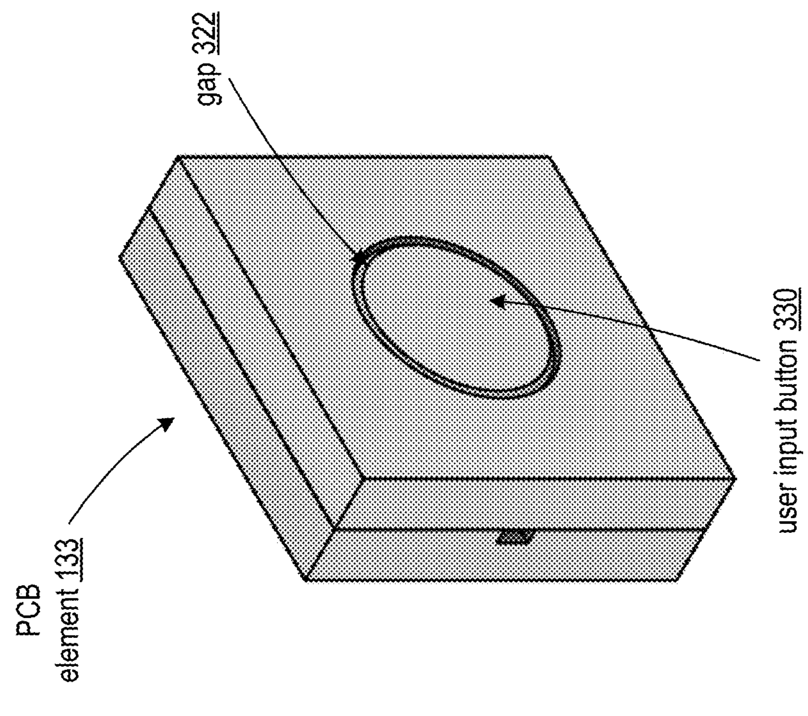

As illustrated in FIG. 3D, PCB element 133 can include a user input button 330, which can have a gap 322 with paneling of the PCB element 133. The user input button 330 can physically move when pressed, for example, having strong tactile feedback for the user when pressing user input button 330. The PCB element 133 can be permanently attached to a portion of furnishing unit 110, can be removable from furnishing unit 110, and/or can have a wired and/or wireless connection with heating control module 207 of furnishing unit 110.

As illustrated in FIG. 3E, the PCB element 133 can encase a PCB 333 that includes a switch 341 between a front panel 339 and back panel 331. The user input button can be exposed, and when pressed, can actuate switch 341.

Figure 3F:
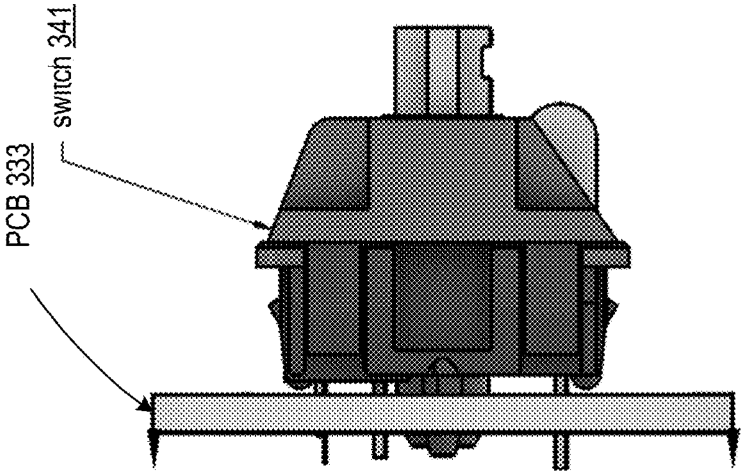
Figure 3G:
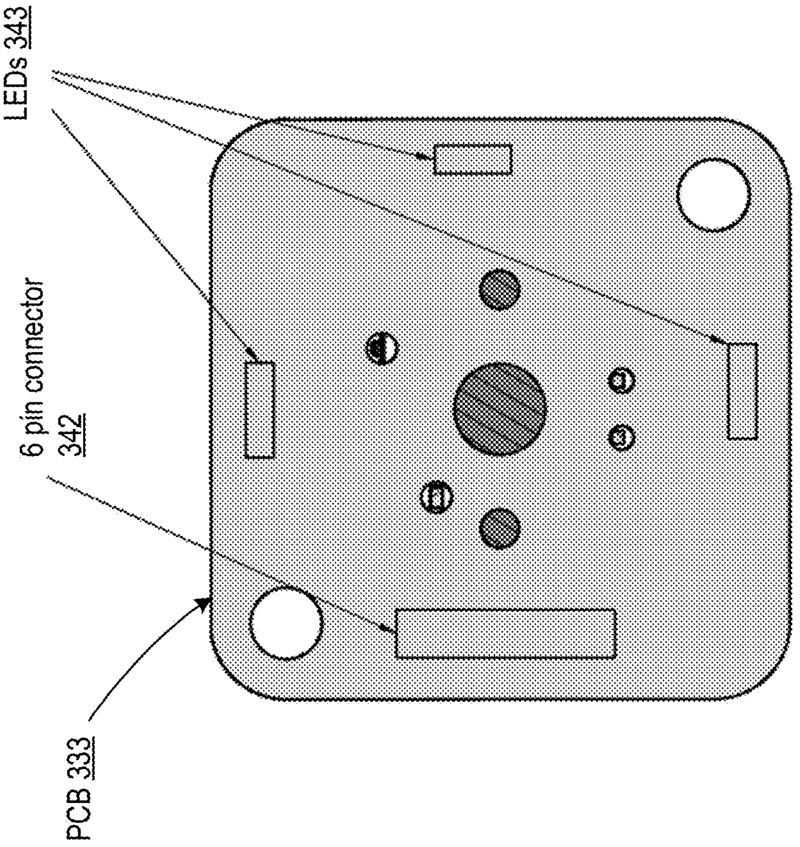

FIG. 3F presents a side view of an embodiment of PCB 333 that includes switch 341. FIG. 3G illustrates a back view of this embodiment of PCB 333. The PCB 333 can further include a 6-pin connector 342 and/or multiple LEDs 343, such as three LEDs 343 arranged at 0, 90, and 180 degree increments as illustrated in FIG. 3G. The LEDs can be outward facing and/or otherwise configured such that, when lit, the light emitted is visible through gap 322 of FIG. 3D. The LEDS 343 can be individually controllable via PCB 333, where different individual LEDs 343 can be toggled between on and off states individually.

The PCB 333 can be implemented to cycle through four possible configurations of lighting of LEDs 343, which can correspond to different states of heating element 102. The different configurations of lighting of LEDs 343 can be visible via gap 322 to indicate the current state of heating element 102.

Figure 3H:
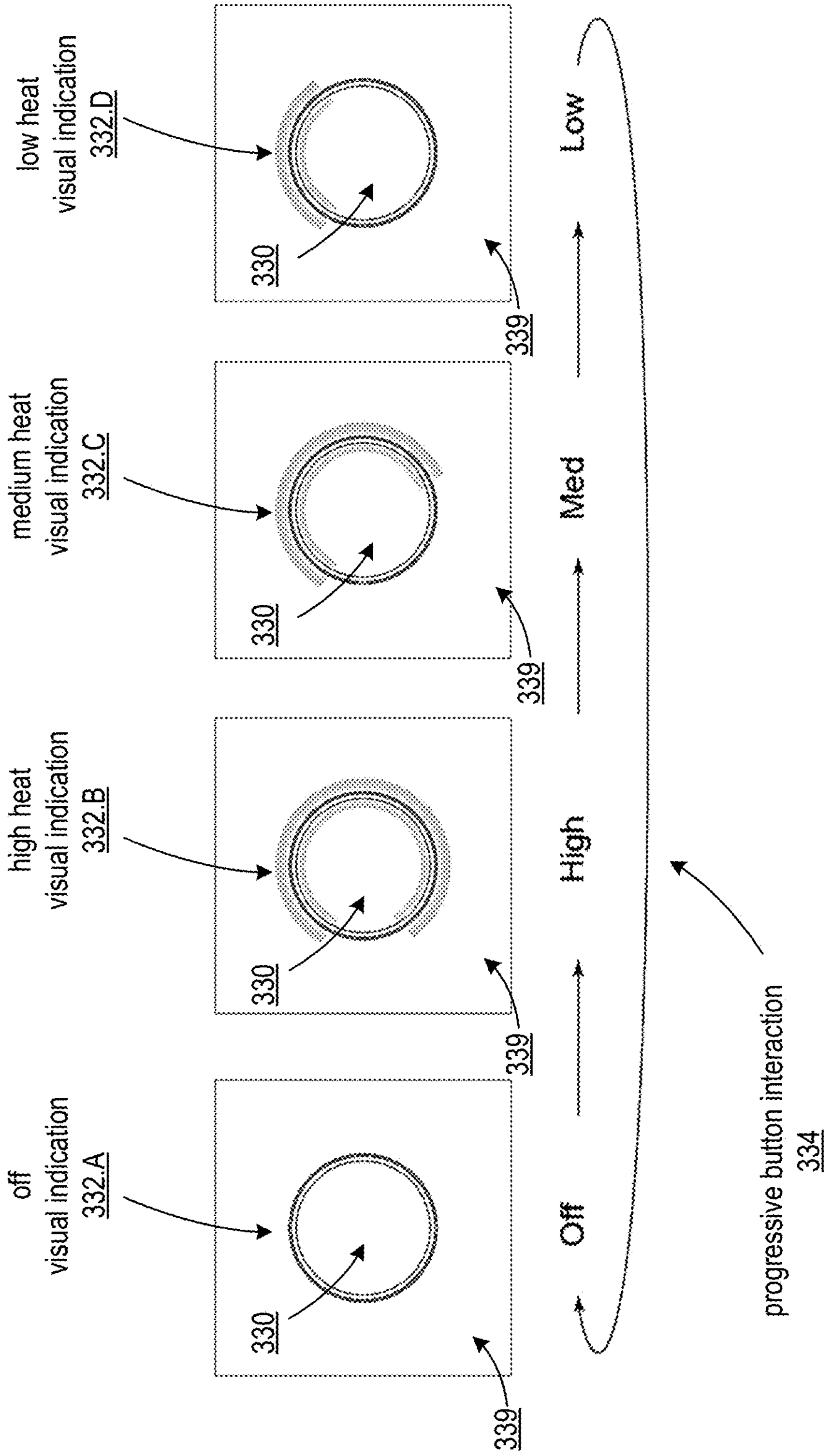

FIG. 3H illustrates an example embodiment of a set of four visual indications 332.A-332.D denoted via different configurations of lighting of LEDs 343 of PCB element 133 that can denote four corresponding different states of heating element 102: off; high; medium; and low. As progressive button interaction 334 is induced via user pressing of the button 330, the furnishing unit 110 can cycle between these four states. Progression into a next state via activation of switch 341 of PCB 133 can automatically induce changing of lighting of one or more LEDs 343 as well as adjusting of power delivered to heating element 102 via corresponding circuitry PCB 133.

For example, no power is delivered to heating element 102 when in the off state; a first power level is delivered to heating element 102 when in the high heat state; a second power level lower than the first power level is delivered to heating element 102 when in the medium heat state; and/or a third power level lower than the second power level is delivered to heating element 102 when in the low heat state. An intensity and/or temperature of heating 105 by heating element 102 when in the high state can be greater than that when in the medium state, and/or an intensity and/or temperature of heating 105 by heating element 102 when in the medium state can be greater than that when in the low state. The high, medium, and low state can all correspond to non-zero power delivered to heating element 102, where some level of heating 105 is emitted, and can thus all be considered different on states. The off state can correspond to no power delivered to heating element 102, where no heating 105 is emitted.

Off visual indication 332.A can correspond to no lighting via gap 322 due to no LEDs 343 being lit while the heating element 102 is off. High heat visual indication 332.B can correspond to lighting via gap 332 surrounding approximately and/or greater than 270 degrees, due to all three LEDs 343 being lit when the heating element 102 is operating under the high heat state, for example, where all LEDs 343 change from being unlit to being lit when entering the high heat state from the off state. Medium heat visual indication 332.C can correspond to lighting via gap 332 surrounding approximately and/or greater than 180 degrees, due to exactly two LEDs 343 being lit when the heating element 102 is operating under the medium heat state, such as the top LED 343 and the side LED 343 of FIG. 3G being lit and the bottom LED 343 changing from being lit to unlit when entering the medium heat state from the high heat state. Low heat visual indication 332.D can correspond to lighting via gap 332 surrounding approximately and/or greater than 90 degrees, due to exactly one LED 343 being lit when the heating element 102 is operating under the low heat state, such as the top LED 343 of FIG. 3G being lit and the side LED 343 changing from being lit to unlit when entering the low heat state from the medium heat state. When reentering the off state, the top LED 343 of FIG. 3G can change from being lit to being unlit to render all three LEDs unlit.

Figure 3I:
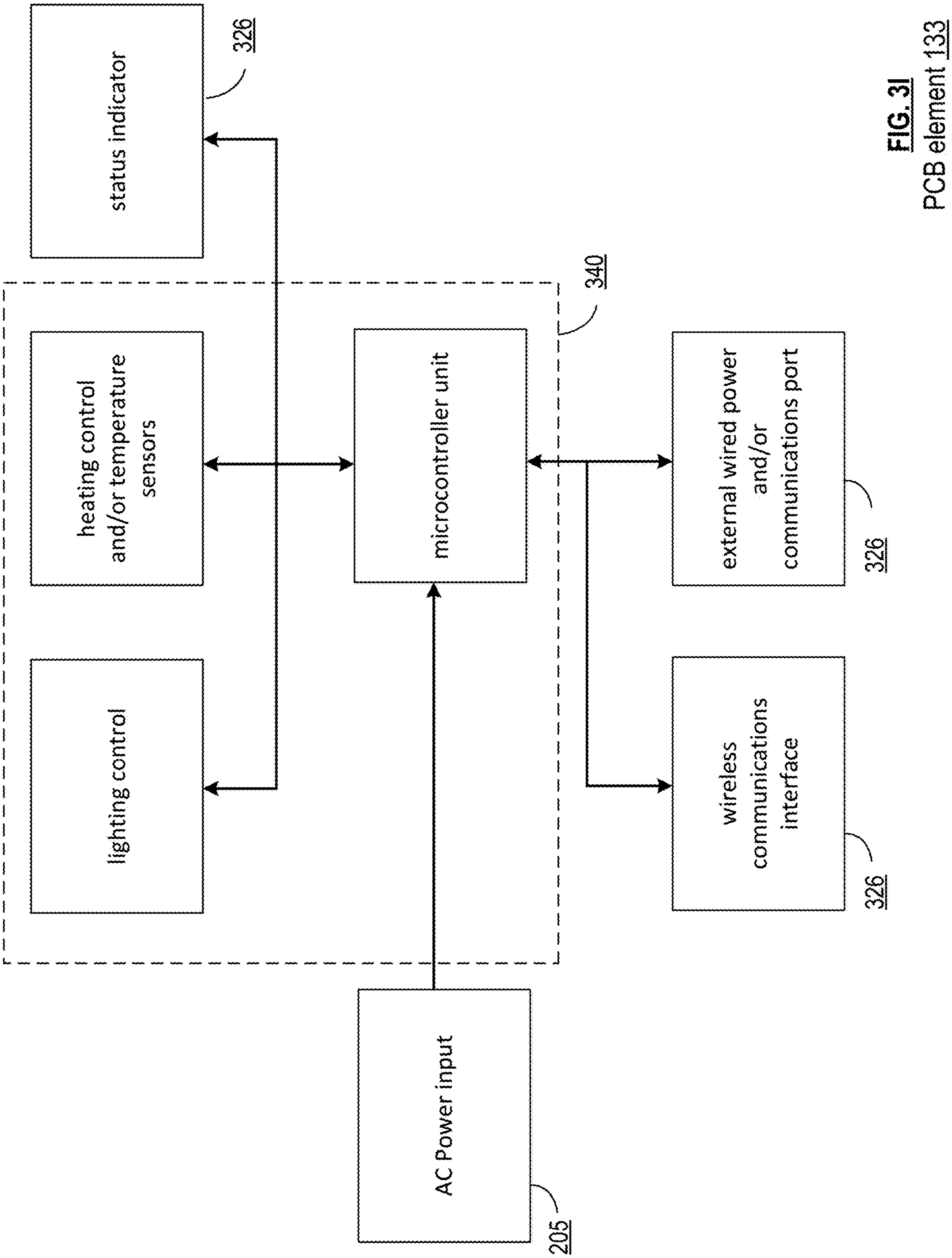

FIG. 3I is a schematic block diagram of an example embodiment of a PCB element 133. Some or all features and/or functionality of the schematic block diagram FIG. 3I can implement the schematic block diagrams of some or all of FIGS. 3A-3C. Some or all features and/or functionality of the PCB element 133 of FIG. 3I can implement the PCB element 133 of some or all of FIGS. 3D-3H.

The PCB element 133 can include a microcontroller unit powered via AC power input. The AC power input can be implemented as power supply 205. The microcontroller unit can be implemented as an ESP32, an NXP i.MX series, and/or any other microcontroller unit. The microcontroller unit can implement some or all of control module 207, can include at least one processor and/or memory, and/or can be operable to perform and/or control some or all functionality of furnishing units 110 described herein.

The PCB element 133 can include and/or be coupled to at least one external wired power and/or communications port. For example, the external wired power and/or communications port is implemented via an external USB plug, such as an external USB type-C plug for 3 amp charging and/or connectivity. Some or all functionality of microcontroller unit can be configured via communications received via the external wired power and/or communications port, such as via a mobile device connected to the external wired power and/or communications port via a wired connection, such as via a USB cable. The microcontroller unit can facilitate sending of power to charge mobile devices or other devices to the external wired power and/or communications port via the wired connection. The microcontroller unit can facilitate sending of communications, such as status data, sensing data, wireless connectivity data, and/or other data, to mobile devices or other devices connected to the external wired power and/or communications port via the wired connection. The at least one external wired power and/or communications port can optionally be implemented an additional output element 326 and/or can implement functionality of control module 340. In some embodiments, wireless charging capabilities and/or wireless connectivity capabilities can be implemented instead of or in addition to an external wired power and/or communications port The PCB element 133 can include and/or be coupled to at least one wireless communications interface. For example, the at least one wireless communications interface is implemented to facilitate Wi-Fi communications and/or Bluetooth communications. Some or all functionality of microcontroller unit can be configured via communications received via the wireless communications interface, such as via a mobile device and/or server system paired to and/or communicating with the corresponding furnishing unit via a wireless connection, such as a Bluetooth connection, Wi-Fi connection, and/or other wireless communications medium. The microcontroller unit can facilitate sending of communications, such as status data, sensing data, wireless connectivity data, and/or other data, to mobile devices, server systems, and/or other devices communicating with the furnishing unit via the wireless communications. The at least one wireless communications interface can optionally be implemented an additional output element 326 and/or can implement functionality of control module 340.

The PCB element 133 can include and/or be coupled to heating control and/or temperature sensors, which can include controllers such as heat control module 207 and/or heating elements implemented as and/or coupled to heating elements 102. For example, the heating control and/controls heating of one or more heating elements 102. This can include controlling the intensity by which one or more heating elements 102 is heating at a given time. This can alternatively or additionally include controlling which subset of a set of multiple heating elements 102 are activated at a given time (e.g. seat back heating element vs. seat bottom heating element can be independently turned on or off, or have heating intensity tuned, at a given time to enable heating of buttocks only, back only, or both). In such embodiments, the heating control can implement heating zone control to control heating within different locations of the furnishing unit (e.g. at least one seat back zone, a left seat arm zone, a right seat arm zone, at least one seat bottom zone, etc.). In some embodiments, the heating zone control controls heating of 6 zones, or another number of zones. The heating control can control lighting elements based on control data generated by and/or received from the microcontroller unit of FIG. 3I. Some or all of the heating control can be implemented via the microcontroller unit of FIG. 3I. The heating control of FIG. 3I can implement some or all of control module 340.

Configuration of heating intensity in one or more zones can be based on one or more temperature sensors, for example, where greater heating intensity and/or heating in a greater number of zones is automatically facilitated via the heating control when lower temperatures are measured via temperature sensors, and/or where lower heating intensity heating in a smaller number of zones is automatically facilitated via the heating control sensors when higher temperatures are measured via temperature sensors.

The PCB element 133 can include and/or be coupled to lighting control, which can include controllers such as one or more additional element control modules 327 and/or output elements 326 implemented as and/or coupled to lighting elements 329. For example, the lighting control controls LED light zones, a subset of a plurality of LEDs or other lighting devices illuminated at a given time, a color emitted by one or more lighting devices illuminated at a given time, intensity of light emitted by one or more LEDs of other lighting devices illuminated art a given time, and/or other powering of and/or configuration of any type of lighting devices 329 described herein. The lighting control can control lighting elements based on control data generated by and/or received from the microcontroller unit of FIG. 3I. Some or all of the lighting control can be implemented via the microcontroller unit of FIG. 3I. The lighting control of FIG. 3I can implement some or all of control module 340.

The PCB element 133 can include and/or be coupled to a status indicator, which can be implemented as an output element 326. For example, the status indicator is optionally implemented as a lighting element controlled by the lighting control, such as the set of LEDs of FIGS. 3G and 3H denoting current heating intensity. The status indicator can be implemented via another type of lighting element, at least one speaker emitting audio output, a communication interface transmitting status data to a server system and/or proximal mobile device, and/or other output element 326 that visually, audibly, or otherwise communicates status of the heating elements and/or other status of the corresponding furnishing unit.

FIGS. 4A-4H illustrate embodiments where multiple furnishing units 110 are in a same furnishing unit group. A group of furnishing units can be located in a same establishment and/or physical boundary, be owned by a same person or entity, can be in physical proximity, and/or can otherwise be grouped together. In particular, a group of furnishing units can be operable to draw power from a shared power source via power connections with each other and/or can be operable transmit and receive communications signals via communications connections with each other. Some or all features and/or functionality of FIGS. 4A-4H can implement the furnishing unit 110 of FIG. 1, and/or any other embodiment of furnishing unit 110 described herein.

In some embodiments, an extension lead can be taken from the chair to a central power unit for servicing a group of heating-capable chairs or one of a group of chairs can have a central heating power source for heating the other chairs in the group. For example, as illustrated in FIG. 4A, multiple furnishing units 110 are powered via individual wired and/or wireless power connections 220 drawing power from a same power source 410. In some embodiments, one piece of furniture has both an input and output connection enabling furniture to be "Daisy chained" one to another. For example, as illustrated in FIG. 4B, multiple furnishing units 110 are powered by power source 410 via indirect connections, where some furnishing units 110 receive power directly from other furnishing units 110 via power connections 220 drawing power supplied by these other furnishing units 110, and where some furnishing units 110 further output power to other furnishing units via power connections 220 with these other furnishing units. In addition or in the alternative, one piece of furniture may act as a central connection hub for several others. For example, as illustrated in FIG. 4C, multiple furnishing units 110 are powered by a particular furnishing unit 110, who receives power from power source 410 or optionally from another furnishing unit 110, receiving power via a daisy chain in a same or similar fashion as illustrated in FIG. 4B. In either example, a first furnishing unit 110 supplying power to a second furnishing unit via a power connection 220 can be considered the power source of the second furnishing unit.

As a particular example, a first furnishing unit 110 implemented as a table acts as a central connection hub for one or more furnishing units 110 implemented as chairs connected to it via power connections 220 drawing power from the table. This table can optionally be operable to provide its own heating via its own heating elements, or is simply implemented to facilitate the connection with other furnishings, such as chairs, to enable powering of these other furnishings in delivering heating 105.

Power received directly or indirectly by a furnishing unit 110 from a power source 410 via a power connection 220 with power source 410 and/or via a power connection 220 with another furnishing unit 110 can be utilized to implement the power supply 205 of FIGS. 3A and/or 3B, and/or can otherwise be utilized to power its heating element 102 and/or one or more of its additional output elements 326.

Power connections 220 between furnishing units can be implemented via lead tethering connected to power transfer devices of the furnishing units. The power transfer devices of some or all furnishing units in the group of furnishing units can be implemented via easy-release mechanisms as discussed previously to help ensure that damage is not imposed in the event that a chair is inadvertently moved past the limit position set by the lead tethering between the furnishing units.

Furnishing units 110 can optionally be similarly connected via wireless and/or wired communications connections 221 to facilitate transfer of data between different furnishing units 110. For example, as illustrated in FIG. 4D, furnishing units can include a communications interface enabling receipt of data generated and/or relayed by other furnishing units 110, and/or enabling transmission of data for processing by and/or relaying by other furnishing units 110. Two or more furnishing units 110 of a same group of furnishing units can thus communicate various data. This data can include status data, control data, or other data.

The wireless and/or wired communications connections 221 can be implemented via circuitry, physical wiring, Bluetooth connections, Wi-Fi connections, short range wireless communications, the Internet, a local area network, and/or any other wired and/or wireless communications connections. While communications connections 221 are illustrated as one to one bidirectional connections, data can alternatively or additionally be broadcast and/or transmitted via a common network for receipt and/or retrieval by other furnishing units.

As illustrated in FIGS. 4E and 4F, in addition or in the alternative to communicating with one another, a group of furnishing units can be collectively controlled via a group control module 440, which can be implemented in a same or similar fashion as control module 207, 327, and/or 340. The group control module 440 can generate control data that is transmitted to and processed by control modules and/or other processing resources of individual furnishing units to configure heating and/or other functionality of the furnishing unit. The control data generated and sent to different furnishing units 110 via group control module 440 at a given time can be the same or different for different furnishing units 110 to enable same or different configuration of heating, lighting, power consumption, power transfer, or other configurable functionality of furnishing units.

In some embodiments, the control data is broadcast and/or sent individually via distinct communications connections 221 to different furnishing units as illustrated in FIG. 4E. In addition or in the alternative, control data can be relayed via one or more furnishing units 110 in a daisy chain fashion as illustrated in FIG. 4F. Other network configurations of furnishing units connected via communications connections 221 can be implemented in other embodiments. The configuration of communications connections 221 connecting a group of furnishing units can be the same or different from a configuration of power connections 220 of the group of furnishing units, for example, where communications connections 221 and power connections 220 are implemented as wired connections, wired together to reduce the network of wiring required to facilitate transfer of power and data between furnishing units.

In some embodiments, the control data received by a given furnishing unit can be relayed to other furnishing units 110 with which a given furnishing unit has communication connections 221, for example, where same control data is applied by all furnishing units. In addition or in the alternative, different control data can be designated for different furnishing units, where a given furnishing unit can receive, from a prior furnishing unit or from the group control module 440 directly, control data designated for itself, as well as a set of additional control data designated for one or more other furnishing units 110. The given furnishing unit can process its own control data for configuring of its own heating element and/or other output elements, can further route set of additional control data to appropriate furnishing units to ensure all control data ultimately receive and process their individual control data in generating their heating and/or other functionality accordingly.

The group control module 440 can be implemented via a computing device, remote control device, smart phone, and/or any other circuitry and/or processing module operable to generate and transmit control data. In some embodiments, the group control module 440 can optionally generate control data based on user input received by the group control module 440, for example, where a user configures various functionality of the group of furnishing units.

The group control module 440 can optionally be implemented as a control module 340 of a given furnishing unit, where one or more furnishing units of a given furnishing unit group can be operable to control other furnishing units.

In some embodiments, instead of or in addition to one furnishing unit controlling other furnishing units, some or all furnishing units can automatically adjust their own heating, communication, power draw, and/or other output via their own control module, adaptively based on changes detected for the group of furnishing units as a whole. For example, furnishing units can be dynamically self-healing, and/or the removal or addition of a furnishing to a group, such as group powered via a common power supply, can automatically cause each furnishing unit in the group to adjust its power draw or other output, and/or can cause the entire group as a whole to continue operating within the set parameters. In such embodiments, a set of independently operating control modules 340 of a set of multiple furnishing units within a given group of furnishing units can collectively implement the group control module 440 and/or can otherwise collectively facilitate any functionality of the group control module 440 described herein, independently and/or in conjunction, with or without coordination with other furnishing units in the group. In some embodiments, control module 340 of some or all furnishing units in a given group of furnishing units can be operable to detect removal or addition of a furnishing units to the group, can be operable to detect changes in power input, and/or can be operable to detect other changes. Such changes detected by individual furnishing units can cause different furnishing units to each automatically adjust their own heating, communications, power consumption, and/or other functionality accordingly, independent from and/or without communication with other furnishing units, and/or based on control data or other communications and/or coordination with other furnishing units.

In some embodiments, the group control module 440 can generate control data automatically based on received, measured, and/or otherwise determined state data. For example, metrics such as power consumption, power availability, health of a given furnishing unit, received user input data, measured weather data, occupancy of the furnishing unit, and/or other information can be measured by given furnishing unit as discussed previously. This information can be sent by the given furnishing unit as data via communications connections 221 to other furnishing units for use in generating their own control data for controlling their own heating elements 102 and/or additional output elements 326. In addition or in the alternative, this information can be processed by the control module of the given furnishing unit to generate control data that by the given furnishing unit as data via communications connections 221 to other furnishing units for use in controlling their own heating elements 102 and/or additional output elements 326, In addition or in the alternative to use by the given furnishing unit to control its own heating element 102 and/or additional output elements 326. In addition or in the alternative, this information can be sent by the given furnishing unit as data via communications connections 221 to the group control module 440, where the group control module 440 receives such metrics from some or all furnishing units in the group of furnishing unit it controls or otherwise communicates with, and/or where the group control module 440 collectively processes these metrics received from some or all furnishing units in the group of furnishing units to generate the control data sent to some or all furnishing units 110 as illustrated in FIGS. 4B and/or 4C.

In some embodiments, communications connections 221 are implemented to enable furnishing units 110 to communicate and intelligently modulate power consumption ensuring a system of connected furniture maintains a power draw below the threshold which would trigger overloading of a standard 15 A or 20 A electrical circuit while optimizing heat up time and heat maintenance. For example, the group control module 440, for example, implemented as a control module of a given furnishing unit, can be operable to automatically generate control data based on measured data of this given furnishing unit indicating levels of power input and/or power consumption, and/or based on measured data from other furnishing units indicating their own levels of power input and/or power consumption. The control data generated by heating control module 207 and/or group control module 440 can cause the power consumption by the furnishing unit 110 to modulate accordingly in powering heating elements 105. In addition or in the alternative, the control data generated by heating control module 207 of a given furnishing unit causes the power output by this furnishing unit 110 that is sent to one or other furnishing units 110 to modulate accordingly, where this power output is used by these other furnishing units 110 to power their own heating elements 105 based on receiving power from the given furnishing unit 110 as illustrated in FIGS. 4B and/or 4C. In addition or in the alternative, the control data generated by heating control module 207 of a given furnishing unit is transmitted to one or more other furnishing units to cause these other furnishing units to modulate their own power consumption and/or otherwise adapt their power usage.

In some embodiments, the group control module 440 can generate control data utilized to add and/or remove furnishing units 110 from a given group of furnishing units connected via a network of communication connections 221, power connections 220, and/or other group. For example, a user can interact with an interactive user interface to scan for nearby furnishing units, connect to furnishing units, add furnishing units to groups, remove furnishing units to groups, configure functionality of furnishing units, or other control.

FIGS. 4G and 4H illustrate example configurations of a group of furnishing units that are connected via various wired power connections 220 and/or wired communication connections 221. The group of furnishing units 110 can include different types of seating units 112.A, 112.B, 112.C, and/or 112.D.

For example, seating units 112.A can be implemented as couches that include one or more heating elements configured to provide heating and/or other output described herein to one or more people seated on the couch. One or more proximal seating units 112.A can form a lounge seating area as illustrated in FIG. 4H, for example, within a given indoor or outdoor establishment.

As another example, seating units 112.B can be implemented as chairs that include one or more heating elements configured to provide heating and/or other output described herein to a single person seated in the chair. One or more proximal seating units 112.B can be positioned around one or more corresponding tables to form a dining seating area as illustrated in FIG. 4H, and/or can be otherwise dispersed within the given indoor or outdoor establishment.

As another example, seating units 112.C can be implemented as bar stools, high chairs, or other seating that include one or more heating elements configured to provide heating and/or other output described herein to a single person seated in bar stool, high chair, or other seating. One or more proximal seating units 112.C can be positioned along a bar to form a bar seating area as illustrated in FIG. 4H, for example, within the given indoor or outdoor establishment. The seating units 112.C can be the same or different type of furniture as seating units 112.B.

As another example, seating units 112.D can be implemented as banquettes or other seating that include one or more heating elements configured to provide heating and/or other output described herein to one or more people seated in the banquette. One or more proximal seating units 112.D can be positioned along a bar and/or one or more tables to form a banquette seating area as illustrated in FIG. 4H, for example, within the given indoor or outdoor establishment. The seating units 112.D can be the same or different type of furniture as seating units 112.A.

In some embodiments, one or more tables and/or a bar around which various seating units 112 are positioned can be implemented as additional furnishing units 110 in the group of furnishing units. For example, the one or more tables and/or bar of FIGS. 4G and/or 4H can be connected to one or more seating units 112 via power connections 220 to deliver power to various proximal seating units 112. In addition or in the alternative, the one or more tables and/or bar of FIGS. 4G and/or 4H can be connected to one or more seating units 112 via communication connections 221 to route communications between and/or control various proximal seating units 112. In addition or in the alternative, the one or more tables and/or bar of FIGS. 4G and/or 4H can have their own heating elements 102 and/or additional output elements 326 that are powered via power connections 220 and that deliver heating and/or other output such as lighting, music, or other functionality accordingly.

In various embodiments of the furnishing unit 110. items with heating capability of the sort described previously are in communication with each other and with a controller so that, for example, heating-capable chairs, foot rests, table surfaces and under-the-table units communicate to establish and automatically adjust heat in a shared zone. In an embodiment of the disclosure, Wi-Fi control is used in conjunction with resistive heating elements and controller mounted at or incorporated in a heating-capable item to provide remote control and energy tracking of the item. In some embodiments, Wi-Fi control can be established by linking to the chair through a local Wi-Fi system. In absence of a local Wi-Fi system, the furnishing unit may become a Wi-Fi Access point for the purpose of enabling local control. In some embodiments, direct control is exercised through a local controller by a person located at and using the item. In some embodiments, the furnishing unit powers at least one communications interface implementing the Wi-Fi access point, Bluetooth communications, or other wireless local communications capability.

In various embodiments of the furnishing unit 110, the items of furniture include floor materials such as heating-capable patio stones. These may be individually heating-controlled using an accompanying or integrated smart interconnecting system. In one implementation, power moves from stone to stone making them an expandable system to suit any sized space and currently prevailing human foot traffic. Such stones, bricks or like externally deployed materials are, in one implementation, manufactured with a heating element mated to a reverse side or are manufactured with a phase change substance in an internal cavity, the phase change material providing heat when powered electrically.

In some embodiments, the stones, bricks, or other materials integrated within the floor, walls, ceiling, or other structural and/or infrastructure elements can further be operable to facilitate way finding and/or user following. For example, these stones, bricks, or other materials can be implemented via some or all functionality of furnishing units 110 discussed herein. These stones, bricks, or other materials can be implemented to include at least one sensor, for example, to detect presence of a user near these materials and/or stepping upon these materials. These stones, bricks, or other materials can be implemented to include at least one lighting device, for example, to facilitate lighting of the corresponding material, for example, to aid user's in finding a path to other furnishing units and/or to provide other way finding. In some embodiments, these stones, bricks, or other materials automatically illuminate lighting devices in response to detecting a user stepping upon stones, bricks, or other materials and/or otherwise in proximity to these stones, bricks, or other materials. In addition or in the alternative, these stones, bricks, or other materials illuminate lighting devices along a predetermined and/or dynamically determined path, for example, to illuminate at least one path ahead of the user's detected location and/or ahead of the user's detected direction of motion and/or behind the user's detected location and/or behind the user's detected direction of motion. In such embodiments, the stones, bricks, or other materials along a path in accordance with the user's direction of motion and/or projected direction of travel can be illuminated and/or can adapt to changes in the user's direction of travel as they walk along the corresponding floor and/or corresponding path containing these elements. In some embodiments, a predetermined destination is determined based on navigation data, routing data and/or other destination data determined for the user, received from a mobile device or other device of the user via a wireless communication connection, generated automatically based on the user's destination, and/or accessed via a server system. In such embodiments, the stones, bricks, or other materials along a path from the user's current location to the predetermined destination in accordance with this navigation data, routing data and/or other destination data.

In various embodiments of the furnishing unit 110, a communications link terminates at a heating-capable item of furniture with a remote information resource such as a web-based weather channel being periodically accessed over the link. In response, heating is turned on, or off, or adjusted, for example, to compensate for ambient or forecast temperature and wind chill. As an alternative to periodic operation, a weather link furnishes storm indications and the heating circuit is turned on, for example, for a period of time linked to an expected snowfall. A local communication link can use Bluetooth, Bluetooth Low Energy, Wi-Fi, LTE-M, NFC, or a similar communications protocol. In one implementation, a heating-capable chair or like item has a controller to energize the heating circuit on a periodic basis for melting snow or ice, for example, implemented via heating control module 207 of the chair.

In various embodiments of the furnishing unit 110, for a heating-capable item such as a chair connected to a communications link such as network 150 the internet, a QR or like code, and/or other visual identifier data mounted on or embedded in the chair or other item, allows a user to buy heating time. Such a chair is, in one implementation, for example, located in a public place, where heating funds can go to local coffers much as parking fees do.

In various embodiments of the furnishing unit 110, the heating circuit of a heating-capable item such as a chair is battery operated. In one battery implementation, the item has a solar rechargeable battery connected to a solar panel mounted in, on or near the item for optical exposure to ambient charging light.

In various embodiments of the furnishing unit 110, through an internet or like communication link to a heating-capable chair or like item, the heating control circuit is connected to a restaurant, bar, establishment, or other hospitality provider's point of sale (POS) system. A chair heating circuit can be activated when a customer sits down and de-activated when they leave, either triggered by the POS system when seating is assigned or by chair sensors detecting when a person sits in the chair or gets up. The system link is in one implementation used also to see what the customer purchased, how long they were at the table, and what temperature the chair is set to if there is local adjustment capability. This can enable data analytics to see which meals are most commonly eaten, how long people sit while eating a specific meal or drinking a specific drink, which table placement gets the most seating traffic, etc., for example, to generate some or all of learned characteristics data for users, products, furnishing units, and/or establishments as described herein.

FIGS. 5A and 5B illustrate an example embodiment of various parts of a furnishing unit 110 implemented as a seating unit 110. FIG. 5A illustrates a deconstructed back view of an embodiment of seating unit 110, while FIG. 5B illustrates a constructed back view of this embodiment of seating unit 110 with all members attached in their final configuration. Some or all features and/or functionality of the seating unit 112 of FIGS. 5A and/or 5B can implement the furnishing unit 110 of FIG. 1 and/or any other embodiment of furnishing unit 110 described herein. For example, the back view presented in FIGS. 5A and 5B can correspond to the back view of the furnishing unit 110 with front view depicted in FIG. 1.

The seating unit 112 can be configured for use outside, for example, on an outdoor patio in winter and/or other cold weather conditions. The seating unit 112 can be configured to be positioned with the feet of seat frame 124 upon a floor and/or ground.

The seating unit 112 can include a seat back 121 and a seat bottom 112. The seating unit 112 can be configured for a user to sit in the seating unit 112 with their buttocks upon a top side of the seat bottom 122 and their back against a front side of the seat back 121.

The seating unit 112 can include a seat frame 124 that supports the seat back 121 and seat bottom 122, for example, where the seat back 121 and seat bottom 122 are permanently and/or firmly attached to form a 98 degree angle or other angle.

The seating unit 112 can include a set of seat arms 123, upon which a user sitting in seating unit 112 can place their hands and/or arms. The seat arms can be attached to sides of the seat back, for example, within slotted inserts of the seat back 121.

In some embodiments, the seat back 121, seat bottom 122, seat arms 123, and/or seat frame 124 are comprised of a Corian™ material, and/or other composite materials such as cement, concrete, bio polymers, plastics, sintered/engineered stones, glass fiber reinforced Gypsum (GFRG) and the like which may be referred to as composite stone, manmade stone and/or artificial stone material and that is optionally weatherproof, weather resistant, or otherwise suitable for outdoor use. In some embodiments, the seat back 121, seat bottom 122, seat arms 123, and/or seat frame 124 are 3D printed and/or additive manufactured as discussed previously.

The seat bottom 122 can include a drainage insert 132 operable to collect water, for example, from precipitation such as rain and/or snow that has since melted, which can be ideal in reducing wetness applied to a user when they seat themselves into the seating unit 112 after rain and/or snow when the seating unit 112 is located in an outdoor area. The drainage insert can be comprised of a molded plastic material or other material. The drainage insert can be permanent or removable.

A seat back heating element 102.A can be attached to the back side of seat back 121, opposite the front side against which a user's back rests against while sitting. In addition or in the alternative, a seat bottom heating element 102.B can be attached to the underside of seat bottom 122, opposite the top side upon which a user's buttocks rests while sitting.

Seat back heating element 102.A and/or seat bottom heating element 102.B can be implemented as a heating pad, which can be implemented via some or all features and/or functionality as depicted in and discussed in conjunction with FIG. 2A and/or FIG. 2B. Seat back heating element 102.A and/or seat bottom heating element 102.B can be operable to deliver corresponding heating 105 through the seat back 121 and seat bottom 122, respectively, to provide corresponding warmth to the user's back and/or buttocks while seated in the seating unit 112.

A PCB element 133 can facilitate delivery of power to and/or control of seat back heating element 102.A and seat bottom heating element 102.B. The seat back heating element 102.A and seat bottom heating element 102.B can be implemented via some or all features and/or functionality of heating element 102 described herein. The PCB element 133 can be implemented via some or all features and/or functionality of PCB element 133 of FIGS. 3D-3H and/or can implement the heating control module 207, at least one additional element control module 327, control module 340, control module 440, and/or any other control module, processing resources, and/or circuitry of furnishing unit 110 described herein.

The seat back heating element 102.A and/or seat back heating element 102.B can be encased by a heating pad cover plate 134, for example, to protect users from exposed portions of the heating elements 102 and/or to insulate the heating elements 102. The PCB element 133 can remain exposed, for example, to facilitate user access to press and/or otherwise physically interact with user input button 330 or other user input module of the PCB element 133.

In various embodiments of the furnishing unit 110, parts of a heating-capable structure such as a chair are, through articulation or material flexibility, moved relative to one another and relative to the main body of the structure. In the case of a chair, such articulation or flexibility is between a body part of the chair and any of the chair seat, chair back, chair sides, chair arms, etc. Relative movement of chair parts is used to tailor heat transfer and distribution to people of different stature and physique. Tailored movement in another case permits the addition of more warmth to one part of a person's body—for example, a sitter's hands—that feel subjectively cold to the sitter.

FIGS. 6A-6D present top, front, side, and back views, respectively, of an example embodiments of seating unit 112. Some or all features of seating unit 112 of FIGS. 6A-6D can implement the seating unit 112 of FIGS. 5A and/or 5B, the furnishing unit of FIG. 1, and/or any other embodiment of furnishing unit described herein. The various dimensions of various aspects of seating unit 112 presented in FIGS. 6A-6D can correspond to inches, or another common unit.

As illustrated in FIGS. 6A-6D, the seating unit 112 can optionally include one or more etched logos 136. Some or all instances of etched logo 136 can optionally be implemented as a transparent and/or translucent logo that is backlit by an LED or other light as discussed previously. The etched logo 136 can be implemented as one or more letters and/or shapes etched into and/or attached to the surface of seating unit 112, and/or that are otherwise visible to users in proximity to the seating unit 112. Other embodiments of seating unit 112 can have logos 136 in different locations and/or can have no logo.

FIGS. 6E-6H present top, front, side, and side views, respectively, of an example embodiments of a seat frame 124 of a seating unit 112. Some or all features of seat frame 124 of FIGS. 6E-6H can implement the seat frame 124 of seating unit 112 of FIGS. 5A, 5B, and/or 6A-6D, a seat frame of furnishing unit of FIG. 1, and/or a seat frame of any other embodiment of furnishing unit described herein. The various dimensions of various aspects of seat frame 124 presented in FIGS. 6E-6H can correspond to inches, or another common unit, such as a same unit as dimensions presented in FIGS. 6A-6D. Other embodiments of seat frame 124 can have different shape, size, and/or dimensions. Some or all portions of the seat frame 124 can have a 24 mm thickness or other thickness.

FIGS. 6I-6L present three-dimensional front, top, side, and side views, respectively, of an example embodiments of a seat bottom 122 of a seating unit 112. Some or all features of seat bottom 122 of FIGS. 6I-6L can implement the seat bottom 122 of seating unit 112 of FIGS. 5A, 5B, and/or 6A-6D, a seat bottom of furnishing unit of FIG. 1, and/or a seat bottom of any other embodiment of furnishing unit described herein. The various dimensions of various aspects of seat bottom 122 presented in FIGS. 6I-6L can correspond to inches, or another common unit, such as a same unit as dimensions presented in FIGS. 6A-6D. Other embodiments of seat bottom 122 can have different shape, size, and/or dimensions. Some or all portions of the seat bottom 122 can have a 12 mm thickness or other thickness.

As illustrated in FIG. 6L, the seat bottom 122 can include a drainage insert cavity. The drainage insert cavity 137 can be configured to secure drainage insert 132 of FIG. 5A. Drainage insert 132 is optionally removable from drainage insert cavity 137 and has a solid bottom for emptying, or lines the drainage insert cavity 137 and is permanently inserted to allow flow of precipitation or other liquid through the drainage insert cavity 137 to the ground even when inserted.

FIGS. 6M-6P present top, side, front and three-dimensional front views, respectively, of an example embodiments of a seat back 121 of a seating unit 112. Some or all features of seat back 121 of FIGS. 6M-6P can implement the seat back 121 of seating unit 112 of FIGS. 5A, 5B, and/or 6A-6D, a seat back of furnishing unit of FIG. 1, and/or a seat back of any other embodiment of furnishing unit described herein. The various dimensions of various aspects of seat back 121 presented in FIGS. 6M-6P can correspond to inches, or another common unit, such as a same unit as dimensions presented in FIGS. 6A-6D. Other embodiments of seat back 121 can have different shape, size, and/or dimensions. Some or all portions of the seat back 121 can have a 12 mm thickness or other thickness.

As illustrated in FIG. 6O, the seat back 121 can include a pair of arm slots 138. Each arm slot 138 can be configured to secure a corresponding seat arm 123 of FIG. 5A.

FIGS. 6Q-6S present three-dimensional top, side, top views, respectively, of an example embodiments of a seat arm 123 of a seating unit 112. Some or all features of seat arm 123 of FIGS. 6Q-6S can implement the seat arm 123 of seating unit 112 of FIGS. 5A, 5B, and/or 6A-6D, a seat arm of furnishing unit of FIG. 1, and/or a seat arm 123 of any other embodiment of furnishing unit described herein. The various dimensions of various aspects of seat arm presented in FIGS. 6Q-6S can correspond to inches, or another common unit, such as a same unit as dimensions presented in FIGS. 6A-6D. Other embodiments of seat arm 123 can have different shape, size, and/or dimensions.

FIGS. 6T-6Y present three-dimensional front, three-dimensional back, top, front, back, and side views, respectively, of an example embodiments of a heating pad cover plate 134 of a seating unit 112. Some or all features of seat arm 123 of FIGS. 6Q-6S can implement the heating pad cover plate 134 of seating unit 112 of FIGS. 5A, 5B, and/or

6A-6D, a heating pad cover plate of furnishing unit of FIG. 1, and/or a heating pad cover plate of any other embodiment of furnishing unit described herein that is configured to cover one or more heating elements 102. The various dimensions of various aspects of heating pad cover plate 132 presented in FIGS. 6Q-6S can correspond to inches, or another common unit, such as a same unit as dimensions presented in FIGS. 6A-6D. Other embodiments of heating pad cover plate 132 can have different shape, size, and/or dimensions.

In various embodiments, a seating unit, such as a seating unit 112, a table, and/or any other type of furnishing unit 110 can include at least one heating element configured to deliver heating to a user in proximity to the seating unit, table, and/or other type of furnishing unit.

In various embodiments, the seating unit further includes a seat back and a seat bottom. The seat back can have a front side and a back side. The seat bottom can have a top side and an underside. The seating unit can further include at least one heating element configured to deliver heating to a user while seated in the seating unit when electrically powered. The seating unit can further include circuitry configured to facilitate delivery of power to the first heating element and the second heating element.

In various embodiments, the seating unit, table, or other type of furnishing unit includes a first heating element. The first heating element can be attached to the back side of the seat back, and configured to deliver first heating through the seat back to a user while seated in the seating unit when electrically powered. In various embodiments, the seating unit, seating unit, table, or other type of furnishing unit further includes a second heating element. The second heating element can be attached to the underside of the seat bottom, and/or can be configured to deliver second heating through the seat bottom to the user while seated in the seating unit when electrically powered. The seating unit, table, and/or other type of furnishing unit can further include circuitry configured to facilitate delivery of power to the first heating element and the second heating element.

In various embodiments, the first heating element and the second heating element each comprise a first film of resistive material deposited on a substrate. In various embodiments, the first film is deposited as a pattern of resistive lines. In various embodiments, the first heating element and the second heating element each further comprises a second film of conducting material deposited on the substrate, the second film deposited as a pattern of conducting lines electrically connected to the resistive lines.

In various embodiments, the seating unit, table, or other type of furnishing unit further comprises input and output terminals for transferring power to the first heating element and the second heating element, the input and output terminals connected to a power transfer unit mounted to the seating unit. In various embodiments the seating unit, table, or other type of furnishing unit further comprises a power lead configured to interconnect a power source and the power transfer unit. In various embodiments, wherein the power transfer unit is an easy release power transfer device having first and second parts held together in a normal state by at least one of: friction or magnetism.

In various embodiments, a second seating unit, or other type of furnishing unit, includes the power source. The power lead can interconnect the power source and the power transfer unit based on attaching to a second power lead of the second seating unit. The second seating unit, or other type of furnishing unit, can power at least one heating element of the second seating unit via the power source. In various embodiments, the seating unit or other type of furnishing unit further includes a second power lead supplying power to a third seating unit, where the third seating unit powers at least one heating element of the second seating unit via the power supplied by the seating unit via the second power lead.

In various embodiments, the circuitry causes the first heating element and the second heating element to change between a set of at least three heating states. In various embodiments, first heating state of the set of at least three heating states corresponds to delivering heating via a first intensity; a second heating state of the set of at least three heating states corresponds to delivering heating via a second intensity that is lower than the first intensity; and/or a third heating state of the set of at least three heating states corresponds to delivering no heating.

In various embodiments, the seating unit, table, or other type of furnishing unit further includes a user input button. A switch of the circuitry can be actuated based on pressing of a user input button attached to the seating unit, where actuation of the switch causes the first heating element and the second heating element to change between different ones of the set of at least three heating states in accordance with a cyclical ordering of the set of at least three heating states.

In various embodiments, the seating unit, table, or other type of furnishing unit further includes a communications interface, where control data received via the communications interface is processed via the circuitry to cause the first heating element and the second heating element to change between different ones of the set of at least three heating states.

In various embodiments, the first heating element is implemented as a first heating pad, and/or the second heating element is implemented as a second heating pad. The seating unit can further comprise a heating pad cover plate comprising a vertical covering component and a horizontal covering component. A first side of the first heating pad can be secured against the back side of the seat back, and/or a second side of the first heating pad opposite the first side of the first heating pad can be secured against an inner surface of the vertical covering component of the heating pad cover plate. A first side of the second heating pad can be secured against the underside of the seat bottom, and/or wherein a second side of the second heating pad opposite the first side of the second heating pad can be secured against an inner surface of the horizontal covering component of the heating pad cover plate.

In various embodiments, the vertical covering component and a horizontal covering component form a 98 degree angle, or another angle, at an edge of the heating pad cover plate connecting the vertical covering component and the horizontal covering component. In various embodiments, the first side of the first heating pad lies upon a first plane, the first side of the second heating pad lies upon a second plane, where the first plane is non-parallel with the second plane and/or meets the second plane at the 98 degree angle or other angle.

In various embodiments, the seating unit, table, or other type of furnishing unit further includes a removable drainage insert. The seating unit can be configured to be positioned upon a planar surface for seating by the user. The seat bottom can include a front end and a back end, wherein a front end of the seat bottom is a first distance from the planar surface when the seating unit rests upon the planar surface, where the back end of the seat bottom is a second distance from the planar surface when the seating unit is positioned upon the planar surface, and wherein the second distance is smaller than the first distance. The seat bottom can include a drainage insert cavity at the back end of the seat bottom. The removable drainage insert can be configured to be secured within the drainage insert cavity. In various embodiments, the removable drainage insert is further configured to collect precipitation landing upon the seat bottom based on flowing of the precipitation from the front end to the back end based on the second distance being smaller than the first distance. In various embodiments, precipitation collected within the removable drainage insert is configured to be emptied based on removal of the removable drainage insert.

In various embodiments, the seating unit, table, or other type of furnishing unit further includes at least one additional electrically powered element. In various embodiments, the at least one electrically powered element includes a first lighting element integrated within the seating unit behind a translucent logo upon a surface of the seating unit, wherein the first lighting element is configured to backlight the translucent logo; a second lighting element attached to an underside of the seat bottom, wherein the second lighting element is configured to illuminate a surface below the seating unit upon which the seating unit is positioned; a charging coil of a wireless changing station, wherein the charging coil is configured to charge a mobile device when resting upon a corresponding surface of the seating unit, and/or any other lighting, charging, and/or other output element.

In various embodiments, the at least one electrically powered element includes at least one communication interface that facilitates wireless connection with a mobile device enabling user configuration, via user interaction with a graphical user interface displayed via the mobile device, of at least one of: the at least one heating element, or at least one further additional electrically powered element. In some embodiments, the user configuration is enabled via accessing a preset user profile for the user, for example, received from the mobile device and/or from a server system associated with the furnishing unit. The at least one communication interface can transmit a signal identifying the furnishing unit and/or facilitating connection with a mobile device, for example, via a Bluetooth pairing or other wireless connection. For example, a user can interact with their mobile device to scan for furnishing units nearby, and can elect to connect to a furnishing unit to facilitate control of the furnishing unit.

In various embodiments, the at least one heating element is fully encased within at least one of: the seat back or the seat bottom. The seat back and/or the seat bottom can comprise a rigid material, semi-rigid material, uniform material, stock construction material, 3D printed material, additive manufactured material, or other material.

In various embodiments, at least one heating element is fully encased within an arm of the seating unit, at least one another portion of the seating unit, at least one portion of a table, and/or at least one portion of another type of furnishing unit. This other portion of the seating unit, table, and/or other type of furnishing unit can comprise a rigid material, semi-rigid material, uniform material, stock construction material, 3D printed material, additive manufactured material, or other material.

In various embodiments, the seat back, the seat bottom, and/or other portion of the seating unit, table, and/or other type of furnishing unit, are 3D printed via a 3D printing process and/or additive manufacturing process. In various embodiments, the at least one heating element is fully encased within the seat back, the seat bottom, and/or other portion of the seating unit, table, and/or other type of furnishing unit based on the 3D printing process comprising switching from 3D printing via a flowable base material to 3D printing via a flowable resistive metal component at least once during the 3D printing process, where the at least one heating element is implemented via the flowable resistive metal component. In various embodiments, the seat back, seat bottom, and/or other portion of the seating unit, table, and/or other type of furnishing unit are printed via a 3D printing material that includes a heat storage medium and/or a phase change material. The heat storage medium and/or the phase change material can facilitate delivery of the heating via the heating element to the user.

In various embodiments, the seat back, the seat bottom, and/or other portion of the seating unit, table, and/or other type of furnishing unit, are additive manufactured via an additive manufacturing process. In various embodiments, the at least one heating element is fully encased within the seat back, the seat bottom, and/or other portion of the seating unit, table, and/or other type of furnishing unit based on the additive manufacturing process comprising switching from additive manufacturing via a flowable base material to additive manufactured via a flowable resistive metal component at least once during the additive manufacturing process, where the at least one heating element is implemented via the flowable resistive metal component. In various embodiments, the seat back, seat bottom, and/or other portion of the seating unit, table, and/or other type of furnishing unit are printed via an additive manufactured material that includes a heat storage medium and/or a phase change material. The heat storage medium and/or the phase change material can facilitate delivery of the heating via the heating element to the user.

In various embodiments, the seat back, the seat bottom, and/or other portion of the seating unit, table, and/or other type of furnishing unit, is structurally implemented by comprising a structural material, such as the stock manufacturing material, 3D printed material, additive manufacture material, phase change material, heat storage medium, heat spreader medium, or other material that is self-heating, and/or that otherwise structurally implements the portion of the furniture while also implementing the one or more heating elements themselves. For example, such materials, when receiving power and/or when releasing stored heat, supply heating 105 by implementing heating element 102 in addition to structurally implementing some or all structural portions of the furnishing unit itself, such as the seat back, the seat bottom, one or more seat arms, the table top, and/or other structural portions of a corresponding seating unit, table, and/or other type of furnishing unit. In such embodiments, an additional heating pad and corresponding heating cover, and/or other type of heating element 105, is optionally not embedded within and/or mounted to a surface of the seat back, seat bottom, and/or other portions of a seating unit, table, and/or other type of furnishing unit 110, as the seat back, seat bottom, and/or other portions of a seating unit, table, and/or other type of furnishing unit 110 implement the heating element 105 via their material. In such embodiments, the furnishing unit 110 simply includes a controller PCB, such as PCB element 133 with a PCB 333, and corresponding embedded wiring to apply power to the material, where the powering is controlled via the PCB 333 and drawn from an AC power input or other power supply 205.

Any of the furnishings, and/or the various members or other portions thereof, could be constructed using cementitious materials.

In various examples, a ternary mixture of supplemental cementitious material and supplemental aggregate material consists essentially of:

hydraulic cement in an amount between 40%-90% by weight of the cementitious material; and a blend of fly ash and calcinated clay in an amount between 10%-60% by weight of the cementitious material.

In addition or in the alternative to any of the foregoing, a dry cement mixture includes: the ternary mixture of supplemental cementitious material above; and aggregate material consisting essentially of graded silica sand in an amount between 50% to 90% by weight of the aggregate material, wherein the graded silica sand includes greater than 95% $SiO_2$; and silica fume in an amount between 10% to 50% by weight of the aggregate material.

In addition or in the alternative to any of the foregoing, the dry cement mixture further includes fiber reinforcement in an amount between 1%-3% by weight of the dry cement mixture.

In addition or in the alternative to any of the foregoing, the hydraulic cement includes Portland cement.

In addition or in the alternative to any of the foregoing, the calcinated clay includes metakaolin and/or calcinated Kaolin In addition or in the alternative to any of the foregoing, the ratio of cementitious material to aggregate material is between 1:0.02 and 1:2 by weight.

In addition or in the alternative to any of the foregoing, a cement slurry includes the dry cement mixture above and water in an amount between 30%-60% by volume of the cementitious material.

In addition or in the alternative to any of the foregoing, the cement slurry further includes a superplasticizer in an amount between 1% to 10% of the cementitious material.

In addition or in the alternative to any of the foregoing, the cement slurry further includes a liquid fortifier replacing between 5% to 50% of the water.

In addition or in the alternative to any of the foregoing, the cement slurry further includes a liquid coloring agent.

In addition or in the alternative to any of the foregoing, a ratio of water to cementitious material is dependent on a target viscosity of the cement slurry.

In addition or in the alternative to any of the foregoing, a method includes: combining cementitious material in the following proportions: hydraulic cement in an amount between 40%-90% by weight of the cementitious material; and a blend of fly ash and calcinated clay in an amount between 10%-60% by weight of the cementitious material; and combining aggregate material in the following proportions: graded silica sand in an amount between 50% to 90% by weight of the aggregate material, wherein the graded silica sand includes greater than 95% $SiO_2$; and silica fume in an amount between 10% to 50% by weight of the aggregate material.

In addition or in the alternative to any of the foregoing, the method further includes mixing the cementitious material and the aggregate material with water in an amount between 30%-60% by volume of the cementitious material.

In addition or in the alternative to any of the foregoing, a method of 3D printing an article of manufacture, includes creating the cement slurry above; adding 1-5% unfired dry clay; providing the slurry into 3D printer; and printing, via the 3D printer, the article of manufacture.

In addition or in the alternative to any of the foregoing, an article of manufacture is printed via the method above.

In addition or in the alternative to any of the foregoing, an article of manufacture includes at least one member manufactured utilizing the cement slurry of claim 7, the at least one member including at least one heating element configured to deliver heating to a user when electrically powered to a user; and circuitry configured to facilitate delivery of power to the at least one heating element.

In addition or in the alternative to any of the foregoing, the at least one member manufactured via 3D printing and 1-5% unfired dry clay is added to the cement slurry.

In addition or in the alternative to any of the foregoing, the at least one heating element is constructed by adding ferrous, graphene or graphite particulates to the cement slurry.

In addition or in the alternative to any of the foregoing, the at least one heating element is constructed by adding an electrically conductive element to the cement slurry.

In addition or in the alternative to any of the foregoing, the at least one heating element is constructed by adding a ferro-magnetic element to the cement slurry.

In addition or in the alternative to any of the foregoing, the circuitry controls delivery of power to the at least one heating element based on changes in impedance of the at least one heating element.

In addition or in the alternative to any of the foregoing, the circuitry controls delivery of power to the at least one heating element based on changes in resistance of the at least one heating element.

In addition or in the alternative to any of the foregoing, the circuitry controls delivery of power to the at least one heating element via changes to current, voltage, frequency and/or impedance of the circuitry.

In addition or in the alternative to any of the foregoing, the at least one heating element is a resistive heating element or an induction heating element.

In addition or in the alternative to any of the foregoing, the at least one heating element is sandwiched in a layer within the at least one member.

In addition or in the alternative to any of the foregoing, the at least one member is a portion of a floor, a portion of a wall, a portion of a countertop, or other portion of a building.

In addition or in the alternative to any of the foregoing, the at least one member is at least a portion of a furnishing.

In addition or in the alternative to any of the foregoing, the furnishing includes a seat.

In addition or in the alternative to any of the foregoing, wherein the article of manufacture is household product, chair, planter, tile, paver, table, architectural product, column beam, span, slab, footing, and/or foundation.

In addition or in the alternative to any of the foregoing, the article of manufacture is weatherproofed.

In addition or in the alternative to any of the foregoing, the article of manufacture is formed via wet casting and/or dry casting.

Referring next to FIGS. 7-27, various cement/concrete formulations, and techniques suitable for manufacturing the furnishings and/or members discussed above, as well as other articles of manufacture, will be discussed.

In various embodiments, a novel fiber-reinforced concrete, is used. Various formulations of the concrete include fly ash and calcined clay in an amount between about 10%-60% of the total cementitious material, and silica fume in an amount between about 10%-50% of the total aggregate material. Various embodiments of this formulation also include one or more of hydraulic cement, graded silica sand, water reducing agent, fortifier, and coloring agent. The concrete formulations disclosed herein are suitable for both indoor and outdoor applications, and are cold-weather tolerant.

Table 1 lists acronyms may be used in various portions of this disclosure:

TABLE 1

| Acronyms | |
|---|---|
| HC | Hydraulic Cement |
| FA | Fly Ash |
| MK | Calcined Clay (Metakaolin) |
| SF | Silica Fume |
| SP | Water Reducing Agent (Superplasticizer) |
| GF | Fiber-Reinforcement |
| LA | Liquid Fortifier |
| CA | Coarse Aggregate |
| FA | Fine Aggregate |
| CS | Construction Sand (<95% SiO2) |
| SS | Silica Sand (>95% SiO2) |
| SS00 | Silica Sand minus 40 mesh (<0.425 mm) |
| SS0 | Silica Sand 20-40 mesh (0.85-0.425 mm) |
| SS1 | Silica Sand 12-30 mesh (1.7-0.6 mm) |
| SS2 | Silica Sand 8-16 mesh (2.36-1.18 mm) |
| SCM | Supplemental Cementitious Materials |
| SAM | Supplemental Aggregate Materials |
| FRC | Fiber-Reinforced Concrete |

Various embodiments disclosed herein use a ternary blend of fly ash, metakaolin, and silica fume within a fiber-reinforced concrete. Replacement of HC with SCM in concrete formulations has seen increased interest in recent years, owing to the significant carbon footprint associated with HC. In general, SCM are siliceous and aluminous materials that will react with the calcium hydroxide produced during cement hydration, thereby creating additional cementitious reactions that typically make the concrete stronger and more durable.

Typical SCM include recycled industrial byproducts such as fly ash, ground granulated blast furnace slag, powdered glass, and silica fume, while natural SCM include calcined clay or shale, volcanic ash, and diatomaceous earth. Because SCM promote cementitious reactions, when included in a concrete formulation, they become part of the TCM within that formulation. Therefore, and in general, for any HC concrete formulation, the total amount of cementitious materials used can be generalized as:

$$TCM=HC+SCM$$

The SCM used in various embodiments of this disclosure is a blend of FA and MK, and they are used in amounts ranging from 10-60% of TCM. Similar to TCM, aggregate within concrete formulations can be categorized as coarse aggregate, fine aggregate, sands, and supplemental aggregate materials. As such, and in general, the total amount of aggregate materials used in any cement-based concrete formulation can be described as:

$$TAM=CA+FA+CS+SAM$$

The SAM used in one or more embodiments of this disclosure is silica fume in amounts ranging from 10-50% of TAM. Typically SF is considered a SCM; in this disclosure, it is used as a SAM to improve the mechanical properties of the FRC, including reducing porosity and improving cold-weather durability. In its role as SAM, SF will still behave as a SCM, adding strength to the FRC described in this disclosure over time (>90 days).

There are no added coarse or fine aggregates in various embodiments of the FRC formulation described by this disclosure, and graded silica sand (>95% SiO2) is used in place of construction sand (<95% SiO2). As such, the total dry materials in the present disclosure can be described as:

$$TDM=TCM+TAM=HC+FA+MK+SS+SF$$

Various embodiments fiber-reinforcement is added in an amount typically 1-3% of the TDM, but may be omitted from the formulation in certain applications.

The water to TCM ratio in this disclosure can vary from 0.3 for a low viscosity mixture, to 0.6 for a highly flow mixture. The water to TCM ratio is coupled to the amount of water reducer added, which is typically 3-8% of the TCM when the water to TCM ratio is 0.3-0.6. Total liquids in this disclosure may include a liquid resin (acrylic) fortifier that replaces a portion of some or all of the total water content, and/or a liquid coloring agent that either replaces water content, or supplements the total liquid amount. Specific ratios for the high performance concrete described by this disclosure are summarized in Table 2, below.

TABLE 2

| Specific formulation ratios for components | | | |
|---|---|---|---|
| Component | Acronym | Type/Class/Pseudonym | Mixture Ratio |
| Total Cementitious Materials | TCM | TCM = OPC + FA + MK | ≤1000 kg/m3 |
| Portland Cement | OPC | 32.5<br>42.5<br>52.5 | =TCM − SCM |
| Fly Ash | FA | Class F | With MK, 10-60% TCM |
| Calcined Clay | MK | Calcined Kaolin Metakaolin | With FA, 10-60% TCM |
| Total Aggregate Materials | TAM | TAM = SS + SF | In ratio between 1:0.2 and 1:2 TCM:TAM |
| Silica Fume | SF | Microsilica | 10-50% TAM |
| Silica Sand | SS | <40 mesh (<0.425 mm)<br>20-40 mesh (0.85-0.425 mm)<br>12-30 mesh (1.7-0.6 mm)<br>8-16 mesh (2.36-1.18 mm) | 50-90% TAM |
| Fiber Reinforcement | GF | 8-20 mm glass fiber bundled with 100-200 filaments per bundle, and bundle diameter | 0.01-0.03 TDM |

TABLE 2-continued

| Specific formulation ratios for components | | | |
|---|---|---|---|
| Component | Acronym | Type/Class/Pseudonym | Mixture Ratio |
| | | between 10-30 microns | |
| Superplasticizer | SP | Polycarboxylate | 0.01-0.10 TCM |
| Liquid Fortifier | AF | Acrylic | Replaces 0.05-0.50 w/c |
| Water | w/c | Tap water @ room temp | 0.30-0.60 TCM |

In various embodiments, a dry concrete mixture includes primary cementitious material, primary aggregate materials, and a ternary mixture of selected supplemental materials. The primary cementitious material includes hydraulic cement in an amount between about 40%-90% by weight of total cementitious materials, wherein the total cementitious materials include the primary cementitious material and any supplemental cementitious materials. The primary aggregate material can include graded silica sand in an amount between about 50% to 90% by weight of total aggregate materials, wherein the graded silica sand includes greater than about 95% SiO2, and wherein the total aggregate materials include primary aggregate materials and any supplemental aggregate materials. In at least one embodiment, the ternary mixture of selected supplemental materials includes a combination of three pozzolanic materials. A combination first and second pozzolanic materials is present in an amount between about 10%-60% by weight of total cementitious materials, and a third pozzolanic material is present in an amount between about 10% to 50% by weight of total aggregate material.

The dry concrete mixture can optionally include a fiber-reinforcement material in an amount between about 1%-3% by weight of the dry concrete mixture. Any fiber-reinforcement material used can, in some embodiments, be selected from the group consisting of hemp fiber, flax fiber, cellulose fiber, basalt fiber, glass fiber, carbon fiber, and steel fiber. In some embodiments, the fiber-reinforcement material includes glass fiber having a diameter of between about 8-20 mm bundled with between about 100-200 filaments per bundle, and having a bundle diameter between about 10-30 microns.

The dry concrete mixture can also optionally include one or more conductive carbonaceous materials selected from the group consisting of graphite, graphene, nanocarbon, carbon black, and carbon nanotubes. The conductive carbonaceous materials can be used with or without the fiber-reinforcement material.

In some embodiments, the first pozzolanic material and the second pozzolanic material are different pozzolanic materials selected from the group consisting of: fly ash, zeolite, calcined clay, silica fume, ground granulated blast furnace slag, and rice husk ash. In particular embodiments, the first pozzolanic material consists essentially of fly ash, the second pozzolanic material consists essentially of calcined clay, and the third pozzolanic material consists essentially of silica fume. In at least one embodiment, the third pozzolanic material acts as both a supplemental aggregate material and as a supplemental cementitious material.

In other embodiments, the first pozzolanic material is selected from the group consisting of rice husk ash and ground granulated blast furnace slag; and the second pozzolanic material includes a manufactured pozzolan. Manufactured pozzolans, as distinguished from naturally occurring pozzolans, can be produced deliberately, for instance by thermal activation of kaolin-clays to obtain metakaolin, or obtained as waste or by-products from high-temperature processes such as fly ash from coal-fired electricity production, silica fume from silicon smelting, or burned organic matter residues rich in silica such as rice husk ash.

In some embodiments, a supplemental cementitious material selected from the group consisting of thermoactivated recycled cement, activated recycled glass, ground granulated blast furnace slag, and hydrated lime can be used to replace at least a portion of the hydraulic cement.

In some embodiments, an optional superplasticizer can be included in the dry concrete mixture in an amount between about 1% to 10% by weight of the total cementitious material. In various embodiments, the dry concrete mixture can be made from recycled materials, some or all of which can be selected from the group consisting of thermoactivated recycled cement, recycled supplemental cementitious materials, recycled glass aggregate, natural fibers, mineral fibers, and biopolymers.

In at least one embodiment, a ratio of the total cementitious material to the total aggregate material is between about 1:0.02 and 1:2 by weight.

Any of the various formulations of dry materials discussed above can be used to make a concrete slurry by adding water in an amount between about 30%-60% by volume of the total cementitious material. Other liquids can be added in addition to, or in place of a portion of, the water. For example, in some embodiments a liquid fortifier is added to the slurry by replacing between about 5% to 50% by volume of the water. In another example, a liquid coloring agent be added to the slurry with or without altering the amount of water.

In embodiments, the amount of superplasticizer added to the dry materials is dependent on the ratio of water to total cementation materials. For example, when a ratio of water to the total cementitious materials is in within a range of between about 0.3 to 0.6, the amount of superplasticizer in in the dry mix can be between about 3% to 8% of the total cementitious materials.

Various embodiments of the above slurry can be, used form an article of manufacture using wet or dry casting techniques, 3D printing techniques, or some combination thereof. Some slurry formulations are better suited for different manufacturing techniques.

For example, in some embodiments, slurries used for wet casting, employ a ratio of water to cementitious materials of greater than about 0.5, while dry casting may use two different slurries a first slurries—a first slurry having a ratio of water to cementitious materials of up to about 0.6, and a second low-water-to-cementitious-materials version of the first slurry having a ratio of water to cementitious materials of less than about 0.4. In 3D printing embodiments, a cement slurry with a ratio of water to cementitious materials of greater than about 0.5 can be used.

FIG. 7A presents a perspective view of an example embodiment of a furnishing unit in accordance with various embodiments. In particular, a further example of a furnishing unit 110 is presented that includes heating elements 726, 712, 706 and 730 in the seat back, seat bottom and in both arms of a chair, respectively. The heating elements in the arms are covered by covers 708 and 732. The heating element in the seat back is covered by the back cover 724. The heating element in the seat bottom is covered by a cover (not expressly shown).

FIG. 7B presents an exploded view of an example embodiment of a furnishing unit 110 in accordance with various embodiments. The seat bottom has been removed in order to show other components behind and below including the back support assembly 734, the heating element 712, the aurora enclosure 718 that provides lighting for the logo, the front support 720 and enclosure assembly 722. In this example, seat back 702, right arm 704 and left arm 728 as well as the seat bottom (not expressly shown) include elements constructed of Corian, however other composite stone materials could likewise be employed in further examples. The right frame assembly 710 and left frame assembly 736 are constructed of steel, however, other materials could likewise be employed in further examples. FIGS. 7C-7F present a back view, top view, side view and front view of an example of an assembled furnishing unit 110.

FIG. 7G presents a perspective view of an example embodiment of a heating element in accordance with various embodiments. In particular, a heating element is shown that can be appropriately scaled for use in a seat back, seat bottom and/or in a seat arm. In this example, the heating element includes a heating pad 748 constructed of perforated carbon fiber sheet that is electrically coupled via bus bars 741 and 743 and wires 740 and 742 on opposing sides and attached to a controller/power source via plug 750. A third wire 744, also attached via a plug 746, is further attached to a temperature sensor 746 that monitors the temperature of the heating element 102.

Referring to FIG. 8A, a process diagram illustrating preparing dry materials for ready-mix cement and concrete formulations will be discussed in accordance with various embodiments. As shown by block 160, the dry materials are obtained from bulk storage.

The dry bulk materials used in various formulations disclosed herein include one or more of HC, FA, MK, SF, SS, SF, SP, and/or AF. Bulk storage of these materials prior to use in the formulation is typically achieved by using 1) silo-type storage, and/or 2) bagged+palletized storage. The FRC formulation described in this disclosure is not biased toward storage type, as long as that storage isolates the dry bulk material from the environment.

As shown by block 164, the different dry materials are mixed. Mixing of the dry material can be performed using a batch mixing process, or an on-demand volumetric mixing process. For batch formulation, measurement is typically achieved using an analog or digital scale, while continuous formulation typically involves a volumetric mixing system, which is described subsequently.

In batch mixing, individual dry components are measured one-by-one and combined in a mixing vessel. In volumetric mixing, a control system is utilized to measure and combine bulk dry goods simultaneously in a mixing vessel, which typically also has a conveyor system to (auger, belt, pump, etc.) to remove mixed product. Volumetric mixing is described in greater detail below.

The formulations described in this disclosure are unbiased towards a measurement technique, as long as the measurement technique used maintains the proper ratios between components.

As illustrated by block 166, the mixed dry materials are bagged, and sent to shipping as illustrated by block 168. Although not specifically illustrated, the mixed dry materials can be moved to bulk storage for later use in forming slurries for casting or 3D printing.

Referring to FIG. 8B, a process diagram illustrating a process of casting concrete articles will be discussed in accordance with various embodiments. As illustrated by block 172, both dry and wet materials are obtained from bulk storage, and mixed as illustrated by block 174. The dry+wet mix formulation proportions for various embodiments are described in Table 2, above. In various embodiments, once the relative percentage of each component is known, the specific mass of each component can be determined from Table 3, below. It should be noted that Table 3 is not exhaustive.

TABLE 3

Component Mass Determination

| | | |
|---|---|---|
| Volume: | 1000000000 | mm3 |
| | 1000 | Liters |
| | 1000.000 | Liters |
| | 1.0000000000 | m3 |
| Air content: | 0.020 | percent total volume |
| Volume solids: | 980.000 | Liters |
| | 0.980000 | m3 |
| Wn/Cn: | 0.50 | percent TCM |

| | Specific Gravity | Ratio | Concentration kg/m3 | Mass (kg) | Volume Liter | Dry Mass (g) |
|---|---|---|---|---|---|---|
| TCM | | | 750 | 735.00 | | 735000 |
| Cement | 3.15 | 0.70 | 525.00 | 514.50 | 163.33 | 514500 |
| Fly Ash | 2.49 | 0.10 | 75.00 | 73.50 | 29.52 | 73500 |
| Metakaolin | 2.54 | 0.20 | 150.00 | 147.00 | 57.87 | 147000 |
| V_TCM | | 1.0 | 750.00 | 735.00 | 250.73 | 735000 |
| Water | | | 375.00 | 367.50 | 367.50 | 367500 |
| V_Paste | | | | 1102.50 | 618.23 | |
| V_Agg | | | | | 361.77 | |
| Silica Fume | 2.25 | 0.10 | 83.06 | 81.40 | 36.18 | 81399 |
| Silica #0 | 2.65 | 0.50 | 489.13 | 479.35 | 180.89 | 479351 |
| Silica #00 | 2.65 | 0.40 | 391.31 | 383.48 | 144.71 | 383481 |
| V_TAM | | 1.00 | 963.50 | 944.23 | | 944232 |
| V_tot | | | 1713.50 | 2046.73 | 980.000 | 1762684 |
| Glass Fiber | 2.68 | 0.03 | | 61.40 | | 61402 |
| Super-plasticizer | | 0.03 | 22.5 | 22.05 | | 22050 |
| VMA | | 0.001 | 0.75 | 0.74 | | 735 |

Once the mass of each wet and dry component is determined, materials from the dry bulk storage can be measured and combined. In various embodiments, the dry and wet materials can be mixed using a batch mixing process, or an on-demand volumetric mixing process to form one or more slurries.

In batch mixing, individual dry components are measured one-by-one and combined in a mixing vessel. Wet components are then added to the mixing vessel, and the dry and wet components are mixed for 3-10 minutes to ensure homogeneity. In volumetric mixing, a control system is utilized to measure and combine bulk dry and wet goods simultaneously in a mixing vessel, which typically also has a conveyor system to (auger, belt, pump, etc.) to remove mixed product.

As illustrated by block 176 a cast, or mold, is filled with the one or more slurries, and cured, as illustrated by block 178. Casting methods in various embodiments can include dry or wet casting, each of which will be discussed in more detail, separately. For both wet and dry casting using various embodiments of the FRC described in this disclosure, the first curing stage occurs inside the cast, also referred to herein as a mold, although dry casting generally employs two curing stages in the cast or mold. The primary curing stage in the cast is typically 1-7 days, depending both on the quantities of SCM used in the FRC formulation, and also the method of curing used. Curing methods suitable for the formulation described in this disclosure include but are not limited to the following five methods.

One curing option is open environment curing, wherein the FRC-filled cast is allowed to cure for 1-7 days in whatever open environment it happens to be in. Open environment curing is typical in residential and commercial construction, where site conditions dictate curing conditions.

A second curing option is Controlled environment curing, wherein the FRC-filled cast is allowed to cure for 1-7 days in a controlled temperature and humidity environment. Typically, temperatures in this methods are >21 C, and the relative humidity close to 100%. Controlled environment curing is most common in the prefabricated concrete, where factory conditions can be maintained to optimize curing times.

A third curing option is water curing, wherein the FRC-filled cast is completely submerged in water for 1-7 days. A fourth curing option is heat curing, wherein the FRC-filled cast is placed in an oven is cured in a high-temperature environment (40-90 C) for 1-6 hours, followed by open or controlled environment curing.

A fifth curing option is steam curing, wherein the FRC-filled cast is placed within a pressurized enclosure that is filled with high-temperature steam for 1-6 hours, followed by open or controlled environment curing.

The concrete formulations described in this disclosure are unbiased toward a curing method, but it is recommended that strength testing is performed after the primary curing stage to confirm performance criteria. Recommended tests for this purpose are described subsequently.

As illustrated by block 180, the cast is removed after curing for 1-7 days using one or more of the methods described above. Cast removal procedures depend on the method of casting used. For instance, casts/forms/molds made from wood are typically assembled/disassembled, while those made from liquid rubber are typically flexible monoliths that can be flexed-off the cured product. The concrete formulations described in this disclosure is unbiased toward cast removal techniques.

In both wet and dry casting, curing surfaces that are exposed to the environment (i.e. those surfaces not covered by the cast) can have surface treatments applied, wherein the partially cured surface is manipulated in some way to improve durability and performance of that surface, or to change its aesthetic properties (i.e. adding texture, color, or surface coating). The formulations described in this disclosure are suitable for all types of wet and dry casting, including prefabricated and prestressed concrete structures. Additionally, the formulas described in this disclosure are compatible and-non-reactive with all common casting materials, including wood, metal, plastic, liquid rubber, silicon, and rigid insulation.

As illustrated by block 182 the cast/mold/form can be rebuilt as necessary. Cast building involves constructing a negative of the object to be cast, and there are several techniques for achieving this. Most often, cast building utilizes wood, metal, plastic, liquid rubber, and/or silicon to build the negative form. These materials are often used in combination, such as a wood cast frame with a liquid rubber insert. The concrete formulation described in this disclosure is unbiased toward any techniques or method used for cast building.

As illustrated by block 184, the item removed from the mold, or cast, is allowed to further cure. For both wet and dry casting with the concrete formulations described in this disclosure, the second curing stage occurs after cast removal, and typically lasts 7-90 days, depending on the level of strength targeted. In general, and as a consequence of having high SCM content, the FRC formulation described in this disclosure can be defined such that the FRC mixture develops high early strength achievable using a short curing cycle (<7 days), or high late strength associated with longer curing cycles (>28 days).

The curing techniques utilized during the second curing stage are typically the same as are described for the first curing stage. Most often utilized for longer curing periods (>7 days) are open and controlled environment curing, and water curing. For the 7-90 day curing, the FRC formulation described in this disclosure is unbiased toward technique, and all curing techniques are suitable for use with this FRC, but it is recommended that strength testing is performed after the second curing stage to confirm performance criteria. Recommended tests for this purpose are described subsequently.

As illustrated by block 186, a weatherproofing treatment can be applied to the cast item during the subsequent curing stage, and prior to being sent to final assembly. These weatherproofing treatments can include surface-based treatments wherein a waterproofing is sprayed, rolled, or brushed onto cured the cured object.

It should be appreciated that articles of manufacture created using various concrete formulations described in this disclosure are already more weatherproof than many conventional concrete articles, and as such are suitable for outdoor use in climates where the regular ambient outdoor temperature drops below 4 C. For example, water penetration and accompanying freeze-thaw cracking can be reduced by inclusion of SCM and SAM to reduce FRC pore size, inclusion of fiber to reduce stress propagation and catastrophic fracture, and inclusion of a liquid fortifier. It is recommended that durability testing be performed to confirm outdoor performance criteria As illustrated by block 188, the cured concrete item is sent to final assembly, where it can be combined into an end product.

Referring next to FIG. 9, a process diagram illustrating on-demand volumetric mixing of concrete components in accordance with various embodiments. In the illustrated embodiment, the desired mass of Silica Sand minus 40 mesh (<0.425 mm) 190, Silica Sand 20-40 mesh (0.85-0.425 mm) 192, Silica Sand 12-30 mesh (1.7-0.6 mm) 194, and Silica Sand 8-16 mesh (2.36-1.18 mm) 196 are automatically measured and deposited into a skip bucket weighing belt 214.

Desired amounts of Silica Fume 198, Fly Ash 200, Calcined Clay 202, Hydraulic Cement 204, Water Reducing Agent (Superplasticizer) 206, and Fiber-Reinforcement 208, are deposited in a cement weighing hopper 216. The liquid components include Liquid Fortifier 210 and Water 212. Weighing and control system 218 controls delivery of the dry components 190-208 currently in skip bucket/weighing belt 214 and cement weighing hopper 216, as well as liquid components (210 and 212), to mixer 220. As illustrated by block 222, mixer 220 mixes the dry and liquid components to form a slurry for casting or 3D printing.

Various embodiments of formulations disclosed herein include additional and/or alternative wet and dry components. Although not specifically illustrated in FIG. 9, those additional and/or alternative components can be volumetrically mixed using the same techniques described in FIG. 9. In smaller batches, hand-held mixing equipment can be used. In hand mixing, wet components are typically measured and added to the mixing vessel first, and the dry components thereafter, either component-by-component or with the dry components premixed. The FRC formulation described in this disclosure is unbiased toward a mixing method, as long as that mixing method creates a homogeneous mixture.

Referring next to FIG. 10, a diagram illustrating wet casting concrete articles will be discussed accordance with various embodiments. In the illustrated embodiment, wet casting is accomplished using 3-piece mold 230, which includes mold portion A 232, mold portion B 234, and mold portion C 236, which form cavity 238. Cavity 238 is a negative of a desired shape corresponding to one or more members of an article of manufacture. Slurry 240 is formed according to any of the embodiments described herein, and poured into cavity 238. After slurry 240 has completed an initial curing stage, as discussed above, cast item 242 is removed from 3-piece mold 230, and subjected to a subsequent curing stage.

In various embodiments, a method of wet casting a concrete article of manufacture, includes forming a concrete slurry. Forming the concrete slurry includes mixing dry materials into a dry concrete mixture, and adding water to the dry concrete mixture in an amount sufficient to achieve a ratio of water to cementitious materials of greater than about 0.5.

In at least one embodiment, the dry materials, which include primary cementitious material, primary aggregate materials, a fiber-reinforcement material in an amount between about 1%-3% by weight of the dry concrete mixture, and a ternary mixture of selected supplemental materials, are mixed using batch mixing, or volumetric mixing The primary cementitious materials include hydraulic cement in an amount between about 40%-90% by weight of total cementitious materials, wherein the total cementitious materials include the primary cementitious material and any supplemental cementitious materials. The primary aggregate materials including graded silica sand in an amount between about 50% to 90% by weight of total aggregate materials, wherein the graded silica sand includes greater than about 95% $SiO_2$, and wherein the total aggregate materials include primary aggregate materials and any supplemental aggregate materials. The ternary mixture of selected supplemental materials includes a combination of a first pozzolanic material and a second pozzolanic material, wherein the combination is present in an amount between about 10%-60% by weight of total cementitious materials. The ternary mixture also includes a third pozzolanic material in an amount between about 10% to 50% by weight of total aggregate material.

The concrete slurry is poured into a substantially watertight mold having a cavity, wherein the cavity has a shape, and is cured inside the mold during a first curing stage. During the first curing stage the slurry hardens into a cast item in the shape of the mold cavity. The cast item is removed from the mold, and allowed to continue curing outside of the mold during a second curing stage.

In various embodiments, the first and/or second curing stage can include open environment curing, controlled environment curing, water curing, heat curing, or steam curing. With respect to the first curing stage, for example, in open environment curing the slurry-filled cast is allowed to cure for 1-7 days in whatever open environment it happens to be. In controlled environment curing, the slurry-filled cast is allowed to cure for 1-7 days in a controlled temperature and humidity environment. Typically, temperatures in this methods are >21 C, and the relative humidity is maintained close to 100%. In water curing, the slurry-filled cast is completely submerged in water for 1-7 days. In heat curing, the slurry-filled cast is placed in an oven and cured in a high-temperature environment (40-90 C) for 1-6 hours, followed by open or controlled environment curing. In steam curing, wherein the slurry-filled cast is placed within a pressurized enclosure that is filled with high-temperature steam for 1-6 hours, followed by open or controlled environment curing.

In various embodiments, the duration of the first curing stage is determined, based at least in part, on quantities of the supplemental cementitious materials included in the dry concrete mixture and the curing technique selected for the first curing stage.

The duration of the second curing stage is, in various embodiments, determined, based at least in part, on a duration of time needed for the cast item to reach a predetermined strength level and the curing technique used during the second curing stage.

In at least one embodiment, the first curing stage lasts between about 1 and 7 days, and the second curing stage lasts between about 7-90 days.

In various embodiments, one or more conductive carbonaceous materials selected from the group consisting of graphite, graphene, nanocarbon, carbon black, and carbon nanotubes are added to the slurry. In some embodiments, two concrete slurries having differing amounts of the one or more conductive carbonaceous materials are formed, and different slurries are poured into different portions of the mold.

The mold into which the slurry is poured can be fashioned by forming a negative of the desired shape of the final article of manufacture. The negative of the shape can be formed using at least one material selected from the group consisting of wood, metal, plastic, liquid rubber, and silicon. In some implementations the mold can be a flexible mod formed by making an impression of an existing article.

In various embodiments, an optional surface treatment can be applied to an exposed surface of the cast item prior to completion of the second curing stage. Some such surface treatments include texturizing the surface, adding color, or adding a surface coating.

In some formulations described herein, no dry cementitious or aggregate materials beyond the ternary mixture of supplemental cementitious material and supplemental aggregate materials are used. In at least one such embodiment, a dry concrete mixture includes a ternary mixture consisting essentially of a combination of two pozzolanic supplemental cementitious materials, and a pozzolanic supplemental aggregate material.

In one or more such embodiments, the two pozzolanic supplemental cementitious materials and the pozzolanic supplemental aggregate material are selected from the group consisting of: fly ash, zeolite, calcined clay, silica fume, ground granulated blast furnace slag, and rice husk ash. In one particular embodiment, the combination of two pozzolanic supplemental cementitious materials includes fly ash and calcined clay, and the pozzolanic supplemental aggregate material includes silica fume. In other embodiments, the two pozzolanic supplemental cementitious materials include a first pozzolanic material selected from the group consisting of rice husk ash and ground granulated blast furnace slag, and a second pozzolanic material including a manufactured pozzolan. The pozzolanic supplemental aggregate material, in some embodiments, acts as both a supplemental aggregate material and as a supplemental cementitious material In various embodiments, the dry concrete mixture can optionally include a fiber-reinforcement material, which in some implementations is selected from the group consisting of hemp fiber, flax fiber, cellulose fiber, basalt fiber, glass fiber, carbon fiber, and steel fiber. In some such embodiments, the fiber-reinforcement material includes glass fiber having a diameter of between about 8-20 mm bundled with between about 100-200 filaments per bundle, and having a bundle diameter between about 10-30 microns.

The dry concrete mixture can also include one or more conductive carbonaceous materials selected from the group consisting of graphite, graphene, nanocarbon, carbon black, and carbon nanotubes.

In still other embodiments supplemental cementitious materials selected from the group consisting of thermoactivated recycled cement, activated recycled glass, ground granulated blast furnace slag, and hydrated lime can optionally be added to the dry concrete mixture. Some implementations also include a superplasticizer.

The dry concrete mixture can, in some embodiments, consist essentially of recycled materials, which can, but need not be, selected from the group consisting of thermoactivated recycled cement, recycled supplemental cementitious materials, recycled glass aggregate, natural fibers, mineral fibers, and biopolymers.

The various embodiments of the dry concrete mixture just described can also be combined with primary cementitious materials, primary aggregate materials, and water to form a concrete slurry, which can be used to cast or 3D print articles of manufacture. Such a slurry can optionally include a liquid fortifier, a superplasticizer, a coloring agent, or some combination thereof.

Referring next to FIG. 11 a diagram illustrating dry casting concrete articles will be discussed in accordance with various embodiments. In the illustrated embodiment, dry casting is accomplished using 2-piece mold 250, which includes mold portion D 252, and mold portion E 254, which form cavity 248. Cavity 248 is a negative of a desired shape corresponding to one or more members of an article of manufacture. A first slurry 258 is formed according to various embodiments described herein, and spayed into cavity 258 to form a fronting layer 259. In at least one embodiment, first slurry has a ratio of water to cementitious materials of up to about 0.6. In various implementations, the fronting layer is less than about 6 mm, but can be thicker.

After the fronting layer has cured, a second slurry is packed into cavity 248, on top of the fronting layer, to form a structural backing layer 262. In at least one embodiment, the fronting layer 259 is cured for less than about 1 hour prior to packing the structural backing layer 262, although longer curing times are within the scope of this disclosure. The second slurry is, in various implementations, a low-water version of the first slurry having a ratio of water to cementitious materials of less than about 0.4. In some embodiments, the first slurry does not include fiber reinforcement, but the second slurry does.

After packing the second slurry, the two slurries are subjected to an additional in-mold curing period. After removing the dry cast item 266 from the mold, it is cured outside of the mold for an additional time.

In at least one embodiment, a method of dry casting a concrete article of manufacture includes forming a first concrete slurry, and spraying the first concrete slurry as a fronting layer of less than about 6 mm into a cavity of a substantially water-tight mold using the first concrete slurry. A second, low-water-to-cementitious-materials version of the first concrete slurry is then formed, and packed into the mold to form a structural backing layer. The first and second slurries are cured inside the mold during a first curing stage to form a cast item, which is removed from the mold and cured outside the mold during a second curing stage.

Forming the first slurry includes mixing dry materials into a dry concrete mixture, and adding water to the dry concrete mixture in an amount sufficient to achieve a ratio of water to cementitious materials of up to about 0.6. In at least one embodiment, the dry materials in the first slurry, which include primary cementitious material, primary aggregate materials, a ternary mixture of selected supplemental materials, but no fiber reinforcement materials, are mixed using batch mixing, or volumetric mixing.

The primary cementitious materials included in the dry concrete mixture include hydraulic cement in an amount between about 40%-90% by weight of total cementitious materials, wherein the total cementitious materials include the primary cementitious material and any supplemental cementitious materials. The primary aggregate materials include graded silica sand in an amount between about 50% to 90% by weight of total aggregate materials, wherein the graded silica sand includes greater than about 95% SiO2, and wherein the total aggregate materials include primary aggregate materials and any supplemental aggregate materials. The ternary mixture of selected supplemental materials includes a combination of a first pozzolanic material and a second pozzolanic material, wherein the combination is present in an amount between about 10%-60% by weight of total cementitious materials. The ternary mixture also includes a third pozzolanic material in an amount between about 10% to 50% by weight of total aggregate material.

In at least one embodiment, the second slurry includes the same dry components as the first slurry, but also includes fiber-reinforcement material in an amount between about 1%-3% by weight of the dry concrete mixture. In at least one embodiment, the dry materials in the second slurry, which include the primary cementitious material, the primary aggregate materials, the ternary mixture of selected supplemental materials, and the fiber reinforcement materials, are mixed using batch mixing or volumetric mixing.

Another difference between the first slurry and the second slurry is that the ratio of water to cementitious materials of the second slurry differs from the ratio of water to cementitious materials of the first slurry. In some embodiments, the second concrete slurry includes water in an amount sufficient to achieve a ratio of water to cementitious materials of less than about 0.4.

In various embodiments, a duration of the first curing stage is determined based, at least in part, on quantities of the supplemental cementitious materials included in the dry concrete mixture, and a curing technique used during the first curing stage. A duration of the second curing stage can be determined based, at least in part, on a the time needed for the cast item to reach a predetermined strength level after having been removed from the mold, and a curing technique used during the second curing stage. In various embodiments, the first curing stage lasts between about 1 and 7 days; and the second curing stage lasts between about 7-90 days.

Curing techniques use for the first curing stage and the second curing stage can include one or more curing techniques selected from the group consisting of open environment curing, controlled environment curing, water curing, heat curing, and steam curing. Multiple different curing techniques can be used in either or both of the curing stages.

In various embodiments, either or both of the first concrete slurry and the second concrete slurry can optionally include one or more conductive carbonaceous materials selected from the group consisting of graphite, graphene, nanocarbon, carbon black, and carbon nanotubes. In some such embodiments, multiple second concrete slurries can be formed, with each of the multiple concrete slurries including differing amounts of the one or more conductive carbonaceous materials. The multiple concrete slurries can be packed into different portions of the mold.

The mold used for the dry casting can be created by forming a negative in a desired shape. In various embodiments, the negative of the shape can be formed using at least one material selected from the group consisting of wood, metal, plastic, liquid rubber, and silicon.

In some embodiments, applying a surface treatment to an exposed surface of the cast item prior to completion of the second curing stage. The surface treatment can include one or more of texturizing the surface, adding color, adding a surface coating.

Referring next to FIG. 12, a process diagram illustrating a process of 3D printing concrete articles will be discussed in accordance with various embodiments. As illustrated by block 270, either dry materials, wet materials, or both are obtained from bulk storage, and mixed as illustrated by block 274. In certain embodiments, at block 274 the dry materials and wet materials are mixed separately, and are not combined with each other until they are delivered to the 3D printing system at block 276. In other embodiments, the dry and wet materials are combined at block 274 to form a slurry.

Example dry+wet mix formulation proportions for various embodiments are described in Table 2. In various embodiments, once the relative percentages of each component are known, the specific mass of each component can be determined from Table 3, below. It should be noted that Table 3 is not exhaustive.

As illustrated by block 276, the mixed materials are delivered to a 3D printing system. For example, in where fused-deposition modeling (FDM) 3D printers are used, the slurry is delivered to the 3D printing system for extrusion. In embodiments employing binder jetting 3D printers, the mixed dry materials and the mixed wet materials are delivered to the 3D printer separately.

As illustrated by block 278, the printed item can be cured from between about 7 to 90 days, depending at least in part on the method of curing employed, and the concrete formulation being used. As illustrated by block 280, weatherproofing can be applied to the cured or partially cured 3D printed item before the item is sent to final assembly at block 282

In various embodiments, furnishings and/or various other items can be 3D printed using cement/concrete formulations disclosed herein. A method of 3D printing a concrete article of manufacture using fused deposition modeling (FDM) techniques includes forming a concrete slurry, pumping the concrete slurry into a 3D printer, using the 3D printer to extrude the concrete slurry to form the article of manufacture, and curing the article of manufacture.

Forming the concrete slurry includes mixing dry materials into a dry concrete mixture, and adding water to the dry concrete mixture in an amount sufficient to achieve a ratio of water to cementitious materials of greater than about 0.5. The dry materials include primary cementitious material, primary aggregate materials, secondary aggregate materials, a fiber-reinforcement material, and a ternary mixture of selected supplemental materials.

The primary cementitious material includes hydraulic cement in an amount between about 40%-90% by weight of total cementitious materials, wherein the total cementitious materials include the primary cementitious material and any supplemental cementitious materials. The primary aggregate materials include graded silica sand in an amount between about 50% to 90% by weight of total aggregate materials, wherein the graded silica sand includes greater than about 95% SiO2, and wherein the total aggregate materials include primary aggregate materials and any supplemental aggregate materials. The secondary aggregate materials include unfired dry clay in an amount between about 1%-5% by weight of total aggregate materials. The fiber-reinforcement material in the dry concrete mixture is present in an amount between about 1%-3% by weight of the dry concrete mixture.

In at least one embodiment, the ternary mixture of selected supplemental materials includes a combination of three pozzolanic materials. A combination first and second pozzolanic materials is present in an amount between about 10%-60% by weight of total cementitious materials, and a third pozzolanic material is present in an amount between about 10% to 50% by weight of total aggregate material.

In various embodiments, the unfired dry clay includes one or more of bentonite or kaolin.

Curing the article of manufacture can be performed using one or more curing techniques selected from the group consisting of open environment curing, controlled environment curing, water curing, heat curing, and steam curing.

In some embodiments, the concrete slurry optionally includes one or more conductive carbonaceous materials selected from the group consisting of graphite, graphene, nanocarbon, carbon black, and carbon nanotubes. In some implementations, 3D printing the article includes forming a first concrete slurry and a second concrete slurry having differing amounts of the one or more conductive carbonaceous materials, extruding the first concrete slurry to form a first portion of the article of manufacture, and extruding the second concrete slurry to form a second portion of the article of manufacture.

In various embodiments, a surface treatment can be applied to the article of manufacture prior to completion of the curing. In at least one such embodiment, the surface treatment includes one or more of texturizing the surface, adding color, adding a surface coating.

Referring next to FIG. 13 a gantry-style layered-extrusion 3D concrete printer 290 is illustrated in accordance with various embodiments of the 3D printing system 276. Gantry-style layered-extrusion 3D concrete printer 290 receives the concrete slurry via slurry inlet 291, and feeds the slurry to printhead 298, which extrudes the slurry to form FDM printed item 300 under control of a computer processing system (not explicitly illustrated). Printhead 298 is mounted on gantry 296, which allows motion along the Y axis. Movement along the Z axis is achieved by moving gantry 296 up or down uprights 294. Movement along the X axis is achieved by moving the entire assembly along tracks 292.

Referring next to FIG. 14 a robotic-arm-style layered-extrusion 3D concrete printer 301 is illustrated in accordance with various embodiments of the 3D printing system 276. A printhead 302 extrudes a slurry in the same manner as printhead 298 shown in FIG. 13. Movement of the printhead in various directions can be achieved by extending or retracting robotic arm 304, rotating cylinder 306, rotating robotic arm 304 about cylinder 306, and raising or lowering robotic arm 304 up or down cylinder 306. Although robotic-arm-style layered-extrusion 3D concrete printer 301 is illustrated as a large-scale, construction type 3D printer, smaller scale versions employing the same principles can be used for 3D printing household or furniture items.

The above-described process of 3D printing is an example of a "fused deposition modeling," in which layers of a material, this case concrete, are extruded to form an article of manufacture having a desired shape.

Another type of 3D printing process is "binder jetting." Various embodiments described herein use the "binder jetting" 3D printing technique to form an article of manufacture.

Referring next to FIG. 15, a diagram illustrating a binder-jetting 3D concrete printer 310 will be discussed in accordance with various embodiments. Binder jetting 3D concrete printer includes build platform 315, a supply tank 318, which holds a dry concrete formulation disclosed herein, leveling roller 316, liquid binder supply 312, and printhead 316. A layer of the dry concrete formulation is distributed on build platform 315 by leveling roller 316. For various embodiments of FDM 3D printing systems, 1-5% unfired dry clay (bentonite and/or kaolin) is added as a SAM to the formulation described in Table 1.

Printhead 316, moves in the X and Y directions along a plane that is parallel to build platform 315. As Printhead 316 moves, it selectively distributes a liquid binder from liquid binder supply 312 in the shape of each layer of the printed part 320. The liquid binder, which can be water or water plus other additives, adheres the dry concrete formulation together.

After each layer of dry concrete formulation is added, build 315 moves down (in the −Z direction) for a small distance. Another layer of dry concrete formulation is distributed, and process repeats. When all the layers are built, the printed object remains encased in powder bed 322. In various embodiments, the printed part 320 is cured in the powder bed, and until it is removed for further curing and processing.

In at least one embodiment, a method of 3D printing a concrete article of manufacture, includes depositing a layer of a dry concrete mixture, applying a liquid binding agent including water to selected portions of the layer of the dry concrete mixture, repeatedly depositing additional layers of the dry concrete mix and applying additional liquid binding agent to selected portions of each layer until the article of manufacture is formed, and curing the article of manufacture.

In various embodiments, the dry concrete mixture includes primary cementitious material, primary aggregate materials, and a ternary mixture of selected supplemental materials. Optionally, various embodiments also include secondary aggregate materials and a fiber-reinforcement material.

The primary cementitious material can include hydraulic cement in an amount between about 40%-90% by weight of total cementitious materials, wherein the total cementitious materials include the primary cementitious material and any supplemental cementitious materials. The primary aggregate materials include graded silica sand in an amount between about 50% to 90% by weight of total aggregate materials, wherein the graded silica sand includes greater than about 95% SiO2, and wherein the total aggregate materials include primary aggregate materials and any supplemental aggregate materials. The optional secondary aggregate materials can include unfired dry clay in an amount between about 1%-5% by weight of total aggregate materials. The unfired dry clay can include one or more of bentonite or kaolin. The optional fiber-reinforcement material can be present in an amount between about 1%-3% by weight of the dry concrete mixture.

In at least one embodiment, the ternary mixture of selected supplemental materials includes a combination of three pozzolanic materials. A combination first and second pozzolanic materials is present in an amount between about 10%-60% by weight of total cementitious materials, and a third pozzolanic material is present in an amount between about 10% to 50% by weight of total aggregate material.

In various embodiments, the unfired dry clay includes one or more of bentonite or kaolin. Curing the article of manufacture can be performed using one or more curing techniques selected from the group consisting of open environment curing, controlled environment curing, water curing, heat curing, and steam curing.

In various embodiments, the concrete slurry also includes one or more conductive carbonaceous materials selected from the group consisting of graphite, graphene, nanocarbon, carbon black, and carbon nanotubes. The one or more conductive carbonaceous materials can be selectively added to one or more layers of the dry concrete mixture, wherein the one or more conductive carbonaceous materials are selected from the group consisting of graphite, graphene, nanocarbon, carbon black, and carbon nanotubes.

In some embodiments, a surface treatment can be applied to the article of manufacture prior to completion of the curing. The surface treatment can include one or more of texturizing the surface, adding color, adding a surface coating. In other embodiments colorants can be included in either the dry concrete mixture or the liquid binding agent. In some instances liquid colorants can be applied before or after one or more of the binding agent applications.

Various household products, architectural products, and subcomponents thereof can be created using layered deposition, sometimes referred to as fused deposition modeling, binder jetting, wet casting, dry casting, or some combination thereof. Examples of such products include chairs, couches, benches, seats, legs, backs, arms, pedestals, risers, planters, troughs, tiles, pavers, tables, tabletops, countertops, columns, beams, spans, slabs, footings, foundations, floors, walls, buildings, or portions thereof.

As discussed with reference to FIGS. 16 and 17, one or more portions of the concrete member can be 3D printed or cast using a concrete mix including ferrous, graphene or graphite particulates.

In various embodiments, an article of manufacture includes at least one concrete member including ferromagnetic particles distributed throughout at least a portion of the at least one concrete member, wherein the ferromagnetic particles have a reactance, and generate heat in response to being exposed to an electromagnetic field.

In various implementations, the quantity and/or density of the ferromagnetic particles distributed throughout the at least a portion of the at least one concrete member can be determined based on a frequency of the electromagnetic field.

In some implementations that employ ferromagnetic particles, an electromagnetic coil configured to generate the electromagnetic field can be included in the article of manufacture. In one or more such embodiments, a frequency of the electromagnetic field generated by the electromagnetic coil is tuned to a reactance of the ferromagnetic particles distributed throughout the at least a portion of the at least one concrete member. In specific implementations, the frequency of the electromagnetic field generated by the electromagnetic coil is tuned to avoid magnetic saturation of the ferromagnetic particles distributed throughout the at least a portion of the at least one concrete member.

Tuning the electromagnetic coil can include determining a frequency at which the electromagnetic coil shows maximum efficiency. That is, determining a frequency at which a maximum amount of heat is produced by the ferromagnetic particles. This can be determined empirically, and/or calculated based on a measured or anticipated reactance of the article of manufacture. In general the "tuned" frequency will be the frequency at which the article is load-matched to the electromagnetic coil. The size of the coil, the number of coil windings, the diameter of the windings, and various other characteristics of the coil can also be adjusted.

In various embodiments, tuning also includes determining an amount of power to be applied to the coil before the electromagnetic field saturates the ferromagnetic particles. When the particles approach magnetic saturation, large increases in power tend to produce small changes in heat generation.

In any embodiments employing an electromagnetic coil, at least one of an amplitude or a magnitude of the electromagnetic field generated by the electromagnetic coil can be varied to vary an amount of heat generated by the ferromagnetic particles in response to being exposed to the electromagnetic field.

In some embodiments, conductive particles are distributed throughout the at least a portion of the at least one concrete member. The quantity and/or density of the conductive particles distributed throughout the at least a portion of the at least one concrete member can be determined based on a target resistance of the article of manufacture. In various embodiments, the conductive particles impart to the concrete an electrical resistance, allowing the concrete member to be heated by applying an electrical signal that causes a current to flow through the concrete member. The signal can, in some embodiments, be an alternating current (AC) or direct current (DC) signal.

In some embodiments, the ferromagnetic particles distributed throughout the concrete member are permanently magnetized. Magnetizing the concrete member can, in some embodiments, provide an attachment method between two concrete members that does not require adhesives or other fasteners. In some embodiments, the magnetic attachment supplements adhesives or other fasteners.

In various embodiments, the at least one concrete member includes a concrete tile, a concrete floor, or the like. In an example implementation employing magnetic attachment, a magnetized concrete tile can be placed on a magnetized concrete floor so that the magnetic field attaches the tile to the concrete floor. In another example, a concrete article can be magnetized and placed on a section of magnetized flooring to minimize accidental sliding of the article, but still allow the article to be intentionally moved. Other examples include, but are not limited to, one or more portions of a chair, a couch, a bench, a pedestal, a riser, a planter, a trough, a tile, a paver, a counter, a column, a beam, spans, a slab, a footing, a foundation, a floor, a wall, or a building.

In some embodiments, the at least one concrete member can be formed from a concrete mix including a ternary mixture of pozzolanic materials, the ternary mixture that includes a combination of two pozzolanic supplemental cementitious materials; and a pozzolanic supplemental aggregate material.

According to other embodiments disclosed herein, an article of manufacture is formed of at least one concrete member including one or more electrical conductors having an electrical impedance, and an electrical connector having a first side coupled to the one or more electrical conductors, and a second side configured to be coupled to an electrical power source and configured to receive a power signal. The controller can be configured to adjust one or more of a voltage, a frequency, or a current of the power signal to generate a controlled power signal, and apply the controlled power signal to the one or more electrical conductors via the electrical connector.

In some such embodiments, the article of manufacture also includes ferromagnetic particles distributed throughout at least a portion of the at least one concrete member, wherein the ferromagnetic particles have a reactance, and generate heat in response to application of an electromagnetic field. In some such embodiments, the one or more electrical conductors include one or more electromagnetic coils configured to generate the electromagnetic field in response to application of the power signal.

The at least one concrete member can be formed from a concrete mix including a ternary mixture of pozzolanic materials. The ternary mixture of pozzolanic materials includes a combination of two pozzolanic supplemental cementitious materials; and a pozzolanic supplemental aggregate material.

A method according to various embodiments includes adding ferromagnetic particles to a concrete slurry, wherein the ferromagnetic particles have a reactance, and generate heat in response to being exposed to an electromagnetic field, and forming an article of manufacture from the concrete slurry.

The method can further include determining a quantity of the ferromagnetic particles to be added to the concrete slurry based on a frequency of the electromagnetic field, and adding the quantity of ferromagnetic particles to the concrete slurry. In some implementations, the method includes tuning a frequency of an electromagnetic field generated by an electromagnetic coil based on a reactance of the article of manufacture. In some instances the frequency is tuned to avoid magnetic saturation of the article of manufacture. The method can also include varying at least one of an amplitude, a frequency, or a magnitude of the electromagnetic field generated by the electromagnetic coil to vary an amount of heat generated by the ferromagnetic particles.

In various implementations, the method can include determining a quantity of conductive particles to be added to the concrete slurry based on a target resistance of the article of manufacture, and adding the quantity of conductive particles to concrete slurry. The method can also include permanently magnetizing the article of manufacture, which can include, but is not limited to, a chair, couch, bench, seat, leg, back, arm, pedestal, riser, planter, trough, tile, paver, table, tabletop, countertop, column, beam, span, slab, footing, wall, foundation, or floor.

The slurry can include a ternary mixture of pozzolanic materials. The ternary mixture can include a combination of two pozzolanic supplemental cementitious materials, and a pozzolanic supplemental aggregate material.

Other methods disclosed herein include positioning one or more electrical conductors in a mold, wherein the one or more electrical conductors are configured receive a power signal when coupled to an electrical power source, filling the mold with a concrete slurry, and curing the concrete slurry to form an article of manufacture that includes the one or more electrical conductors.

Some such methods further include applying the power signal to a controller coupled to the one or more electrical conductors, adjusting one or more of a voltage, a frequency, or a current of the power signal to generate a controlled power signal, and applying the controlled power signal to the one or more electrical conductors.

Other implementations include adding ferromagnetic particles to the concrete slurry, wherein the ferromagnetic particles have a reactance, and generate heat in response to application of an electromagnetic field.

In various embodiments, the one or more electrical conductors include one or more electromagnetic coils. In some such embodiments, the method includes applying the power signal to the one or more electrical conductors to generate the electromagnetic field. The method can also include applying the power signal to a controller coupled to the one or more electromagnetic coils, adjusting one or more of a voltage, a frequency, or a current of the power signal to generate a controlled power signal, applying the controlled power signal to the one or more electromagnetic coils.

Referring next to FIG. 16 a diagram illustrating a concrete article 331 formed of a concrete formulation including conductive carbonaceous materials, in the form of particles distributed evenly throughout the article will be discussed in accordance with various embodiments. The conductive carbonaceous materials are illustrated as particles spread essentially uniformly throughout concrete article 331, thus the area of even distribution of particles 330 is the entire concrete article. In various embodiments, the conductive carbonaceous materials are used to heat concrete article 331 by exposing the conductive carbonaceous materials to an electromagnetic field.

FIG. 17 illustrates a concrete article 333 formed of one or more concrete formulations including conductive carbonaceous materials. In contrast to FIG. 16, however, the conductive carbonaceous materials are not distributed evenly throughout the entire article. Instead, concrete article 333 includes an area of dense distribution of particles 332, and an area of less dense distribution of particles 334. Areas that include a denser distribution of particles will have a larger quantity of particles per unit area than less dense areas. Note that the quantity of particles included in concrete article 331 (FIG. 16) may be the same as the quantity of particles included in concrete article 333 (FIG. 17), with only the particle distribution and density being different.

It will be appreciated that different distribution patterns can be employed in different embodiments. For example, an article may be formed so that the items edges, back, front, center, top, or bottom include more particles than other areas of the article.

In some embodiments, varying particle distributions can be obtained by using multiple different concrete/slurry formulations, by inserting particles at different times during the casting or printing process, by applying centrifugal forces to the item as it is being cast, by relying on gravity to cause some of the particles to sink, by causing particles to migrate by applying magnetic fields to some, but not all, portions of an item during formation, or the like.

Various embodiments of an article of manufacture disclosed herein include at least one concrete member formed from a concrete mix including a ternary mixture of pozzolanic materials, wherein the ternary mixture includes a combination of two pozzolanic supplemental cementitious materials; and a pozzolanic supplemental aggregate material. Some such articles optionally include at least one concrete member infused with conductive particles. The conductive particles can be distributed evenly or non-linearly throughout the at least one concrete member. In some implementations, the conductive particles are localized to designated regions of at least one concrete member.

The conductive particles can include one or more conductive carbonaceous materials selected from the group consisting of graphite, graphene, nanocarbon, carbon black, and carbon nanotubes, and may generate heat in response to exposure to an induction field.

Referring next to FIG. 18 a diagram illustrating a concrete article 340 including an embedded resistive conductor 342 will be discussed in accordance with various embodiments. In some embodiments, at least one concrete member includes one or more electrical conductors having an electrical impedance. In at least one embodiment, conductor 342 is a coil that functions as a heating element. Conductor 342 can be attached to a controller or power source via protruding portions 343 of conductor 342. Conductor 342 can be embedded in concrete article 340 during the casting or printing process.

In various embodiments, the one or more electrically conductive paths are included between one or more of the layers, or the one or more of the layers can include the one or more electrically conductive paths. An alternating current (AC) power source, or a direct current (DC) power source can be coupled to the electrical conductors.

In some embodiments that include one or more electrical conductors, the one or more electrical conductors can include conductive structural reinforcement materials, such as rebar, tensioning cables, a wire mesh, and/or a carbon fiber grid. Referring next to FIG. 19 a diagram illustrating a pre-stressed concrete article 344 including embedded resistive conductive cables 346 will be discussed in accordance with various embodiments. For example, in some cases it may be desirable to pre-stress the concrete article. Pre-stressing concrete items using cables is known in the art. However, various embodiments herein also use the pre-stressed cables as electrical conductors for heating pre-stressed concrete article 344. FIG. 20, which illustrates a concrete article 350 including an embedded resistive conductive wire mesh 352, is another example of a structural reinforcement material that can be used with the dual purpose of providing a conductive heating path.

In some embodiments, the at least one concrete member includes an induction transmission coil used to generate the induction field. Referring next to FIG. 21, a diagram illustrating a concrete article 354 including both an embedded electromagnetic coil 356 and embedded conductive carbonaceous particles 349 will be discussed in accordance with various embodiments. As discussed with reference to FIGS. 16 and 17, the conductive carbonaceous particles can be used to heat concrete article 331 by exposing the conductive carbonaceous materials to an electromagnetic field. In the embodiment of concrete article 354 illustrated in FIG. 21, the electromagnetic coil 356 used to generate the electromagnetic field that causes the embedded conductive carbonaceous particles 349 to generate heat is included in the same article of manufacture. By including both the electromagnetic coil 356 and the embedded conductive carbonaceous particles 349 in close proximity to each other, the efficiency of the inductive heating can be improved in comparison to externally located coils.

In some embodiments, a concrete member is formed in layers. Referring to FIG. 22, for example, which illustrates a layered concrete article 351 having a first layer 353 formed of a concrete formulation including added conductive carbonaceous materials, a second layer 355 formed of a concrete formulation without added conductive carbonaceous materials, and an optional third layer 357. In the illustrated embodiment, optional third layer 357 is shown without embedded conductive carbonaceous particles, and also without embedded conductors. However, optional third layer 357 can include either or both conductive carbonaceous particles and embedded conductors, such as heating elements, inductive coils, or the like.

In various embodiments, the concrete member can also include an embedded or attached electrical connector coupled to the electrical conductors, wherein the electrical connector includes a first side coupled to the one or more electrical conductors, and a second side configured to be coupled to an electrical power source, potentially through a controller. In various embodiments, the at least one concrete member also includes an embedded thermocouple configured to transmit temperature signals to a controller, such as a thermostat, via a wire or wirelessly. For example, referring next to FIG. 23 a concrete article 360 including a heating element 378 connected to a controller 362 and a power source 364 will be discussed in accordance with various embodiments. Concrete article 360 includes heating element 378, thermocouple 366, and embedded connectors 368.

Controller 362 is coupled to receive power from power source 364 and generate power signal 376. In various embodiments, power signal 376 is a regulated AC or DC signal having at least one of a regulated amplitude, voltage, or frequency. The controller can, in various embodiments, include an AC-DC converter, a DC-AC inverter, a voltage regulator, a current regulator, a frequency regulator, and other circuitry used to generate controlled power signal 376.

In various embodiments, controller 362 various one or more characteristics of the power signal 376 to achieve so that heating element 378 produces a desired amount of heat. In other embodiments controller 362 does not alter the characteristics of the power signal to control the amount of heat produced by heating element 378, but instead controls heating by varying the amount of time the power signal 376 is provided to heating element 378. In some implementations both "on" time and electrical characteristics of power signal 376 are both controlled.

Controller 362 is connected to thermocouple 366 and heating element 378 via embedded connectors 368. In some embodiments, protruding wires or other electrical connection methods can be used. For example, if a conductor terminates at the edge of concrete article 360, wires or connectors can be soldered to the end of the conductor.

Controller 362 receives sensor signal 374 indicating a temperature of concrete article 360, and uses sensor signal to determine how to adjust the power signal 376 to control the temperature of concrete article 360. In various embodiments, more than one thermocouple can be used.

Referring next to FIG. 24 a concrete article 385 having a first concrete layer 380 including inductive heating particles 381 and a second concrete layer 382 including an embedded electromagnetic coil 384 will be discussed in accordance with various embodiments. Controller 362 is coupled to electromagnetic coil 384 and to thermocouple 366, and uses sensor signal 374 to adjust power signal 376 in a manner similar to that described in reference to FIG. 23. Although thermocouple 366 is illustrated as being included in the same layer 382 that includes electromagnetic coil 384, in other embodiments thermocouple 366 can be included in the first layer 380. In operation, the electromagnetic field generated by electromagnetic coil 384 causes inductive heating particles 381 to generate heat, and warm concrete article 385.

Referring next to FIG. 25, a multi-layer concrete article of manufacture 390 including a heating element 396 inserted between two layers, in accordance with various embodiments. Multi-layer article of manufacture 309 includes a first layer 392 and a second layer 394, with heating element 396 inserted between them. In various embodiments, the heating element 396 can be inserted at the intersection of the two layers during casting or 3D printing, inserted between two already-formed layers, which are subsequently joined, or formed at the intersection of layer as part of the casting or 3D printing process. For example, during casting, the surface of the first layer 392 and/or the second layer 394 can be shaped to include a groove or indentation between the two layers into which a molten material can be poured—essentially forming a mold that can be filled with conductive material. In another example, a layer of conductive material can be extruded on top of an already-extruded concrete layer, and additional concrete layers can be extruded on top of the layer of conductive material.

In various embodiments, the concrete article of manufacture can include a concrete member that forms part of a seating unit, for example a seat back, a seat bottom, a seat side, a seat support, or a seat arm.

In other embodiments, the article of manufacture can include a concrete member that forms part of a table, for example a table top, a table leg, or a seat configured to be connected to the table. In other embodiments the concrete member can include a container, a tile, a paver, a column, a beam, a span, a slab, a footing, or a foundation. Other examples include, but are not limited to, one or more portions of a chair, a couch, a bench, a pedestal, a riser, a planter, a trough, a tile, a paver, a counter, a column, a beam, spans, a slab, a footing, a foundation, a floor, a wall, or a building.

Referring next to FIG. 26, a concrete article of manufacture 400 including two members shaped to facilitate mutual engagement will be discussed according to various embodiments. In some implementations, a portion of the at least one concrete member is shaped to engage a complementary-shaped portion of another concrete member. FIG. 26 illustrates a first complementary member 402 and a second complementary member 404 are shaped to engage in a half-lap configuration. Other type of joints that can be used to mutually engage two concrete members include a mitered butt, a tongue and groove, a dado, a mortise and tenon, or the like.

In various embodiments, the at least one concrete member includes one or more fasteners that allow the member to be connected to other members to form a completed article of manufacture. First complementary member 402 also includes integrated pin fasteners 406, which engage corresponding pin receivers (not shown) in second complementary member 404. Pin fasteners 406 can be formed of concrete, but in various embodiments include embedded metal or plastic pins. Other types of fasteners can also be used in some embodiments.

Referring next to FIG. 27 a concrete article of manufacture 410 including attachment fasteners will be discussed according to various embodiments. Concrete article of manufacture 410 is illustrated with two different types of fasteners: a pin fastener 414 and a hinge fastener 412, although in various embodiments only a single type of fastener is used on a single surface of a concrete member. Hinge fastener 412 can be one half of a complete hinge, with the complementary half being formed into, or attached to, an adjoining member (not illustrated. Hinge fastener 412 may be configured to provide only a limited range of motion. Any suitable type of fastener can be either embedded into a concrete member of an article of manufacture to allow connection with other concrete members or members formed of wood, plastic, or the like.

In some embodiments, embedded fasteners are placed in a cast or incorporated into the 3D printing area, so that the fasteners are integral to a concrete member. In other embodiments, fasteners can be embedded after the concrete member has been formed, but has not finally cured. In some embodiments, fasteners can be added to concrete members after the fact. Fasteners can also, in some embodiments, be used in conjunction with adhesives.

Referring next to FIG. 28 a concrete article of manufacture 424 including ferromagnetic particles in an unmagnetized state is discussed in accordance with various embodiments. The ferromagnetic particles included in various embodiments provide inductive heat generation in conjunction with an electromagnetic coil included in, or in proximity to, a concrete article of manufacture. In various embodiments, the ferromagnetic particles need not be magnetized to function for heat generation.

Referring next to FIG. 29 a concrete article of manufacture 426 including ferromagnetic particles in a magnetized state is discussed in accordance with various embodiments. In some embodiments, the ferromagnetic particles can be used to provide magnetic attachment of concrete article of manufacture 426 to another concrete article, to a non-concrete article, or to allow magnetic attachment of other items to concrete article of manufacture 426.

For example, if one or more portions of a concrete chair arm are magnetized, as shown in FIG. 29, a steel insulated thermos can be placed on the chair arm with a reduced likelihood that the thermos will be accidentally knocked off. A magnetized chair back can be used to hold magnetic commercial or personal messages. In other embodiments, a magnetized concrete tile can be placed on a magnetized concrete floor so that the magnetic field attaches the tile to the concrete floor. In another example, a concrete article can be magnetized and placed on a section of magnetized flooring to minimize accidental sliding of the article, but still allowing the article to be intentionally moved. Other examples of magnetized articles contemplated by the present disclosure include, but are not limited to, one or more portions of a chair, a couch, a bench, a pedestal, a riser, a planter, a trough, a tile, a paver, a counter, a column, a beam, spans, a slab, a footing, a foundation, a floor, a wall, or a building.

Figure 30B:
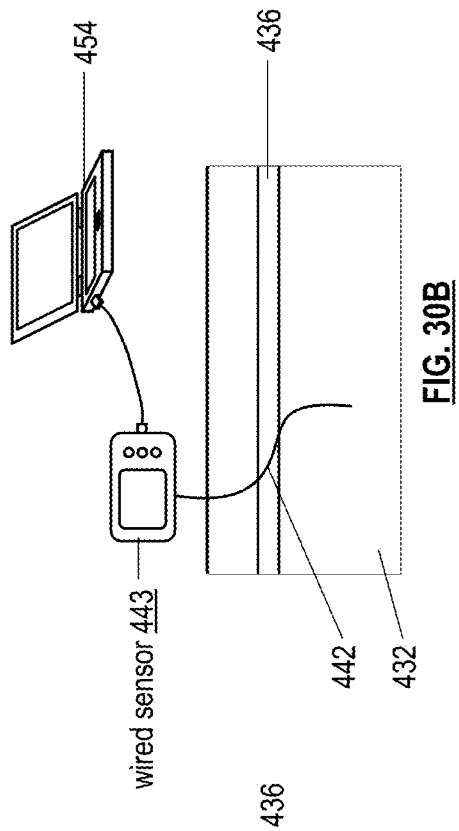
Figure 30A:
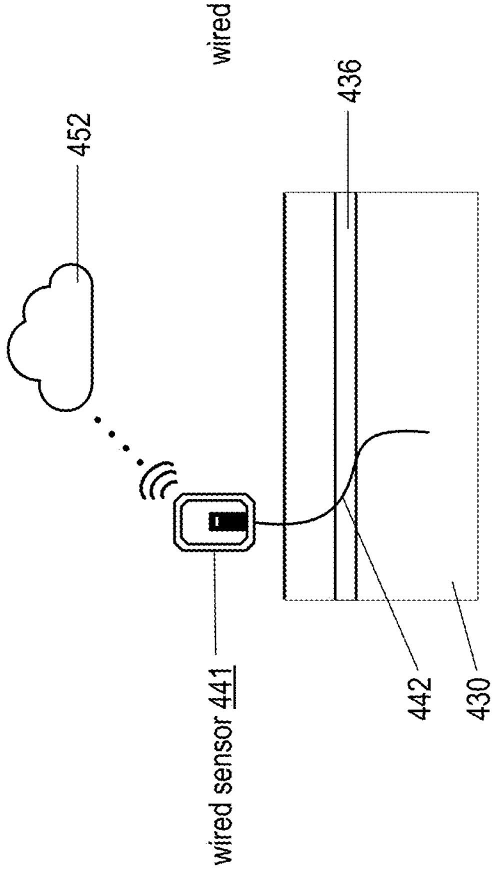
Figure 30C:
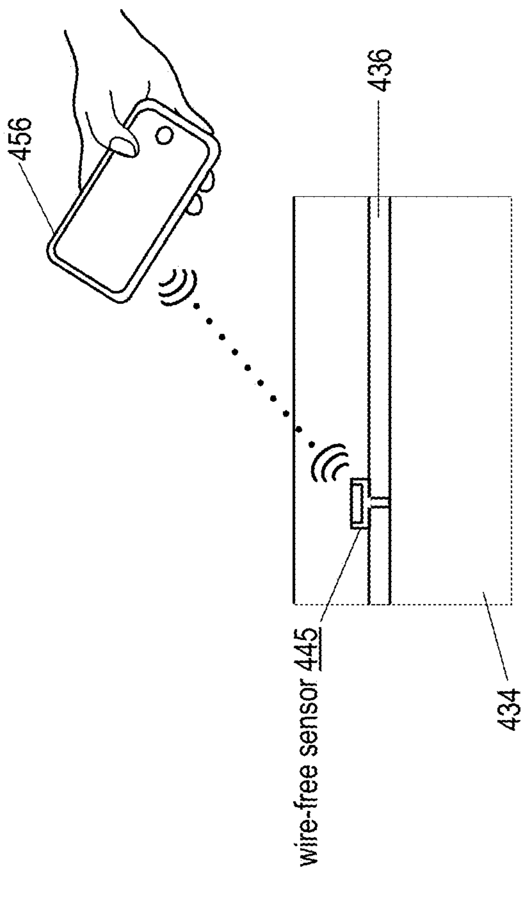

Referring next to FIGS. 30A-C, various wired and wireless temperature sensors used to provide temperature input to thermostats or other controllers will be discussed in accordance with various embodiments. In various embodiments discussed herein, controllers and thermostats can use temperature information provided by temperature sensors to control heating of concrete articles of manufacture. Various wired, wireless, embedded, and external sensors can be used to collect temperature information and provide it to a thermostat or other controller.

FIG. 30A illustrates an external wired sensor 441, which obtains temperature information about concrete article 430, and wirelessly transmits that information to "the cloud," which can process the temperature information and provide it to a user's control application, or directly to a controller attached to a concrete article. For example, a user may be coming home from work and want to pre-heat her concrete deck chair. The user can send a command to a cloud-based application, instructing the application to start heating the deck chair to initiate heating until a temperature of 76 degrees Fahrenheit is reached. The cloud application can issue the command, and use temperature readings obtained wirelessly from wired sensor 441 to control the chair's heating.

In the illustrated embodiment, the sensor is attached by sensor wire 442 to conductor 436, which is embedded in concrete article 430. By attaching the sensor wire 442 to the conductor, a distributed temperature, rather than a point temperature, can be obtained.

FIG. 30B illustrates an external wired sensor 443, which obtains temperature information about concrete article 432, and transmits that information to an attached processing device 454. The processing device 454 can be a user's or maintenance technician's computer in some implementations. In other implementations processing device 454 can be controller associated with one or more concrete articles of manufacture. As in FIG. 30A, the sensor is attached to a sensor wire 442 which is in contact with conductor 436 embedded in concrete article 432.

It should be noted that any of the described embodiments can use sensors attached to multiple different embedded conductors, where the conductors can have any desired shape. Additionally, the sensor need not be attached to an internal conductor in all implementations. Furthermore, more than one sensor can be employed.

FIG. 30C illustrates an internal wireless sensor 445, which obtains temperature information about concrete article 434, and transmits that information wirelessly to processing device 456. The processing device 456 can be a smartphone, handheld controller, or the like. In other implementations processing device 456 can be controller connected to one or more concrete articles of manufacture. internal wireless sensor 445 is attached directly to a conductor, so sensor wire 442 is not needed.

As compared to normal, commercially-available FRC and ready-mix concretes, the benefits of using various FRC formulations described in this disclosure include, but are not limited to the following: 1) mechanical and strength improvements; 2) improved durability and freeze-thaw resistance; and 3) a reduction in carbon footprint. Various embodiments disclosed herein can also be rapid-curing, self-leveling, and in general lighter than FRC and normal ready-mix.

In particular, concrete formulations including the ternary mixture of a combination of two pozzolanic supplemental cementitious materials (e.g., FA, MK) and a pozzolanic supplemental aggregate material (e.g., SF) can provide mechanical and strength improvements, improved durability and freeze-thaw resistance improvements reductions in the carbon footprint compared to conventional FRC. Additionally these formulations can be tuned using the information provided herein such that the resulting FRC is rapid-curing. Various embodiments can be used in self-leveling applications. The disclosed formulations include embodiments that create a cured product that is, in general, lighter than FRC and ready-mix concretes.

Various dry concrete mixtures and variations thereof are described herein for use in any or all of the disclosed embodiments. For example, at least one embodiment disclosed herein comprises a dry concrete mixture comprising: primary cementitious material including hydraulic cement in an amount between about 40%-90% by weight of total cementitious materials, wherein the total cementitious materials include the primary cementitious material and any supplemental cementitious materials; primary aggregate materials including graded silica sand in an amount between about 50% to 90% by weight of total aggregate materials, wherein the graded silica sand includes greater than about 95% SiO2, and wherein the total aggregate materials include primary aggregate materials and any supplemental aggregate materials; and a ternary mixture of selected supplemental materials including: a combination of a first pozzolanic material and a second pozzolanic material, wherein the combination is present in an amount between about 10%-60% by weight of total cementitious materials; and a third pozzolanic material is present in an amount between about 10% to 50% by weight of total aggregate material.

The dry concrete mixture optionally comprises: a fiber-reinforcement material in an amount between about 1%-3% by weight of the dry concrete mixture. Optionally, the fiber-reinforcement material is selected from the group consisting of hemp fiber, flax fiber, cellulose fiber, basalt fiber, glass fiber, carbon fiber, and steel fiber. In addition or in the alternative, the fiber-reinforcement material includes glass fiber having a diameter of between about 8-20 mm bundled with between about 100-200 filaments per bundle, and having a bundle diameter between about 10-30 microns. In addition or in the alternative, this dry concrete mixture further comprises: one or more conductive carbonaceous materials selected from the group consisting of graphite, graphene, nanocarbon, carbon black, and carbon nanotubes.

In addition or in the alternative, the first pozzolanic material and the second pozzolanic material are different pozzolanic materials selected from the group consisting of: fly ash, zeolite, calcined clay, silica fume, ground granulated blast furnace slag, and rice husk. In addition or in the alternative the first pozzolanic material consists essentially of fly ash; the second pozzolanic material consists essentially of calcined clay; and the third pozzolanic material consists essentially of silica fume.

In addition or in the alternative, the third pozzolanic material acts as both a supplemental aggregate material and as a supplemental cementitious material. In addition or in the alternative, the first pozzolanic material is selected from the group consisting of rice husk ash and ground granulated blast furnace slag; and the second pozzolanic material includes a manufactured pozzolan.

In addition or in the alternative, this dry concrete mixture further comprises: a supplemental cementitious material replacing at least a portion of the hydraulic cement, wherein the supplemental cementitious material is selected from the group consisting of thermoactivated recycled cement, activated recycled glass, ground granulated blast furnace slag, and hydrated lime.

In addition or in the alternative, this dry concrete mixture further comprises: a superplasticizer in an amount between about 1% to 10% by weight of the total cementitious material.

In addition or in the alternative, the dry concrete mixture consists essentially of recycled materials. In addition or in the alternative, the recycled materials are selected from the group consisting of thermoactivated recycled cement, recycled supplemental cementitious materials, recycled glass aggregate, natural fibers, mineral fibers, and biopolymers.

In addition or in the alternative, a ratio of the total cementitious material to the total aggregate material in this dry concrete mixture is between about 1:0.02 and 1:2 by weight.

Various concrete slurries and variations thereof are described herein for use in any or all of the disclosed embodiments. For example, at least one embodiment disclosed herein comprises a concrete slurry comprising: a dry concrete mixture including: primary cementitious material including hydraulic cement in an amount between about 40%-90% by weight of total cementitious materials, wherein the total cementitious materials include the primary cementitious material and any supplemental cementitious materials; primary aggregate materials including graded silica sand in an amount between about 50% to 90% by weight of total aggregate materials, wherein the graded silica sand includes greater than about 95% SiO2, and wherein the total aggregate materials include primary aggregate materials and any supplemental aggregate materials; and a ternary mixture of selected supplemental materials including: a combination of a first pozzolanic material and a second pozzolanic material, wherein the combination is present in an amount between about 10%-60% by weight of total cementitious materials; a third pozzolanic material present in an amount between about 10% to 50% by weight of total aggregate material; and water in an amount between about 30%-60% by volume of the total cementitious material.

This concrete slurry optionally comprises: a liquid fortifier replacing between about 5% to 50% by volume of the water. In addition or in the alternative, the concrete slurry comprises: a superplasticizer in an amount between about 1% to 10% by weight of the total cementitious materials. In addition or in the alternative, the amount of superplasticizer is between about 3% to 8% of the total cementitious materials when a ratio of water to the total cementitious materials is in within a range of between about 0.3 to 0.6.

In addition or in the alternative, the concrete slurry comprises: a liquid coloring agent. In addition or in the alternative, the concrete slurry comprises: a fiber-reinforcement material in an amount between about 1%-3% by weight of the dry concrete mixture. In addition or in the alternative, the concrete slurry comprises: one or more conductive carbonaceous materials selected from the group consisting of graphite, graphene, nanocarbon, carbon black, and carbon nanotubes.

In addition or in the alternative, the first pozzolanic material and the second pozzolanic material are different pozzolanic materials selected from the group consisting of: fly ash, zeolite, calcined clay, silica fume, ground granulated blast furnace slag, and rice husk ash. In addition or in the alternative the first pozzolanic material consists essentially of fly ash; the second pozzolanic material consists essentially of calcined clay; and the third pozzolanic material consists essentially of silica fume. In addition or in the alternative, the third pozzolanic material acts as both a supplemental aggregate material and as a supplemental cementitious material.

In addition or in the alternative the first pozzolanic material is selected from the group consisting of rice husk ash and ground granulated blast furnace slag; and the second pozzolanic material includes a manufactured pozzolan.

In addition or in the alternative, a ratio of the total cementitious material to the total aggregate material in this concrete slurry is between about 1:0.02 and 1:2 by weight.

Referring next to FIGS. 31A-B, a flowchart illustrating a method of wet casting a concrete article will be discussed in accordance with various embodiments.

A method of wet casting a concrete article of manufacture comprises: forming a concrete slurry including: mixing dry materials into a dry concrete mixture, the dry materials including: primary cementitious material including hydraulic cement in an amount between about 40%-90% by weight of total cementitious materials, wherein the total cementitious materials include the primary cementitious material and any supplemental cementitious materials; primary aggregate materials including graded silica sand in an amount between about 50% to 90% by weight of total aggregate materials, wherein the graded silica sand includes greater than about 95% SiO2, and wherein the total aggregate materials include primary aggregate materials and any supplemental aggregate materials; a fiber-reinforcement material in an amount between about 1%-3% by weight of the dry concrete mixture; and a ternary mixture of selected supplemental materials including: a combination of a first pozzolanic material and a second pozzolanic material, wherein the combination is present in an amount between about 10%-60% by weight of total cementitious materials; a third pozzolanic material in an amount between about 10% to 50% by weight of total aggregate material; and adding water to the dry concrete mixture in an amount sufficient to achieve a ratio of water to cementitious materials of greater than about 0.5; pouring the concrete slurry into a substantially water-tight mold having a cavity, wherein the cavity has a shape; curing the concrete slurry inside the mold during a first curing stage, wherein during the first curing stage the slurry hardens into a cast item having the shape; removing the cast item from the mold; continuing to cure the cast item outside of the mold during a second curing stage.

Optionally, a duration of the first curing stage is determined, based at least in part, on: quantities of the supplemental cementitious materials included in the dry concrete mixture; and a curing technique used during the first curing stage. Alternatively or additionally, a duration of the second curing stage can be determined, based at least in part, on: a duration of time needed for the cast item to reach a predetermined strength level; and a curing technique used during the second curing stage.

In addition or in the alternative, the first curing stage lasts between about 1 and 7 days; and the second curing stage lasts between about 7-90 days. In addition or in the alternative, the curing includes: one or more curing techniques selected from the group consisting of open environment curing, controlled environment curing, water curing, heat curing, and steam curing.

In addition or in the alternative, the concrete slurry further includes: one or more conductive carbonaceous materials selected from the group consisting of graphite, graphene, nanocarbon, carbon black, and carbon nanotubes.

In addition or in the alternative, the method further includes forming a first concrete slurry and a second concrete slurry having differing amounts of the one or more conductive carbonaceous materials; and pouring the first concrete slurry and the second concrete slurry into different portions of the mold.

In addition or in the alternative mixing components of the dry concrete mixture using batch mixing. In addition or in the alternative mixing components of the dry concrete mixture using volumetric mixing.

In addition or in the alternative, creating the mold by forming a negative of the shape, wherein the negative of the shape is formed using at least one material selected from the group consisting of wood, metal, plastic, liquid rubber, and silicon.

In addition or in the alternative applying a surface treatment to an exposed surface of the cast item prior to completion of the second curing stage, wherein the surface treatment includes one or more of: texturizing the surface, adding color, adding a surface coating.

Referring next to FIGS. 32A-B, a flowchart illustrating a method of dry casting a concrete article will be discussed in accordance with various embodiments.

A method of dry casting a concrete article of manufacture comprises: forming a first concrete slurry including; a dry concrete mixture including: primary cementitious material including hydraulic cement in an amount between about 40%-90% by weight of total cementitious materials, wherein the total cementitious materials include the primary cementitious material and any supplemental cementitious materials; primary aggregate materials including graded silica sand in an amount between about 50% to 90% by weight of total aggregate materials, wherein the graded silica sand includes greater than about 95% SiO2, and wherein the total aggregate materials include primary aggregate materials and any supplemental aggregate materials; and a ternary mixture of selected supplemental materials including: a combination of a first pozzolanic material and a second pozzolanic material, wherein the combination is present in an amount between about 10%-60% by weight of total cementitious materials; a third pozzolanic material in an amount between about 10% to 50% by weight of total aggregate material; and water in an amount sufficient to achieve a ratio of water to cementitious materials of up to about 0.6; spraying a fronting layer of the first concrete slurry into a cavity of a substantially water-tight mold, wherein the cavity has a shape, and wherein the fronting layer is optionally less than about 6 mm; curing the fronting layer during a fronting-layer-curing stage, wherein a duration of the fronting-layer-curing stage is less than about 1 hour; forming a second concrete slurry, wherein the second concrete slurry is a low-water-to-cementitious-materials version of the first concrete slurry including water in an amount sufficient to achieve a ratio of water to cementitious materials of less than about 0.4, and further including a fiber-reinforcement material in an amount between about 1%-3% by weight of the dry concrete mixture; packing the second concrete slurry into the mold to form a structural backing layer, wherein the mold holds both the first concrete slurry and the second concrete slurry; curing the first concrete slurry and the second concrete slurry inside the mold during a first curing stage, wherein during the first curing stage the first concrete slurry and the second concrete slurry harden into a cast item having the shape; removing the cast item from the mold; continuing to cure the cast item outside of the mold during a second curing stage.

Optionally, a duration of the first curing stage is determined, based at least in part, on: quantities of the supplemental cementitious materials included in the dry concrete mixture; and a curing technique used during the first curing stage.

In addition or in the alternative, a duration of the second curing stage is optionally determined, based at least in part, on: a duration of time needed for the cast item to reach a predetermined strength level; and a curing technique used during the second curing stage. Optionally, the first curing stage lasts between about 1 and 7 days; and the second curing stage lasts between about 7-90 days.

Optionally, curing includes using one or more curing techniques selected from the group consisting of open environment curing, controlled environment curing, water curing, heat curing, and steam curing.

Optionally, the concrete slurry includes one or more conductive carbonaceous materials selected from the group consisting of graphite, graphene, nanocarbon, carbon black, and carbon nanotubes. In addition or in the alternative, the method includes forming multiple second concrete slurries having differing amounts of the one or more conductive carbonaceous materials; and packing the multiple second concrete slurries into different portions of the mold.

Optionally, the method further comprises mixing components of the dry concrete mixture using batch mixing. In addition or in the alternative, the method further comprises mixing components of the dry concrete mixture using volumetric mixing.

In addition or in the alternative, the method further comprises creating the mold by forming a negative of the shape, wherein the negative of the shape is formed using at least one material selected from the group consisting of wood, metal, plastic, liquid rubber, and silicon.

In addition or in the alternative, the method further comprises applying a surface treatment to an exposed surface of the cast item prior to completion of the second curing stage, wherein the surface treatment optionally includes one or more of: texturizing the surface, adding color, adding a surface coating.

Referring next to FIG. 33, a flowchart illustrating a method of 3D printing a concrete article using fused deposition model (FDM) 3D printing will be discussed in accordance with various embodiments.

A method of 3D printing a concrete article of manufacture comprises: forming a concrete slurry including: mixing dry materials into a dry concrete mixture, the dry materials including: primary cementitious material including hydraulic cement in an amount between about 40%-90% by weight of total cementitious materials, wherein the total cementitious materials include the primary cementitious material and any supplemental cementitious materials; primary aggregate materials including graded silica sand in an amount between about 50% to 90% by weight of total aggregate materials, wherein the graded silica sand includes greater than about 95% SiO2, and wherein the total aggregate materials include primary aggregate materials and any supplemental aggregate materials; secondary aggregate materials including unfired dry clay in an amount between about 1%-5% by weight of total aggregate materials; a fiber-reinforcement material in an amount between about 1%-3% by weight of the dry concrete mixture; and a ternary mixture of selected supplemental materials including: a combination of a first pozzolanic material and a second pozzolanic material, wherein the combination is present in an amount between about 10%-60% by weight of total cementitious materials; a third pozzolanic material in an amount between about 10% to 50% by weight of total aggregate material; and adding water to the dry concrete mixture in an amount sufficient to achieve a ratio of water to cementitious materials of greater than about 0.5; pumping the concrete slurry into a 3D printer; extruding the concrete slurry, using the 3D printer, to form at least a portion of the article of manufacture; and curing the article of manufacture.

Optionally, the unfired dry clay includes one or more of bentonite or kaolin. In addition or in the alternative, the method employs one or more curing techniques selected from the group consisting of open environment curing, controlled environment curing, water curing, heat curing, and steam curing.

Optionally, the concrete slurry further includes one or more conductive carbonaceous materials selected from the group consisting of graphite, graphene, nanocarbon, carbon black, and carbon nanotubes. In addition or in the alternative, the method includes forming a first concrete slurry and a second concrete slurry having differing amounts of the one or more conductive carbonaceous materials; and extruding the first concrete slurry to form a first portion of the article of manufacture and extruding the second concrete slurry to form a second portion of the article of manufacture.

In addition or in the alternative, the method includes applying a surface treatment to the article of manufacture prior to completion of the curing. Optionally, the surface treatment includes one or more of: texturizing the surface, adding color, or adding a surface coating.

Referring next to FIG. 34, a flowchart illustrating a method of 3D printing a concrete article will be discussed in accordance with various embodiments.

A method of 3D printing a concrete article of manufacture comprises: depositing a layer of a dry concrete mixture, the dry concrete mixture including: primary cementitious material including hydraulic cement in an amount between about 40%-90% by weight of total cementitious materials, wherein the total cementitious materials include the primary cementitious material and any supplemental cementitious materials; primary aggregate materials including graded silica sand in an amount between about 50% to 90% by weight of total aggregate materials, wherein the graded silica sand includes greater than about 95% SiO2, and wherein the total aggregate materials include primary aggregate materials and any supplemental aggregate materials; secondary aggregate materials including unfired dry clay in an amount between about 1%-5% by weight of total aggregate materials; a fiber-reinforcement material in an amount between about 1%-3% by weight of the dry concrete mixture; and a ternary mixture of selected supplemental materials including: a combination of a first pozzolanic material and a second pozzolanic material, wherein the combination is present in an amount between about 10%-60% by weight of total cementitious materials; a third pozzolanic material in an amount between about 10% to 50% by weight of total aggregate material; and applying a liquid binding agent including water to selected portions of the layer of the dry concrete mixture; repeatedly depositing additional layers of the dry concrete mix and applying additional liquid binding agent to selected portions of each layer until the article of manufacture is formed; and curing the article of manufacture.

Optionally, the unfired dry clay includes one or more of bentonite or kaolin. In addition or in the alternative curing includes using one or more curing techniques selected from the group consisting of open environment curing, controlled environment curing, water curing, heat curing, and steam curing.

Optionally, the dry concrete mixture further includes: one or more conductive carbonaceous materials selected from the group consisting of graphite, graphene, nanocarbon, carbon black, and carbon nanotubes. In addition or in the alternative, the method further comprises adding one or more conductive carbonaceous materials to one or more layers of the dry concrete mixture, wherein the one or more conductive carbonaceous materials are selected from the group consisting of graphite, graphene, nanocarbon, carbon black, and carbon nanotubes.

In addition or in the alternative, the method includes applying a surface treatment to the article of manufacture prior to completion of the curing. Optionally, the surface treatment includes one or more of: texturizing the surface, adding color, or adding a surface coating.

Various embodiments disclose a concrete article formed using a fused deposition modeling (FDM) 3D printing process. The FDM 3D printing process includes forming a concrete slurry including: mixing dry materials into a dry concrete mixture, the dry materials including: primary cementitious material including hydraulic cement in an amount between about 40%-90% by weight of total cementitious materials, wherein the total cementitious materials include the primary cementitious material and any supplemental cementitious materials; primary aggregate materials including graded silica sand in an amount between about 50% to 90% by weight of total aggregate materials, wherein the graded silica sand includes greater than about 95% SiO2, and wherein the total aggregate materials include primary aggregate materials and any supplemental aggregate materials; secondary aggregate materials including unfired dry clay in an amount between about 1%-5% by weight of total aggregate materials; a fiber-reinforcement material in an amount between about 1%-3% by weight of the dry concrete mixture; and a ternary mixture of selected supplemental materials including: a combination of a first pozzolanic material and a second pozzolanic material, wherein the combination is present in an amount between about 10%-60% by weight of total cementitious materials; a third pozzolanic material in an amount between about 10% to 50% by weight of total aggregate material; and adding water to the dry concrete mixture in an amount sufficient to achieve a ratio of water to cementitious materials of greater than about 0.5; pumping the concrete slurry into a 3D printer; extruding the concrete slurry, using the 3D printer, to form the article of manufacture; and curing the article of manufacture.

Optionally, the concrete article includes one or more of a household product, a chair, a planter, a tile, a paver, a table, an architectural product, a column, a beam, a span, a slab, a footing, or a foundation. In addition or in the alternative, the concrete article is part of a larger assembly.

Various embodiments disclose a concrete article formed using a binder jetting 3D printing process. The binder jetting 3D printing process includes depositing a layer of a dry concrete mixture, the dry concrete mixture including: primary cementitious material including hydraulic cement in an amount between about 40%-90% by weight of total cementitious materials, wherein the total cementitious materials include the primary cementitious material and any supplemental cementitious materials; primary aggregate materials including graded silica sand in an amount between about 50% to 90% by weight of total aggregate materials, wherein the graded silica sand includes greater than about 95% SiO2, and wherein the total aggregate materials include primary aggregate materials and any supplemental aggregate materials; secondary aggregate materials including unfired dry clay in an amount between about 1%-5% by weight of total aggregate materials; a fiber-reinforcement material in an amount between about 1%-3% by weight of the dry concrete mixture; and a ternary mixture of selected supplemental materials including: a combination of a first pozzolanic material and a second pozzolanic material, wherein the combination is present in an amount between about 10%-60% by weight of total cementitious materials; a third pozzolanic material in an amount between about 10% to 50% by weight of total aggregate material; and applying a liquid binding agent including water to selected portions of the layer of the dry concrete mixture; repeatedly depositing additional layers of the dry concrete mix and applying additional liquid binding agent to selected portions of each layer until the article of manufacture is formed; and curing the article of manufacture.

Optionally, the concrete article includes one or more of a household product, a chair, a planter, a tile, a paver, a table, an architectural product, a column, a beam, a span, a slab, a footing, or a foundation. In addition or in the alternative, The concrete article is part of a larger assembly.

In various embodiments described herein, a dry concrete mixture comprises a ternary mixture consisting essentially of a combination of two pozzolanic supplemental cementitious materials and a pozzolanic supplemental aggregate material.

Optionally, the dry concrete mixture of comprises a fiber-reinforcement material. Optionally, the fiber-reinforcement material is selected from the group consisting of hemp fiber, flax fiber, cellulose fiber, basalt fiber, glass fiber, carbon fiber, and steel fiber.

In addition or in the alternative, the fiber-reinforcement material includes glass fiber having a diameter of between about 8-20 mm bundled with between about 100-200 filaments per bundle, and having a bundle diameter between about 10-30 microns.

In addition or in the alternative, the dry concrete mixture comprises: one or more conductive carbonaceous materials selected from the group consisting of graphite, graphene, nanocarbon, carbon black, and carbon nanotubes.

Optionally, the two pozzolanic supplemental cementitious materials and the pozzolanic supplemental aggregate material are selected from the group consisting of: fly ash, zeolite, calcined clay, silica fume, ground granulated blast furnace slag, and rice husk ash.

In addition or in the alternative the combination two pozzolanic supplemental cementitious materials includes fly ash and calcined clay; and the pozzolanic supplemental aggregate material includes silica fume.

In addition or in the alternative, the pozzolanic supplemental aggregate material acts as both a supplemental aggregate material and as a supplemental cementitious material.

In addition or in the alternative, the two pozzolanic supplemental cementitious materials include: a first pozzolanic material selected from the group consisting of rice husk ash and ground granulated blast furnace slag; and a second pozzolanic material including a manufactured pozzolan.

In addition or in the alternative additional supplemental cementitious materials selected from the group consisting of thermoactivated recycled cement, activated recycled glass, ground granulated blast furnace slag, and hydrated lime are included.

In addition or in the alternative the dry concrete mixture comprises a superplasticizer.

In addition or in the alternative the dry concrete mixture consists essentially of recycled materials. The recycled materials are optionally selected from the group consisting of thermoactivated recycled cement, recycled supplemental cementitious materials, recycled glass aggregate, natural fibers, mineral fibers, and biopolymers.

A concrete slurry according to various embodiments comprises: a dry concrete mixture including primary cementitious materials; primary aggregate materials; a ternary mixture consisting essentially of a combination of two pozzolanic supplemental cementitious materials; a pozzolanic supplemental aggregate material; and water.

Optionally, the concrete slurry comprises a liquid fortifier.

In addition or in the alternative, the concrete slurry comprises a superplasticizer.

In addition or in the alternative, the concrete slurry comprises a coloring agent.

In addition or in the alternative, the concrete slurry comprises a fiber-reinforcement material.

In addition or in the alternative, the concrete slurry comprises one or more conductive carbonaceous materials selected from the group consisting of graphite, graphene, nanocarbon, carbon black, and carbon nanotubes.

In addition or in the alternative, the concrete slurry comprises the two pozzolanic supplemental cementitious materials are selected from the group consisting of: fly ash, zeolite, calcined clay, silica fume, ground granulated blast furnace slag, and rice husk ash.

In addition or in the alternative, the concrete slurry comprises the combination two pozzolanic supplemental cementitious materials includes fly ash and calcined clay; and the pozzolanic supplemental aggregate material includes silica fume.

In addition or in the alternative, the pozzolanic supplemental aggregate material acts as both a supplemental aggregate material and as a supplemental cementitious material.

In addition or in the alternative, the two pozzolanic supplemental cementitious materials include: a first pozzolanic material is selected from the group consisting of rice husk ash and ground granulated blast furnace slag; and a second pozzolanic material including a manufactured pozzolan.

In addition or in the alternative, the concrete slurry comprises additional supplemental cementitious materials selected from the group consisting of thermoactivated recycled cement, activated recycled glass, ground granulated blast furnace slag, and hydrated lime.

In addition or in the alternative, the dry concrete mixture consists essentially of recycled materials. Optionally, the recycled materials are selected from the group consisting of thermoactivated recycled cement, recycled supplemental cementitious materials, recycled glass aggregate, natural fibers, mineral fibers, and biopolymers.

Various embodiments disclosed herein describe an article of manufacture comprising at least one concrete member formed from a concrete mix including a ternary mixture of pozzolanic materials, the ternary mixture including: a combination of two pozzolanic supplemental cementitious materials; and a pozzolanic supplemental aggregate material.

Optionally, the at least one concrete member is infused with conductive particles. In addition or in the alternative, the conductive particles are distributed throughout the at least one concrete member. In addition or in the alternative, the conductive particles are distributed non-linearly throughout the at least one concrete member.

In addition or in the alternative, the conductive particles are localized to designated regions of at least one concrete member.

Optionally, in any or all of the above embodiments, the conductive particles include one or more conductive carbonaceous materials selected from the group consisting of graphite, graphene, nanocarbon, carbon black, and carbon nanotubes.

In addition or in the alternative, the conductive particles generate heat in response to exposure to an induction field.

In addition or in the alternative, the at least one concrete member includes an induction transmission coil.

In addition or in the alternative, the at least one concrete member includes: one or more electrical conductors having an electrical impedance; and an electrical connector having a first side coupled to the one or more electrical conductors, and a second side configured to be coupled to an electrical power source.

In addition or in the alternative, the one or more electrical conductors include: conductive structural reinforcement materials. In addition or in the alternative, the conductive structural reinforcement materials include a wire mesh.

In addition or in the alternative, the conductive structural reinforcement materials include rebar. In addition or in the alternative, the conductive structural reinforcement materials include tensioning cables.

In addition or in the alternative, the conductive structural reinforcement materials include a carbon fiber grid.

In addition or in the alternative, the at least one concrete member is formed in layers; and the one or more electrically conductive paths are included between one or more of the layers.

In addition or in the alternative, the at least one concrete member is formed in layers; and one or more of the layers include the one or more electrically conductive paths.

In addition or in the alternative, the electrical power source includes one of an alternating current power source, or a direct current power source.

In addition or in the alternative, the at least one concrete member is part of a seating unit.

In addition or in the alternative, the at least one concrete member is one of a seat back, a seat bottom, a seat side, a seat support, and a seat arm.

In addition or in the alternative, the at least one concrete member is part of a table.

In addition or in the alternative, the at least one concrete member is one of a table top, a table leg, a seat configured to be connected to the table.

In addition or in the alternative, the at least one concrete member is one of a container, a tile, a paver, a column, a beam, a span, a slab, a footing, or a foundation.

In addition or in the alternative, the at least one concrete member includes one or more fasteners.

In addition or in the alternative, a portion of the at least one concrete member is shaped to engage a complementary-shaped portion of another concrete member.

In addition or in the alternative, the at least one concrete member is formed, at least in part, by 3D printing.

In addition or in the alternative, a portion of the at least one concrete member is 3D printed using a concrete mix including ferrous, graphene or graphite particulates.

In addition or in the alternative, the at least one concrete member is formed by casting.

In addition or in the alternative, the concrete mix further includes a fiber-reinforcement material.

In addition or in the alternative, the concrete mix further includes a superplasticizer.

In addition or in the alternative, the concrete mix further includes a coloring agent.

In addition or in the alternative, the article of manufacture includes a thermocouple.

In various embodiments disclosed herein, an article of manufacture comprises at least one concrete member including ferromagnetic particles distributed throughout at least a portion of the at least one concrete member, wherein the ferromagnetic particles have a reactance, and generate heat in response to being exposed to an electromagnetic field.

Optionally, a quantity of the ferromagnetic particles distributed throughout the at least a portion of the at least one concrete member is determined based on a frequency of the electromagnetic field. In addition or in the alternative, a density of the ferromagnetic particles distributed throughout the at least a portion of the at least one concrete member is determined based on a frequency of the electromagnetic field.

In addition or in the alternative, the article of manufacture comprises an electromagnetic coil configured to generate the electromagnetic field, wherein a frequency of the electromagnetic field generated by the electromagnetic coil is tuned to a reactance of the ferromagnetic particles distributed throughout the at least a portion of the at least one concrete member.

In addition or in the alternative, the frequency of the electromagnetic field generated by the electromagnetic coil is tuned to avoid magnetic saturation of the ferromagnetic particles distributed throughout the at least a portion of the at least one concrete member.

In addition or in the alternative, at least one of an amplitude or a magnitude of the electromagnetic field generated by the electromagnetic coil is varied to vary an amount of heat generated by the ferromagnetic particles in response to being exposed to the electromagnetic field.

In addition or in the alternative, the article of manufacture comprises conductive particles distributed throughout the at least a portion of the at least one concrete member, wherein a quantity of the conductive particles distributed throughout the at least a portion of the at least one concrete member is determined based on a target resistance of the article of manufacture.

In addition or in the alternative, the article of manufacture comprises conductive particles distributed throughout the at least a portion of the at least one concrete member, wherein a density of the conductive particles distributed throughout the at least a portion of the at least one concrete member is determined based on a target resistance of the article of manufacture.

In addition or in the alternative, the ferromagnetic particles distributed throughout the at least one concrete member are permanently magnetized.

In addition or in the alternative, the article of manufacture comprises the at least one concrete member includes a concrete tile.

In addition or in the alternative, the article of manufacture comprises the at least one concrete member includes a concrete floor.

In addition or in the alternative, the article of manufacture comprises the at least one concrete member is formed from a concrete mix including: a ternary mixture of pozzolanic materials, the ternary mixture including: a combination of two pozzolanic supplemental cementitious materials; and a pozzolanic supplemental aggregate material.

Various embodiments disclosed herein describe an article of manufacture comprising at least one concrete member including: one or more electrical conductors having an electrical impedance; and an electrical connector having a first side coupled to the one or more electrical conductors, and a second side configured to be coupled to an electrical power source and configured to receive a power signal.

Optionally, the article of manufacture comprises a controller configured to: adjust one or more of a voltage, a frequency, or a current of the power signal to generate a controlled power signal; and apply the controlled power signal to the one or more electrical conductors via the electrical connector.

In addition or in the alternative, the article of manufacture comprises ferromagnetic particles distributed throughout at least a portion of the at least one concrete member, wherein the ferromagnetic particles have a reactance, and generate heat in response to application of an electromagnetic field.

In addition or in the alternative, the one or more electrical conductors include one or more electromagnetic coils configured to generate the electromagnetic field in response to application of the power signal.

In addition or in the alternative, the at least one concrete member is formed from a concrete mix including: a ternary mixture of pozzolanic materials, the ternary mixture including: a combination of two pozzolanic supplemental cementitious materials; and a pozzolanic supplemental aggregate material.

Referring next FIG. 34, a flowchart illustrating a method of 3D printing a concrete article using binder jetting will be discussed in accordance with various embodiments.

In various embodiments, the method comprises adding ferromagnetic particles to a concrete slurry, wherein the ferromagnetic particles have a reactance, and generate heat in response to being exposed to an electromagnetic field; and forming an article of manufacture from the concrete slurry.

Optionally, the method comprises: determining a quantity of the ferromagnetic particles to be added to the concrete slurry based on a frequency of the electromagnetic field; and adding the quantity of ferromagnetic particles to the concrete slurry.

In addition or in the alternative, the method comprises tuning a frequency of an electromagnetic field generated by an electromagnetic coil based on a reactance of the article of manufacture.

In addition or in the alternative, the method comprises tuning a frequency of an electromagnetic field generated by an electromagnetic coil to avoid magnetic saturation of the article of manufacture.

In addition or in the alternative, the method comprises varying at least one of an amplitude, a frequency, or a magnitude of the electromagnetic field generated by the electromagnetic coil to vary an amount of heat generated by the ferromagnetic particles.

In addition or in the alternative, the method comprises determining a quantity of conductive particles to be added to the concrete slurry based on a target resistance of the article of manufacture; and adding the quantity of conductive particles to concrete slurry.

In addition or in the alternative, the method comprises permanently magnetizing at least a portion of the article of manufacture.

In addition or in the alternative, the article of manufacture includes a concrete tile.

In addition or in the alternative, the article of manufacture includes a concrete floor.

In addition or in the alternative, the concrete slurry includes: a ternary mixture of pozzolanic materials, the ternary mixture including: a combination of two pozzolanic supplemental cementitious materials; and a pozzolanic supplemental aggregate material.

Referring next to FIG. 35, a flowchart illustrating a method of forming a concrete article of manufacture including embedding electrical conductors will be discussed in accordance with various embodiments.

In various embodiments, the method comprises positioning one or more electrical conductors in a mold, wherein the one or more electrical conductors are configured receive a power signal when coupled to an electrical power source; filling the mold with a concrete slurry; curing the concrete slurry to form an article of manufacture that includes the one or more electrical conductors.

Optionally, the method includes applying the power signal to a controller coupled to the one or more electrical conductors; adjusting one or more of a voltage, a frequency, or a current of the power signal to generate a controlled power signal; and applying the controlled power signal to the one or more electrical conductors.

In addition or in the alternative, the method comprises adding ferromagnetic particles to the concrete slurry, wherein the ferromagnetic particles have a reactance, and generate heat in response to application of an electromagnetic field.

In addition or in the alternative, the one or more electrical conductors include one or more electromagnetic coils; and applying the power signal to the one or more electrical conductors to generate the electromagnetic field.

In addition or in the alternative, the method comprises applying the power signal to a controller coupled to the one or more electromagnetic coils; adjusting one or more of a voltage, a frequency, or a current of the power signal to generate a controlled power signal; and applying the controlled power signal to the one or more electromagnetic coils.

In addition or in the alternative, the concrete slurry includes: a ternary mixture of pozzolanic materials, the ternary mixture including: a combination of two pozzolanic supplemental cementitious materials; and a pozzolanic supplemental aggregate material.

For the FRC formulation described in this disclosure, the following tests are recommended to confirm performance criteria.

To confirm strength after Curing I (1-7 days) and Curing II (7-90 days): (1) ASTM C39/C39M-21 Standard Test Method for Compressive Strength of Cylindrical Concrete Specimens. This test is typically used to confirm the compressive strength of FRC column that are after 7, 28, and 90 days of curing; (2) ASTM C1609/C1609M-19a Standard Test Method for Flexural Performance of Fiber-Reinforced Concrete (Using Beam with Third Point Loading). This test is typically used to confirm flexural strength after 28 days of curing.

To confirm durability after Curing II (7-90 days) and/or weatherproofing: (1) ASTM C666-67 Standard Test Method for Resistance of Concrete to Rapid Freezing and Thawing. This test is typically used to confirm cold-weather durability after 30 days of curing. (2) ASTM C1556-11a Standard Test Method for Determining Apparent Chloride Diffusion Coefficient of Cementitious Mixtures by Bulk Diffusion. This test is typically used to determine chloride penetration into concrete mixtures that have steel reinforcement. Chloride penetration causes rusting in these types of concrete mixtures, and therefore this test predicts service life of steel-reinforced concretes. For FRC, chloride penetration can be correlated to porosity, and therefore probability of durability.

Test results of various formulations was performed. Using the specific formulation ratios described in Table 2, and the spreadsheet method described in Table 3, sixteen unique formulations using different combinations of FA, MK, and SF were prepared and cast in 4×8 inch concrete cylinders in a manner consistent with the requirements for testing using ASTM C39/C39M-21. Each of the sixteen unique formulations were tested at 7- and 28-day curing intervals for compressive strength.

These non-optimized unique formulations were developed as a proof-of-concept to demonstrate that a ternary blend of fly ash and metakaolin and silica fume in a fiber reinforced concrete can have strength similar to commercially-available ready-mix concrete.

Specific parameters used for the 16 unique FRC formulations tested are described in Table 4.

TABLE 4

Component ratios used for proof-of-concept ASTM C39/C39M-21 testing

| Component | Mixture Ratio |
|---|---|
| TCM | 750 kg/m3<br>HC + FA + MK |
| FA | 0-30% of TCM |
| MK | 0-30% of TCM |
| TAM | SS + SF |
| SF | 10% of TAM |
| GF | 3% of (TCM + TAM) |
| SP | 3% of TCM |
| w/TCM | 0.5-0.65 TCM |

Results for 16 test performed are presented in Table 5. Note that the expected 90 day strength is calculated based on the 7-day strength being 65% of the full cure strength.

TABLE 4

Results of ASTM C39/C39M-21 testing

| Testing Name | Formulation Name | Strength (7 Day) MPa | Strength (7 Day) PSI | Strength (28 Day) MPa | Strength (28 Day) PSI | Expected Strength (90 Day) MPa | Expected Strength (90 Day) PSI |
|---|---|---|---|---|---|---|---|
| WHPC001 | 0FA0MK | 38.1 | 5526 | 54.1 | 7847 | 51.435 | 7460 |
| WHPC002 | 10FA0MK | 26 | 3771 | 43.7 | 6338 | 35.1 | 5091 |
| WHPC003 | 20FA0MK | 22.9 | 3321 | 33.2 | 4815 | 30.915 | 4484 |
| WHPC004 | 30FA0MK | 17.6 | 2553 | 25.5 | 3698 | 23.76 | 3446 |
| WHPC005 | 0FA10MK | 39.2 | 5685 | 45.0 | 6527 | 52.92 | 7675 |
| WHPC006 | 10FA10MK | 32 | 4641 | 38.0 | 5511 | 43.2 | 6266 |
| WHPC007 | 20FA10MK | 24 | 3481 | 35.9 | 5207 | 32.4 | 4699 |
| WHPC008 | 30FA10MK | 17.1 | 2480 | 24.3 | 3524 | 23.085 | 3348 |
| WHPC009 | 0FA20MK | 31.7 | 4598 | 37.5 | 5439 | 42.795 | 6207 |
| WHPC010 | 10FA20MK | 26.9 | 3902 | 29.0 | 4206 | 36.315 | 5267 |
| WHPC011 | 20FA20MK | 17.3 | 2509 | 23.6 | 3423 | 23.355 | 3387 |
| WHPC012 | 30FA20MK | 13.6 | 1973 | 15.4 | 2234 | 18.36 | 2663 |
| WHPC013 | 0FA30MK | 24.6 | 3568 | 25.2 | 3655 | 33.21 | 4817 |
| WHPC014 | 10FA30MK | 18 | 2611 | 21.0 | 3046 | 24.3 | 3524 |
| WHPC015 | 20FA30MK | 13.5 | 1958 | 14. | 2045 | 18.225 | 2643 |
| WHPC016 | 30FA30MK | 8.1 | 1175 | 9.7 | 1407 | 10.935 | 1586 |

A comparison between the 7-day and 28-day strength of the unique FRC formulation and commercially-available ready-mix concrete is presented in Table 6.

TABLE 6

Comparison of testing results with published 28-day compressive strength of commercially-available ready-mix concretes.

| Testing Name | Formulation Name | Strength (28 Day) MPa | Strength (28 Day) PSI |
|---|---|---|---|
| Quikrete | FastSet All-Crete | 55.2 | 8000 |
| Sika | MonoTop 622 F | 55.2 | 8000 |
| Bomix | HR-8000 | 55.2 | 8000 |
| Sakrete | Sikacrete 08 SCC | 55.2 | 8000 |
| WHPC001 | 0FA0MK | 54.1 | 7847 |
| WHPC005 | 0FA10MK | 45.0 | 6527 |
| Bomix | Hypercrete | 44.8 | 6500 |
| WHPC002 | 10FA0MK | 43.7 | 6338 |
| Quikrete | Countertop Mix | 41.4 | 6000 |
| Sakrete | PSI 6000 | 41.4 | 6000 |
| Sika | Mono Top 623 F | 40.0 | 5800 |
| WHPC006 | 10FA10MK | 38.0 | 5511 |
| Quikrete | Fast Setting Self Leveling Floor Resurfacer | 37.9 | 5500 |
| WHPC009 | 0FA20MK | 37.5 | 5439 |
| WHPC007 | 20FA10MK | 35.9 | 5207 |
| Quikrete | 5000 High Early Strength | 34.5 | 5000 |
| Quikrete | Sand Mix | 34.5 | 5000 |
| Sakrete | Sand Mix | 34.5 | 5000 |
| WHPC003 | 20FA0MK | 33.2 | 4815 |
| WHPC010 | 10FA20MK | 29.0 | 4206 |

TABLE 6-continued

Comparison of testing results with published 28-day compressive strength of commercially-available ready-mix concretes.

| | | Strength (28 Day) | |
|---|---|---|---|
| Testing Name | Formulation Name | MPa | PSI |
| Quikrete | All Purpose Mix | 27.6 | 4000 |
| Quikrete | Fast Setting Mix | 27.6 | 4000 |
| Quikrete | Fence n' Post | 27.6 | 4000 |
| Sakrete | Concrete Mix | 27.6 | 4000 |
| Sakrete | Fast Set | 27.6 | 4000 |
| Bomix | All Purpose Mix | 26.0 | 3770 |
| Bomix | Postmix030 | 26.0 | 3770 |
| WHPC004 | 30FA0MK | 25.5 | 3698 |
| WHPC013 | 0FA30MK | 25.2 | 3655 |
| WHPC008 | 30FA10MK | 24.3 | 3524 |
| Sika | 125 CA - Interior Self Leveing | 24.2 | 3510 |
| WHPC011 | 20FA20MK | 23.6 | 3423 |
| WHPC014 | 10FA30MK | 21.0 | 3046 |
| WHPC012 | 30FA20MK | 15.4 | 2234 |
| WHPC015 | 20FA30MK | 14.1 | 2045 |
| WHPC016 | 30FA30MK | 9.7 | 1407 |

Various embodiments of cement formulations have been discussed above. Any of the above cement formulations can be additionally modified using any of the following variants: 1) use of natural (hemp, flax, cellulose) or mineral (basalt) fibers to replace glass fiber; 2) use of 1-5% bentonite or kaolin clay as SAM for 3D printing applications; 3) use of graded recycled glass aggregate as SAM to replace silica sand aggregate; 4) using zeolite to replace fly ash as SCM; 5) using thermoactivated recycled cement as SCM to replace HC; 6) using activated recycled glass as SCM to replace HC; 7) using ground granulated blast furnace slag (GGBS) as SCM to replace HC; 8) using hydrated lime as SCM to replace HC; 9) using 100% recycled components, including i) thermoactivated recycled cement, and/or recycled SCM to replace HC, ii) recycled glass aggregate to replace silica sand, iii) natural or mineral fibers to replace glass fiber, iv) biopolymer to replace liquid resin (acrylic) fortifier; 10) using carbon fiber and/or steel fiber to replace glass fiber, and two or more conductive carbonaceous materials including but not limited to graphite, graphene, nanocarbon, carbon black, and carbon nanotubes as SAM, to make the FRC formulation described in this disclosure conductive and/or self-heating.

Although various products that can be produced using the techniques described herein have been previously discussed, other products that can be manufactured using the techniques and formulations described herein include consumer and/or household products including, but not limited to: chairs, benches, couches, loungers, and all other types of seating where that seating includes a hard seat and/or a hard back; tables, surfaces, monoliths, and all other types of flat or curved surface where some or all of that surface is hard, including kitchen, bathroom, and all countertop surfaces; planters and all other type of common household vessel (ornamental/decorative+functional); all types of kitchen and bathroom sinks; toilets, bidets, and composting toilets; shower stalls, pans, inserts, and all types of bathtub; appliances, including free-standing ovens, toaster appliances, and refrigerators; tiles and pavers.

Architectural Products that can be manufactured using the techniques and formulations described herein include architectural products including, but not limited to the following: wall panels, tiles, and rainscreen/sunscreen systems; dimensional blocks, bricks, and façade systems; prefabricated footings, pads, foundations, and other sub-grade or on-grade concrete elements; prefabricated columns, beams, and other span members; prefabricated slabs; floor restoration and self-leveling applications.

Some specialty products that can be manufactured using the techniques and formulations described herein include, but are not limited to, self-heating and/or de-icing slabs, tiles, and/or pavers.

For consumer and/or household products, various embodiments of the disclosed FRC formulation will match strength performance of existing FRC options, but will have a lower carbon footprint because of SCM and SAM inclusions, as well as better durability and freeze-thaw resistance. These benefits are also true for architectural products. For prefabricated architectural products, the FRC formulation with match strength performance and high curing rates of existing methods, but will be lighter and therefore less expensive to transport than existing FRC or ready-mix products.

This disclosure presents various formulations, mixtures, slurries, methods of curing and manufacture, including numerous examples presenting many optional functions and features. It should be noted that any of the foregoing could be applied to other applications and articles of manufacture.

As previously discussed, the seat back 121, seat bottom 122, seat arms 123, and/or seat frame 124 can be comprised of a Corian™ material, and/or other composite materials such as cement, concrete, bio polymers, plastics, sintered/engineered stones, glass fiber reinforced Gypsum (GFRG) and the like which may be referred to as composite stone, manmade stone and/or artificial stone material and that is optionally weatherproof, weather resistant, or otherwise suitable for outdoor use. In some embodiments, the seat back 121, seat bottom 122, seat arms 123, and/or seat frame 124 are 3D printed and/or otherwise manufactured as discussed previously.

In accordance with various examples, a seating unit or other furnishing unit includes:

a seat back having a front side and a back side, the seat back constructed of first composite stone material;

a seat bottom having a top side and an underside seat bottom constructed of second composite stone material;

a first heating element, attached to the back side of the seat back, and configured to deliver first heating through the first composite stone material of the seat back to a user while seated in the seating unit when electrically powered;

a second heating element, attached to the underside of the seat bottom, and configured to deliver second heating through the second composite stone material of the seat bottom to the user while seated in the seating unit when electrically powered;

circuitry configured to facilitate delivery of power to the first heating element and the second heating element;

a lighting element integrated within the seating unit behind a translucent logo upon a surface of the seating unit, wherein the lighting element is configured to backlight the translucent logo to present a display which changes dynamically; and a drainage element having a drainage element cavity at the back end of the seat bottom;

wherein the seating unit is configured to be positioned upon a planar surface for seating by the user;

wherein the seat bottom comprises a front end and a back end, wherein the front end of the seat bottom is a first distance from the planar surface when the seating unit rests upon the planar surface, wherein the back end of the seat bottom is a second distance from the planar surface when the seating unit is positioned upon the planar surface, and wherein the second distance is smaller than the first distance;

wherein the drainage element cavity is configured to process flow of precipitation landing upon the seat bottom resulting from flowing of the precipitation from the front end to the back end based on the second distance being smaller than the first distance.

In addition or in the alternative to any of the foregoing, the first heating element and the second heating element each comprise a first film of resistive material deposited on a substrate.

In addition or in the alternative to any of the foregoing, the first film is deposited as a first pattern, and wherein first heating element and the second heating element each further comprise a second film of conducting material deposited on the substrate, the second film deposited as a second pattern electrically connected to the first pattern.

In addition or in the alternative to any of the foregoing, the seating unit further includes:

input and output terminals for transferring power to the first heating element and the second heating element, the input and output terminals connected to a power transfer unit mounted to the seating unit; and a power lead configured to interconnect a power source and the power transfer unit.

In addition or in the alternative to any of the foregoing, the power transfer unit is an easy release power transfer device having first and second parts held together in a normal state by at least one of: friction or magnetism.

In addition or in the alternative to any of the foregoing, a second seating unit includes the power source, wherein the power lead interconnects the power source and the power transfer unit based on attaching to a second power lead of the second seating unit, and wherein the second seating unit powers at least one heating element of the second seating unit via the power source.

In addition or in the alternative to any of the foregoing, the seating unit further includes a second power lead supplying power to a third seating unit, wherein the third seating unit powers at least one heating element of the second seating unit via the power supplied by the seating unit via the second power lead.

In addition or in the alternative to any of the foregoing, the circuitry causes the first heating element and the second heating element to change between a set of at least three heating states, wherein a first heating state of the set of at least three heating states corresponds to delivering heating via a first intensity, wherein a second heating state of the set of at least three heating states corresponds to delivering heating via a second intensity that is lower than the first intensity, and wherein a third heating state of the set of at least three heating states corresponds to delivering no heating.

In addition or in the alternative to any of the foregoing, the seating unit further includes a user input button, wherein a switch of the circuitry is actuated based on pressing of a user input button attached to the seating unit, wherein actuation of the switch causes the first heating element and the second heating element to change between different ones of the set of at least three heating states in accordance with a cyclical ordering of the set of at least three heating states.

In addition or in the alternative to any of the foregoing, the seating unit further includes a communications interface, wherein data received via the communications interface is processed via the circuitry to cause the first heating element and the second heating element to change between different ones of the set of at least three heating states.

In addition or in the alternative to any of the foregoing, the data received via the communications interface includes weather data, and wherein updating to a new one of the set of at least three heating states is based on the weather data.

In addition or in the alternative to any of the foregoing, the first heating element is implemented as a first heating pad, wherein the second heating element is implemented as a second heating pad, and the seating unit further includes a heating pad cover plate comprising a vertical covering component and a horizontal covering component, and wherein a first side of the first heating pad is secured against the back side of the seat back, and wherein a second side of the first heating pad opposite the first side of the first heating pad is secured against an inner surface of the vertical covering component of the heating pad cover plate.

In addition or in the alternative to any of the foregoing, a first side of the second heating pad is secured against the underside of the seat bottom, and wherein a second side of the second heating pad opposite the first side of the second heating pad is secured against an inner surface of the horizontal covering component of the heating pad cover plate.

In addition or in the alternative to any of the foregoing, a seating unit includes:

a seat back having a front side and a back side, the seat back constructed of first composite stone material;

a seat bottom having a top side and an underside seat bottom constructed of second composite stone material;

a first heating element, attached to the back side of the seat back, and configured to deliver first heating through the first composite stone material of the seat back to a user while seated in the seating unit when electrically powered;

a second heating element, attached to the underside of the seat bottom, and configured to deliver second heating through the second composite stone material of the seat bottom to the user while seated in the seating unit when electrically powered;

circuitry configured to facilitate delivery of power to the first heating element and the second heating element; and a drainage element having a drainage element cavity at the back end of the seat bottom;

wherein the seating unit is configured to be positioned upon a planar surface for seating by the user;

wherein the seat bottom comprises a front end and a back end, wherein the front end of the seat bottom is a first distance from the planar surface when the seating unit rests upon the planar surface, wherein the back end of the seat bottom is a second distance from the planar surface when the seating unit is positioned upon the planar surface, and wherein the second distance is smaller than the first distance; and wherein the drainage element cavity is configured to process flow of precipitation landing upon the seat bottom resulting from flowing of the precipitation from the front end to the back end based on the second distance being smaller than the first distance.

FIG. 36A is a block diagram illustrating an example client device. In the example shown, a client device 630 is implemented via: one or more client processing modules 620; one or more client memory modules 610; one or more client network interfaces 630; one or more user interface devices such as client display device(s) 670; and/or one or more client input device(s) 650, communicating via bus 690. The one or more network interfaces 630 can be operable to send and/or receive data via the network 150 and/or via any other communication system. Bus 690 can facilitate communication of data between the: one or more client processing modules 620; one or more client memory modules 610; one or more client network interfaces 630; one or more client display devices 670; and/or one or more client input devices 650. While a particular bus configuration is shown, other bus architectures are likewise possible that include two or more buses and/or direct connectivity between two or more components.

The client devices 130 can be implemented as: a mobile device, a cellular phone, a tablet, a smart device, a wearable device, a personal computer, a laptop computer, a desktop computer, and/or any other computing device.

The client display device 270 can be implemented via a monitor and/or touch screen. In addition or in the alternative, the client display device 270 can be implemented via an AR and/or VR capable device, such as an AR headset, interactive AR glasses, a VR headset, 3D glasses, interactive VR glasses, and/or other device capable of facilitating an AR, VR, and/or mixed reality experience. In operation, the client display device 270 can be configured to display one or more views of an interactive user interface 275. Interactive user interface 275 can be implemented as a graphical user interface (GUI), can present prompts and/or information as described herein, and/or can facilitate user selection of presented options and/or input of user text, commands and/or other input generated by one or more client input devices 650 in response to user interaction therewith. For example, client display device 270 can be implemented via at least one touchscreen, at least one monitor, at least one screen, and/or at least one other display device. In some embodiments, client device 130 is implemented to convey some or all information and/or prompts as audio data, for example, via at least one speaker of the client device 130, and/or the user optionally responds to prompts via voice commands, for example, processed via at least one microphone of the client device 130.

The client input device 250 can be operable to collect user input, for example, in response to one or more prompts presented via interactive user interface 275. For example, client input device 250 can be implemented via at least one keyboard, at least one touchscreen, at least one mouse, at least one knob or button, at least one microphone, at least one camera, at least one receiver, at least one transceiver, at least one interface to one or more memory drives storing document files, and/or at least one other input device that collects data utilized as user input.

The client memory module 210 can include memory that stores operational instructions that, when executed by the one or more client processing modules 220, cause the corresponding client device 130 to execute some or all of the functionality described herein. In the example shown, the memory stores a slicer application 612 and further is configured to store application data 616 associated with the slicer application 612 and/or one or more objects to be 3D printed by a 3D printing system 276 that includes a 3D printer and a communication interface for communicating with the client device via network 150.

In various examples, the slicer application 612 implements a slicer, e.g., toolpath generation software used in 3D printing which facilitates the conversion of a 3D object model to specific instructions for the printer. In various examples, the 3D object model corresponds to a component of a seating unit or other furnishing previously described. In the alternative, the 3D object model corresponds to some other object. The slicer converts an updated 3D object model in (e.g., in stereolithography (STL) format or other format) into printer commands (in STL G-code format or other format capable of being executed by the 3D printing system 276—for example, via fused filament fabrication and other related 3D printing processes. The slicer application can be or include a stand-alone application and/or be or include a web-based application that is implemented via a browser.

In various examples, the slicer application 612 generates a final (e.g., finally updated) 3D object model which contains the object itself as well as other ancillary portions such as infill, rafts, skirts, brims, sprues and/or support elements—making the object more suitable for 3D printing. The slicer then segments the final 3D object model as a stack of flat layers. It then describes these layers through linear movements of the 3D printer's extruder, the fixation laser, or an equivalent component. All these movements, together with some specific printer commands like the ones to control the extruder temperature or bed temperature, are ultimately compiled in G-code or other formatted file suitable for the 3D printing system 276. This file can then be transferred to the 3D printer for execution.

In various examples, the slicer application 612 facilitates 3D slant printing, (i.e., 3D printing of an object with a surface or axis (such as a planar surface or other surface or axis) at an angle that is displaced from vertical. For many objects, slant printing can improve the stress vectors generated during object printing, improve object strength and surface finish, and improve print accuracy. In various examples, the slicer application 612 facilitates 3D slant printing by automatically designing/generating one or more fin supports that are printed with the object and that can be easily detached after the object is printed.

In various examples, the slicer application 612 includes the operational instructions, when executed by the one or more client processing modules 220, can cause the one or more client processing modules 220 to perform operations that include:

receiving model data corresponding to an object to be printed via the 3D printer, wherein the object includes a planar surface;

generating a display of the model data via the GUI;

receiving, via the GUI, angle data corresponding to a print angle for the object, the print angle establishing an angular deviation of the planar surface from a vertical axis;

automatically generating fin support data based on the print angle, the fin support data corresponding to at least one fin support configured to support the object during printing via the 3D printer, the at least one fin support including a vertical triangular fin element having a leading edge corresponding to the angular deviation of the planar surface from a vertical axis and a horizontal base element;

generating updated model data by updating the model data to correspond to the print angle, to include the fin support data and further to include sprue data corresponding to a plurality of sprues that couple the leading edge of the vertical triangular fin element to the planar surface at multiple points, wherein the plurality of sprues facilitate separation of the at least one fin support from the object after printing via the 3D printer;

generating 3D printer commands based on the model data; and sending, via the communications interface, the 3D printer commands to the 3D printer to facilitate 3D printing of the object, the at least one fin support and the plurality of sprues.

In addition or in the alternative to any of the foregoing, the vertical triangular fin element has a planar triangular structure that has a topmost point that is lower than a topmost point of the object oriented at the print angle.

In addition or in the alternative to any of the foregoing, the fin support data is automatically generated further based on dimensions of the object.

In addition or in the alternative to any of the foregoing, the fin support data is automatically generated further based on dimensions of the planar surface.

In addition or in the alternative to any of the foregoing, the horizontal base element has at least one planar triangular shape and is attached to the vertical triangular fin element at a bottommost edge of the vertical triangular fin element.

In addition or in the alternative to any of the foregoing, the at least one fin support is positioned adjacent to the planar surface of the object so as to leave a gap between the leading edge of the vertical triangular fin element and the planar surface and wherein each of the plurality sprues bridge the gap between the leading edge of the vertical triangular fin element and the planar surface.

In addition or in the alternative to any of the foregoing, the at least one fin support is positioned adjacent to the planar surface of the object with the planar triangular structure at a right angle to the planar surface.

In addition or in the alternative to any of the foregoing, the print angle is less than or equal to 45 degrees.

In addition or in the alternative to any of the foregoing, the fin support data is automatically generated response to data received via the GUI indicating a fin support selection from a plurality of support selections.

In addition or in the alternative to any of the foregoing, the at least one fin support includes a plurality of fin supports positioned adjacent to the planar surface of the object, wherein the vertical triangular fin element of each of the plurality of fin supports has a planar triangular surface at a right angle to the planar surface.

Further example/embodiments including several optional functions, features and implementations are presented in conjunction with FIGS. 36B-36H that follow.

FIG. 36B is a pictorial diagram illustrating a perspective view of an example of a 3D printed object with a fin support. In the example shown, the object to be printed 500 is a block having a planar surface 502 that is to be printed on a printer bed 510 at a selected print angle/slant. The slicer has automatically generated fin support data based on the selected print angle and corresponding to a fin support 520 configured to support the object during 3D printing. The fin support 520 includes a vertical triangular fin element 524 having a leading edge 522 corresponding to the angular deviation of the planar surface from a vertical axis (i.e., the selected print angle) and a horizontal base element 526 which, in the example shown, includes two triangular wings. In various example, the horizontal base element 526 can be designed to include a pad/base having a raft, a skirt and/or a brim and furthermore, the object to be printed 500 can also be designed to be supported by one or more additional supports and/or one or more pad(s)/base(s) having a raft, a skirt and/or a brim (not specifically shown).

Consider FIG. 36C which presents a pictorial diagram of a side view illustrating an example of a 3D printed object 500 with a fin support 520. In the example shown, the object to be printed has a print angle of Θ. In the example shown, this print angle is less than 45 degrees, but a larger print angle can be used in other examples. Consequently, the vertical triangular fin element 524 is automatically designed to have a leading edge 522 at this same angle to as to be aligned parallel to the planar surface 502, but leaving a gap 525 of fixed width (e.g., 1 mm) that can be filed with a series of sprues 534 that help the fin support 524 support the object 500 at multiple points. These sprues 534 can be cylindrical, cone-shaped, spheres or cones or cylinders that have spherical ends that mate with the planar surface and/or be of other configurations and can have a diameter such as 0.2 mm-0.5 mm—or other small diameter and length (corresponding to the width of the gap 525) so as to facilitate separation of the fin support 520 from the object after printing via the 3D printer. In various examples the distance between sprues is automatically selected to conform to a maximum linear distance between sprues such as 0.5 cm, 1 cm (or other greater or lesser maximum distance). Furthermore, the size of the fin support can be scaled based on the dimensions of the planar surface 502. In various examples, the topmost point of the vertical triangular fin element can be scaled to be at, or within some tolerance, of a fixed percentage (e.g., 60%, 65%, 70% . . . ) of the topmost point 532 of the planar surface. Furthermore the length of the bottommost edge 528 of the vertical fin element 524 can be automatically scaled as a function of the print angle of Θ to include a minimum length (d)+c sin(Θ), where c is a constant.

As previously discussed, the horizontal base element 526 can include a raft, a skirt and/or a brim and furthermore, the object to be printed 500 can also be supported one or more additional supports such as tree supports or other supports and/or one or more pad(s)/base(s) having a raft, a skirt and/or a brim and/or one or more other vertical triangular fin elements 524 in region 540 coupled to the object to be printed via other sprues of elements of sufficiently small dimension so as to facilitate separation from the object 500 after printing via the 3D printer.

In addition, the width of the planar surface can be used to automatically select the number of fin supports that are included in the design as shown in FIG. 36D. In various examples the distance between fin supports is automatically selected to conform to a maximum linear distance between fin supports such as 4 cm (or other maximum distance) while maintaining a maximum distance such as 4 cm between vertical triangular fin elements 524 (or less or other maximum distance) between the two outermost vertical triangular fin elements 524 and each corresponding outermost edge of the planar surface 502.

In various examples, the fin support 520 can be automatically designed to include a plurality of holes 542 that reduce the amount of material used in 3D printing as shown in FIG. 36E. These holes can be of a fixed diameter or of a diameter that scaled based on the scaled size of the fin support 520. The number of holes 542 and/or their arrangement can be selected via a constrained search algorithm that maintains a minimum distance between adjacent holes and a minimum distance between each hole and each edge of the vertical triangular fin element. While shown as circular holes of the same size, in other examples, holes of elliptical or polygonal shapes and/or of differing sizes may also be employed.

It should also be noted that while the foregoing has focused on objects to be 3D printed having planar surfaces, the fin supports described herein could support convex or concave surfaces and/or other surfaces within the broad scope of the invention with, when appropriate, modification of the leading edge of the vertical triangular fin support to have a non-linear leading edge that conforms with the surface to be supported.

FIG. 36F is a pictorial diagram of an example client device screen display 550-1. In this example, the user has uploaded the model of the object to be printed, selected a 25% print angle, the use of fin supports but no tree supports. The slicer proceeds to automatically generate (i.e., without further user intervention or instruction) fin support data based on the print angle, and the dimensions of the object to be printed, and/or its planar surface dimensions to support the object during printing via the 3D printer and further to generate updated model data by updating the model data to correspond to the print angle, to include the fin support data and further to include sprue data corresponding to a plurality of sprues that couple the leading edge of the vertical triangular fin element to the planar surface at multiple points, wherein the plurality of sprues facilitate separation of the at least one fin support from the object after printing via the 3D printer. The updated model data can further include additional bases/pads, rafts, brims, skirts and/or other supports that are automatically generated. Once this step is completed, the user is given a selectable option to view the results of this automated design as shown in screen display 550-2 of FIG. 36G.

FIG. 36H is a flowchart diagram illustrating an example method. In particular, a method is presented for use in conjunction with one or more functions and/or features described herein. Step 560-01 includes generating, via the client device, a graphical user interface (GUI) that presents display data a display device and that receives input data in response to user interactions. Step 560-02 includes receiving model data corresponding to an object to be printed via a 3D printer, wherein the object includes a planar surface. Step 560-03 includes generating a display of the model data via the GUI. Step 560-04 includes receiving, via the GUI, angle data corresponding to a print angle for the object, the print angle establishing an angular deviation of the planar surface from a vertical axis.

Step 560-05 includes automatically generating fin support data based on the print angle, the fin support data corresponding to at least one fin support configured to support the object during printing via the 3D printer, the at least one fin support including a vertical triangular fin element having a leading edge corresponding to the angular deviation of the planar surface from a vertical axis and a horizontal base element. Step 560-06 includes generating updated model data by updating the model data to correspond to the print angle, to include the fin support data and further to include sprue data corresponding to a plurality of sprues that couple the leading edge of the vertical triangular fin element to the planar surface at multiple points, wherein the plurality of sprues facilitate separation of the at least one fin support from the object after printing via the 3D printer. Step 560-07 includes generating 3D printer commands based on the model data. Step 560-08 includes sending, via the client device, the 3D printer commands to the 3D printer to facilitate 3D printing of the object, the at least one fin support and the plurality of sprues.

In addition or the alternative to any of the foregoing, the vertical triangular fin element has a planar triangular structure that has a topmost point that is lower than a topmost point of the object oriented at the print angle.

In addition or the alternative to any of the foregoing, the fin support data is automatically generated further based on dimensions of the object.

In addition or the alternative to any of the foregoing, the fin support data is automatically generated further based on dimensions of the planar surface.

In addition or the alternative to any of the foregoing, the horizontal base element has a planar triangular shape and is attached to the vertical triangular fin element at a bottommost edge of the vertical triangular fin element.

In addition or the alternative to any of the foregoing, the at least one fin support is positioned adjacent to the planar surface of the object so as to leave a gap between the leading edge of the vertical triangular fin element and the planar surface and wherein each of the plurality sprues bridge the gap between the leading edge of the vertical triangular fin element and the planar surface.

In addition or the alternative to any of the foregoing, the at least one fin support is positioned adjacent to the planar surface of the object with the planar triangular structure at a right angle to the planar surface.

In addition or the alternative to any of the foregoing, the print angle is less than or equal to 45 degrees.

In addition or the alternative to any of the foregoing, the fin support data is automatically generated response to data received via the GUI indicating a fin support selection from a plurality of support selections.

In addition or the alternative to any of the foregoing, the at least one fin support includes a plurality of fin supports positioned adjacent to the planar surface of the object, wherein the vertical triangular fin element of each of the plurality of fin supports has a planar triangular surface at a right angle to the planar surface.

Any of the systems, platforms, tools, engines, utilities, methods, processes, functions and/or features described herein can be implemented via one or more modules as described below. Such module(s) can further include one or more wired or wireless network interfaces that communicate digital information such as bit streams, signals, or other data via a network, such as the Internet or other wide area network, a local area network, a private network, a radio access network, a telecommunications network and/or other communication network. The digital information can be communicated bidirectionally with a computer, mobile communication device or other client device, a web server, storage network device and/or other computing or display device.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) “configured to”, “operably coupled to”, “coupled to”, and/or “coupling” includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as “coupled to”.

As may even further be used herein, the term “configured to”, “operable to”, “coupled to”, or “operably coupled to” indicates that an item includes one or more of power connections, input(s), output(s), etc., to perform, when activated, one or more its corresponding functions and may further include inferred coupling to one or more other items. As may still further be used herein, the term “associated with”, includes direct and/or indirect coupling of separate items and/or one item being embedded within another item.

As may be used herein, the term “compares favorably”, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term “compares unfavorably”, indicates that a comparison between two or more items, signals, etc., fails to provide the desired relationship.

As may be used herein, one or more claims may include, in a specific form of this generic form, the phrase “at least one of a, b, and c” or of this generic form “at least one of a, b, or c”, with more or less elements than “a”, “b”, and “c”. In either phrasing, the phrases are to be interpreted identically. In particular, “at least one of a, b, and c” is equivalent to “at least one of a, b, or c” and shall mean a, b, and/or c. As an example, it means: “a” only, “b” only, “c” only, “a” and “b”, “a” and “c”, “b” and “c”, and/or “a”, “b”, and “c”.

As may also be used herein, the terms “processing module”, “processing circuit”, “processor”, “processing circuitry”, and/or “processing unit” may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or may further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a “start” and/or “continue” indication. The “start” and “continue” indications reflect that the steps presented can optionally be incorporated in or otherwise used in conjunction with one or more other routines. In addition, a flow diagram may include an “end” and/or “continue” indication. The “end” and/or “continue” indications reflect that the steps presented can end as described and shown or optionally be incorporated in or otherwise used in conjunction with one or more other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis, or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A client device comprising:

a communication interface configured to communicate with a three-dimensional (3D) printer;

at least one user interface device configured to generate a graphical user interface (GUI) that presents display data via a display device and that receives input data in response to user interactions;

at least one processor; and at least one memory storing operational instructions that, when executed by the at least one processor, cause the client device to perform operations that include:

receiving model data corresponding to an object to be printed via the 3D printer, wherein the object includes a planar surface;

generating a display of the model data via the GUI;

receiving, via the GUI, angle data corresponding to a print angle for the object, the print angle establishing an angular deviation of the planar surface from a vertical axis;

automatically generating fin support data based on the print angle, the fin support data corresponding to at least one fin support configured to support the object during printing via the 3D printer, the at least one fin support including a vertical triangular fin element having a leading edge corresponding to the angular deviation of the planar surface from a vertical axis and a horizontal base element;

generating updated model data by updating the model data to correspond to the print angle, to include the fin support data and further to include sprue data corresponding to a plurality of sprues that couple the leading edge of the vertical triangular fin element to the planar surface at multiple points, wherein the plurality of sprues facilitate separation of the at least one fin support from the object after printing via the 3D printer;

generating 3D printer commands based on the model data; and sending, via the communications interface, the 3D printer commands to the 3D printer to facilitate 3D printing of the object, the at least one fin support and the plurality of sprues.

2. The client device of claim 1, wherein the vertical triangular fin element has a planar triangular structure that has a topmost point that is lower than a topmost point of the object oriented at the print angle.

3. The client device of claim 2, wherein the fin support data is automatically generated further based on dimensions of the object.

4. The client device of claim 2, wherein the fin support data is automatically generated further based on dimensions of the planar surface.

5. The client device of claim 4, wherein the horizontal base element has a planar triangular shape and is attached to the vertical triangular fin element at a bottommost edge of the vertical triangular fin element.

6. The client device of claim 5, wherein the at least one fin support is positioned adjacent to the planar surface of the object so as to leave a gap between the leading edge of the vertical triangular fin element and the planar surface and wherein each of the plurality sprues bridge the gap between the leading edge of the vertical triangular fin element and the planar surface.

7. The client device of claim 6, wherein the at least one fin support is positioned adjacent to the planar surface of the object with the planar triangular structure at a right angle to the planar surface.

8. The client device of claim 1, wherein the print angle is less than or equal to 45 degrees.

9. The client device of claim 1, wherein the fin support data is automatically generated in response to data received via the GUI indicating a fin support selection from a plurality of support selections.

10. The client device of claim 1, wherein the at least one fin support includes a plurality of fin supports positioned adjacent to the planar surface of the object, wherein the vertical triangular fin element of each of the plurality of fin supports has a planar triangular surface at a right angle to the planar surface.

11. A method for use with a client device that includes user interface devices, at least one processing device and a memory, the method comprising:

generating, via the client device, a graphical user interface (GUI) that presents display data via a display device and that receives input data in response to user interactions;

receiving model data corresponding to an object to be printed via a 3D printer, wherein the object includes a planar surface;

generating a display of the model data via the GUI;

receiving, via the GUI, angle data corresponding to a print angle for the object, the print angle establishing an angular deviation of the planar surface from a vertical axis;

automatically generating fin support data based on the print angle, the fin support data corresponding to at least one fin support configured to support the object during printing via the 3D printer, the at least one fin support including a vertical triangular fin element having a leading edge corresponding to the angular deviation of the planar surface from a vertical axis and a horizontal base element;

generating updated model data by updating the model data to correspond to the print angle, to include the fin support data and further to include sprue data corresponding to a plurality of sprues that couple the leading edge of the vertical triangular fin element to the planar surface at multiple points, wherein the plurality of sprues facilitate separation of the at least one fin support from the object after printing via the 3D printer;

generating 3D printer commands based on the model data; and sending, via the client device, the 3D printer commands to the 3D printer to facilitate 3D printing of the object, the at least one fin support and the plurality of sprues.

12. The method of claim 11, wherein the vertical triangular fin element has a planar triangular structure that has a topmost point that is lower than a topmost point of the object oriented at the print angle.

13. The method of claim 12, wherein the fin support data is automatically generated further based on dimensions of the object.

14. The method of claim 12, wherein the fin support data is automatically generated further based on dimensions of the planar surface.

15. The method of claim 14, wherein the horizontal base element has a planar triangular shape and is attached to the vertical triangular fin element at a bottommost edge of the vertical triangular fin element.

16. The method of claim 15, wherein the at least one fin support is positioned adjacent to the planar surface of the object so as to leave a gap between the leading edge of the vertical triangular fin element and the planar surface and wherein each of the plurality sprues bridge the gap between the leading edge of the vertical triangular fin element and the planar surface.

17. The method of claim 16, wherein the at least one fin support is positioned adjacent to the planar surface of the object with the planar triangular structure at a right angle to the planar surface.

18. The method of claim 11, wherein the print angle is less than or equal to 45 degrees.

19. The method of claim 11, wherein the fin support data is automatically generated in response to data received via the GUI indicating a fin support selection from a plurality of support selections.

20. The method of claim 11, wherein the at least one fin support includes a plurality of fin supports positioned adjacent to the planar surface of the object, wherein the vertical triangular fin element of each of the plurality of fin supports has a planar triangular surface at a right angle to the planar surface.

* * * * *